US010806137B2

(12) United States Patent
Holland et al.

(10) Patent No.: US 10,806,137 B2
(45) Date of Patent: Oct. 20, 2020

(54) BAIT STATION

(71) Applicant: Neogen Corporation, Lansing, MI (US)

(72) Inventors: James B. Holland, Clinton, NC (US); Michael Benton, Hampstead, NC (US); Mitchell Rivenbark, Clinton, NC (US)

(73) Assignee: NEOGEN CORPORATION, Lansing, MI (US)

( * ) Notice: Subject to any disclaimer, the term of this patent is extended or adjusted under 35 U.S.C. 154(b) by 521 days.

(21) Appl. No.: 15/679,850

(22) Filed: Aug. 17, 2017

(65) Prior Publication Data

US 2019/0053482 A1 Feb. 21, 2019

(51) Int. Cl.
| | |
|---|---|
| *A01M 25/00* | (2006.01) |
| *A01M 23/36* | (2006.01) |
| *A01M 1/20* | (2006.01) |
| *A01M 1/02* | (2006.01) |
| *A01M 23/08* | (2006.01) |

(52) U.S. Cl.
CPC ............ *A01M 25/004* (2013.01); *A01M 1/02* (2013.01); *A01M 1/20* (2013.01); *A01M 23/36* (2013.01); *A01M 25/002* (2013.01); *A01M 23/08* (2013.01)

(58) Field of Classification Search
CPC ...... A01M 1/2055; A01M 1/24; A01M 23/00; A01M 25/00; A01M 25/002; A01M 25/004; A01M 25/006
See application file for complete search history.

(56) References Cited

U.S. PATENT DOCUMENTS

| | | | |
|---|---|---|---|
| 5,235,779 | A | 8/1993 | Saleman |
| 5,246,675 | A | 9/1993 | Castronovo |
| 5,329,724 | A | 7/1994 | Saleman |
| 6,219,960 | B1 | 4/2001 | Contadini et al. |
| 6,370,813 | B1 | 4/2002 | Nelson et al. |
| 6,594,948 | B1 | 7/2003 | Novack |
| 6,813,858 | B1 | 11/2004 | Wright |
| D515,175 | S | 2/2006 | Mayo et al. |

(Continued)

FOREIGN PATENT DOCUMENTS

| | | |
|---|---|---|
| AU | 2007100803 A4 | 9/2007 |
| AU | 2016100772 A4 | 7/2016 |

(Continued)

*Primary Examiner* — Christopher D Hutchens
(74) *Attorney, Agent, or Firm* — Honigman LLP; Douglas H. Siegel; Jonathan P. O'Brien

(57) ABSTRACT

A bait station including a first bait station subassembly and a second bait station subassembly removably-secured to the first bait station subassembly. The first bait station subassembly includes a housing, at least one panel-engaging member and a lid member. The housing has a body defining an axial passage and at least one radial passage in fluid communication with the axial passage. The lid member is hingedly-connected to the housing. The lid member defines a passage. The second bait station subassembly includes a bait spike and a bait spike retainer. The bait spike retainer defines an axial bait spike passage. The bait spike is movably-disposed within the axial bait spike passage of the bait spike retainer and the passage of the lid member. A portion of a bait station is also disclosed. A bait spike assembly is also disclosed. A method is also disclosed.

20 Claims, 44 Drawing Sheets

(56) References Cited

U.S. PATENT DOCUMENTS

| | | | |
|---|---|---|---|
| 7,051,473 B2 | 5/2006 | Hoppe | |
| D539,867 S | 4/2007 | Mediate | |
| 8,061,238 B2 | 11/2011 | Cink et al. | |
| D682,981 S | 5/2013 | Bernard | |
| D686,689 S | 7/2013 | Bernard | |
| 8,984,802 B1 * | 3/2015 | Walsh | A01M 25/004 43/131 |
| 9,125,393 B2 | 9/2015 | Firth | |
| D839,380 S * | 1/2019 | Holland | D22/122 |
| D851,723 S * | 6/2019 | Holland | D22/122 |
| 2003/0070348 A1 * | 4/2003 | Spragins | A01M 1/026 43/121 |
| 2004/0128903 A1 * | 7/2004 | Wexler | A01M 1/106 43/122 |
| 2014/0291474 A1 | 10/2014 | Wilson et al. | |

FOREIGN PATENT DOCUMENTS

| | | |
|---|---|---|
| DE | 102012013138 A1 | 1/2014 |
| FR | 2901455 B1 | 1/2013 |
| GB | 2096446 A | 10/1982 |
| WO | 2013000039 A1 | 3/2013 |

* cited by examiner

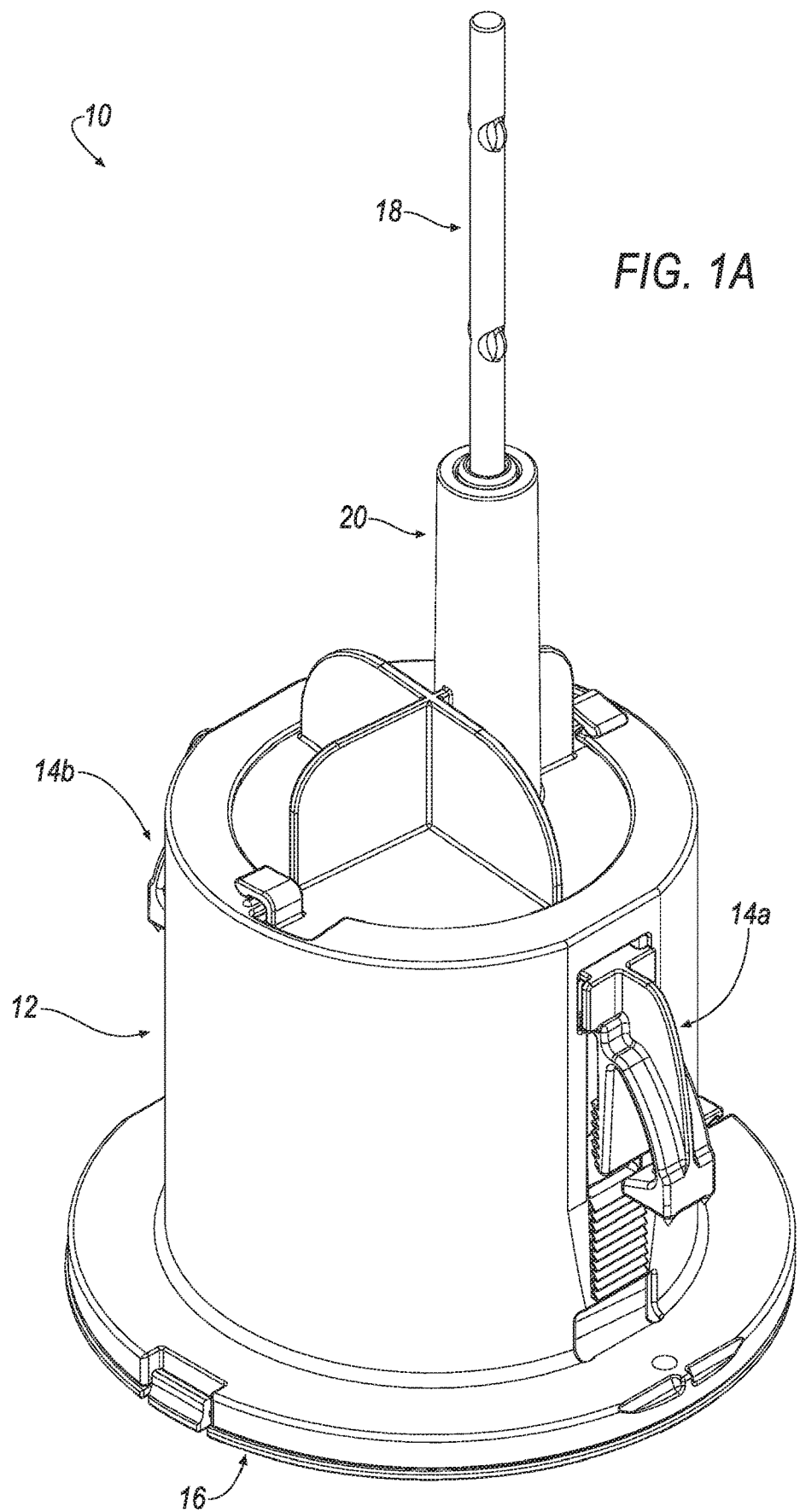

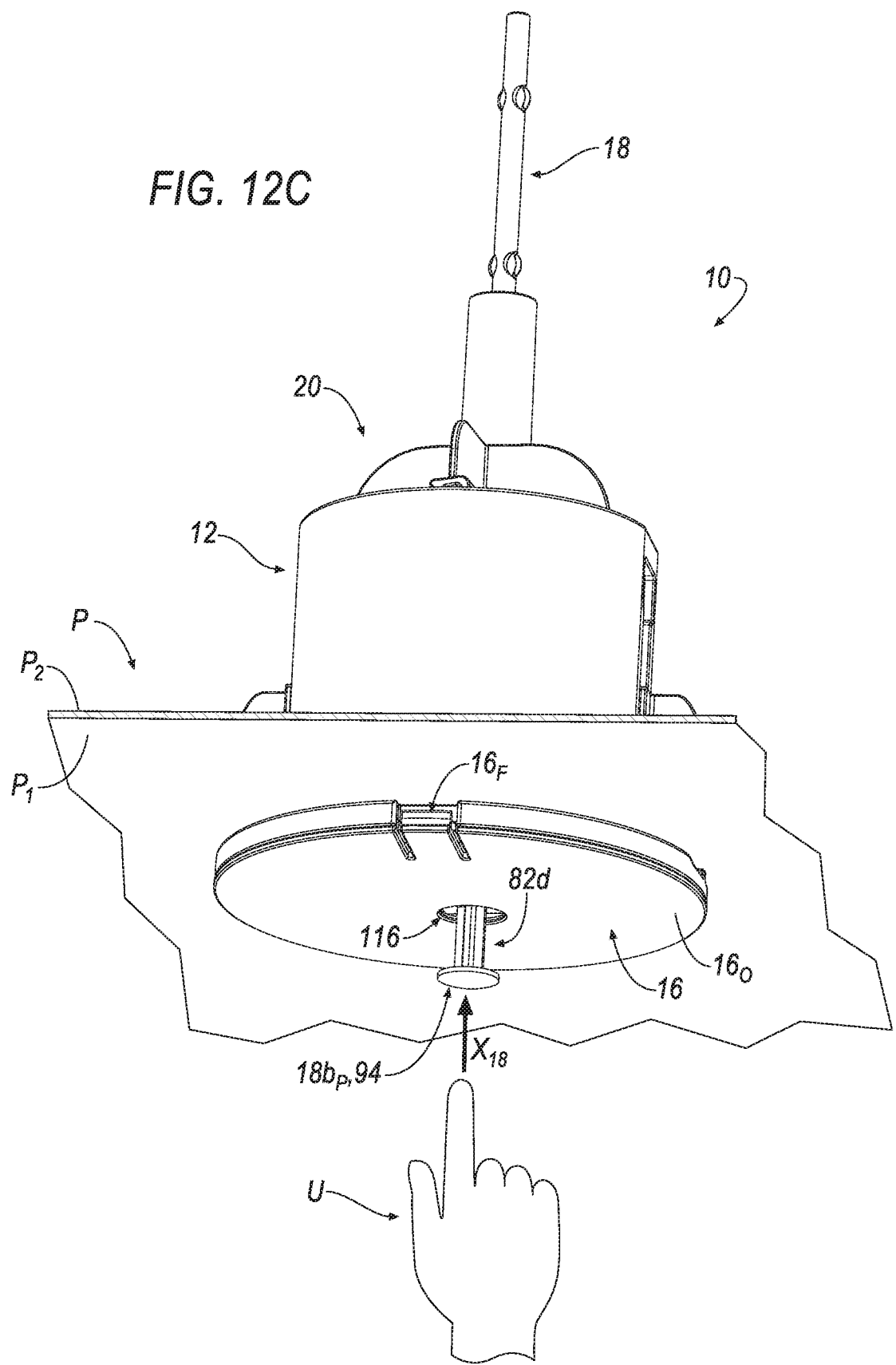

BAIT STATION

TECHNICAL FIELD

This disclosure relates to a bait station and a methodology for using the same.

BACKGROUND

Bait stations are known in the art. In one example, bait stations are used to place rodenticides as the bait to control roof rats. Improvements to bait stations are continuously being sought in order to advance the arts.

SUMMARY

One aspect of the disclosure provides a bait station. The bait station includes a first bait station subassembly including a housing having a body defining an axial passage and at least one radial passage in fluid communication with the axial passage, at least one panel-engaging member sized to be arranged within and slideably disposed about the at least one radial passage, and a lid member hingedly-connected to the housing, wherein the lid member defines a passage; a second bait station subassembly including a bait spike retainer defining an axial bait spike passage, and a bait spike sized to be movably-disposed within the bait spike passage and the passage of the lid member.

In one embodiment of the bait station, the housing may include a radially inwardly-extending lip portion, the inwardly-extending lip portion may define a distal opening that is axially-aligned with and is in fluid communication with the axial passage extending through the body, and the inwardly-extending lip portion may define at least one slot. In another embodiment, a distal end of the bait spike retainer may include at least one axial retainer finger that is sized to extend through the at least one slot of the inwardly-extending lip portion and to engage a distal surface of the inwardly-extending lip portion upon rotatably-connecting the bait spike retainer to the housing; and further, the at least one axial retainer finger may include an inner surface defining a projection sized to engage a corresponding projection extending from the distal surface of the inwardly-extending lip portion after rotatably-connecting the bait spike retainer to the housing.

In some instances of the inventive bait station, the at least one panel-engaging member may include: a first flange portion; a second flange portion; and a third flange portion, wherein the first flange portion and the second flange portion may be sized for engagement with the at least one radial passage formed by the body of the housing, and the third flange portion may be sized for engagement with an outwardly-extending lip portion that extends radially outwardly from an outer surface of the body of the housing. Further, the first flange portion may be sized to be retained adjacent an inner surface of the body of the housing.

In other instances of the inventive bait station, the second flange portion may include an inner surface defined by a row of ridges that is sized to be axially coupled to a corresponding row of ridges extending from the outer surface of the body upon slidably-connecting the at least one panel-engaging member within the at least one radial passage; the third flange portion may be defined by one or more barbs sized for being received by one or more female portions formed by a distal surface of the outwardly-extending lip portion upon slidably-connecting the at least one panel-engaging member within the at least one radial passage.

In an example of the bait station, the lid member may include a lid member thickness extending between an inner surface and an outer surface of the lid member, and the passage of the lid member may extend through the lid member thickness. Further, the bait spike may include a proximal end and a distal end, and the proximal end of the bait spike may be sized for arrangement within the passage the lid member.

In another example of the bait station, the bait spike may be arranged relative to the lid member in one of two states being: a baited state whereby the proximal end of the bait spike may be substantially aligned with the outer surface of the lid member and a proximal end of an intermediate stem portion of the bait spike may be arranged in a spaced-apart relationship with respect to the inner surface of the lid member; and a non-baited state whereby the proximal end of the bait spike may not be aligned with the outer surface of the lid member and the proximal end of the intermediate stem portion of the bait spike may be arranged adjacent to the inner surface of the lid member. In a further example, during the non-baited state, a proximal stem portion of the bait spike that forms the proximal end of the bait spike may extend beyond the outer surface of the lid member.

One embodiment of the invention is a portion of a bait station, including: a lid member including a lid member thickness extending between an inner surface and an outer surface of the lid member, wherein the lid member may define a passage extending through the lid member thickness; and a bait spike having a distal end and a proximal end, wherein the bait spike may be axially-aligned with the passage extending through the lid member thickness and movably-disposed with respect to the passage of the lid member in one of two states being a baited state and a non-baited state. In a further embodiment, the baited state may be defined by the proximal end of the bait spike not extending beyond the outer surface of the lid member; and the non-baited state may be defined by the proximal end of the bait spike extending beyond the outer surface of the lid member. And in another embodiment, the baited state may be further defined by a proximal end of an intermediate stem portion of the bait spike being arranged in a spaced-apart relationship with respect to the inner surface of the lid member; and the non-baited state may be further defined by the proximal end of the intermediate stem portion of the bait spike being arranged adjacent to the inner surface of the lid member.

Another embodiment of the invention is a bait spike assembly, including: a bait-retaining portion, wherein a proximal portion of the bait-retaining portion of the bait spike may form an attachment head and an attachment neck, wherein a shoulder surface joins the attachment head to the attachment neck; and a consumption-indicating portion including a proximal end and a distal end and defined by a stem body including at least a distal stem portion, wherein the distal stem portion may define an attachment bore, wherein the attachment head and the attachment neck may be sized to be disposed within the attachment bore for connecting the bait-retaining portion to the consumption-indicating portion. Further, the attachment bore may be defined by a passage portion, one or more flexible fingers, and a head-receiving pocket, wherein the one or more flexible fingers may be arranged between the passage portion and the head-receiving pocket. And in an additional embodiment, the attachment head may be disposed within the head-receiving pocket, and the one or more flexible fingers may be disposed adjacent the shoulder surface.

In one example, the stem body of the consumption-indicating portion may include: a first intermediate stem portion; a second intermediate stem portion extending from the first intermediate stem portion; and a proximal stem portion extending from the second intermediate stem portion, wherein the proximal stem portion may be connected to a button member. Further, the second intermediate stem portion of the consumption-indicating portion may be defined by a tool interface portion; the bait-retaining portion may be formed from a first material, wherein the consumption-indicating portion may be formed from a second material that is different from the first material; and the first material may be metal and the second material may be plastic. In an additional example, a distal portion of the bait-retaining portion of the bait spike may form bait-engaging surface portions including one or more of at least one protrusion and at least one recess.

One embodiment of the invention is a method, including connecting a first bait station subassembly to a panel by: inserting a housing at least partially through a panel passage formed by the panel, wherein the housing may include a body defining an axial passage and at least one radial passage in fluid communication with the axial passage; securing the housing to the panel by connecting at least one panel-engaging member to the housing by axially-inserting the at least one panel-engaging member into the axial passage in a first axial direction then radially-inserting the at least one panel-engaging member partially through the at least one radial passage in a radial direction and then axially-sliding the at least one panel-engaging member relative to the at least one radial passage in a second axial direction that is opposite the first axial direction; and connecting a second bait station subassembly to the first bait station subassembly by axially-inserting the second bait station subassembly into the axial passage of the first bait station subassembly, and rotating the second bait station subassembly relative to the first bait station subassembly.

In an additional example of the method, the axially-sliding the at least one panel-engaging member relative to the at least one radial passage in the second axial direction may result in sandwiching a thickness of the panel by arranging at least a portion of a proximal surface of the at least one panel-engaging member adjacent an upper B-surface side of the panel; and arranging at least a portion of a distal surface of an outwardly-extending lip portion that extends radially outwardly from an outer surface of the body of the housing adjacent a lower A-surface side of the panel. Further, prior to connecting the second bait station subassembly to the first bait station subassembly, the second bait station subassembly may be assembled by connecting a bait spike to a bait spike retainer by axially-inserting the bait spike into an axial bait spike passage of the bait spike retainer. In another example, prior to connecting the second bait station subassembly to the first bait station subassembly, a bait may be connected to a distal end of the bait spike after connecting the bait spike to the bait spike retainer; and the bait may be a rodenticide.

In other aspects of the inventive method: after connecting the second bait station subassembly to the first bait station subassembly, a lid member connected to the housing may be hingedly-rotated from an open orientation to a closed orientation, wherein the lid member may define a lid member thickness and a lid member passage extending through the lid member thickness, wherein after hingedly-rotating the lid member, the lid member passage may be axially-aligned with and receive a proximal end of the bait spike. In a further aspect, prior to rotating the second bait station subassembly relative to the first bait station subassembly, one or more axial retainer fingers extending from the bait spike retainer may be axially-inserted through one or more slots formed by an inwardly-extending lip portion of the body of the housing. And in another aspect, rotating the second bait station subassembly relative to the first bait station subassembly may include spatially displacing the one or more axial retainer fingers relative the one or more slots for disposing an inner surface of the one or more axial retainer fingers adjacent a distal surface of the inwardly-extending lip portion.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a perspective view of an exemplary bait station.

FIG. 10A' is an enlarged view according to line 10A' of FIG. 10A.

FIG. 10A" is an enlarged view according to line 10A" of FIG. 10A.

FIG. 12C is a lower perspective view of the bait station according to FIG. 12B prior to being serviced by a user.

Like reference symbols in the various drawings indicate like elements.

DETAILED DESCRIPTION

Figure 1B:
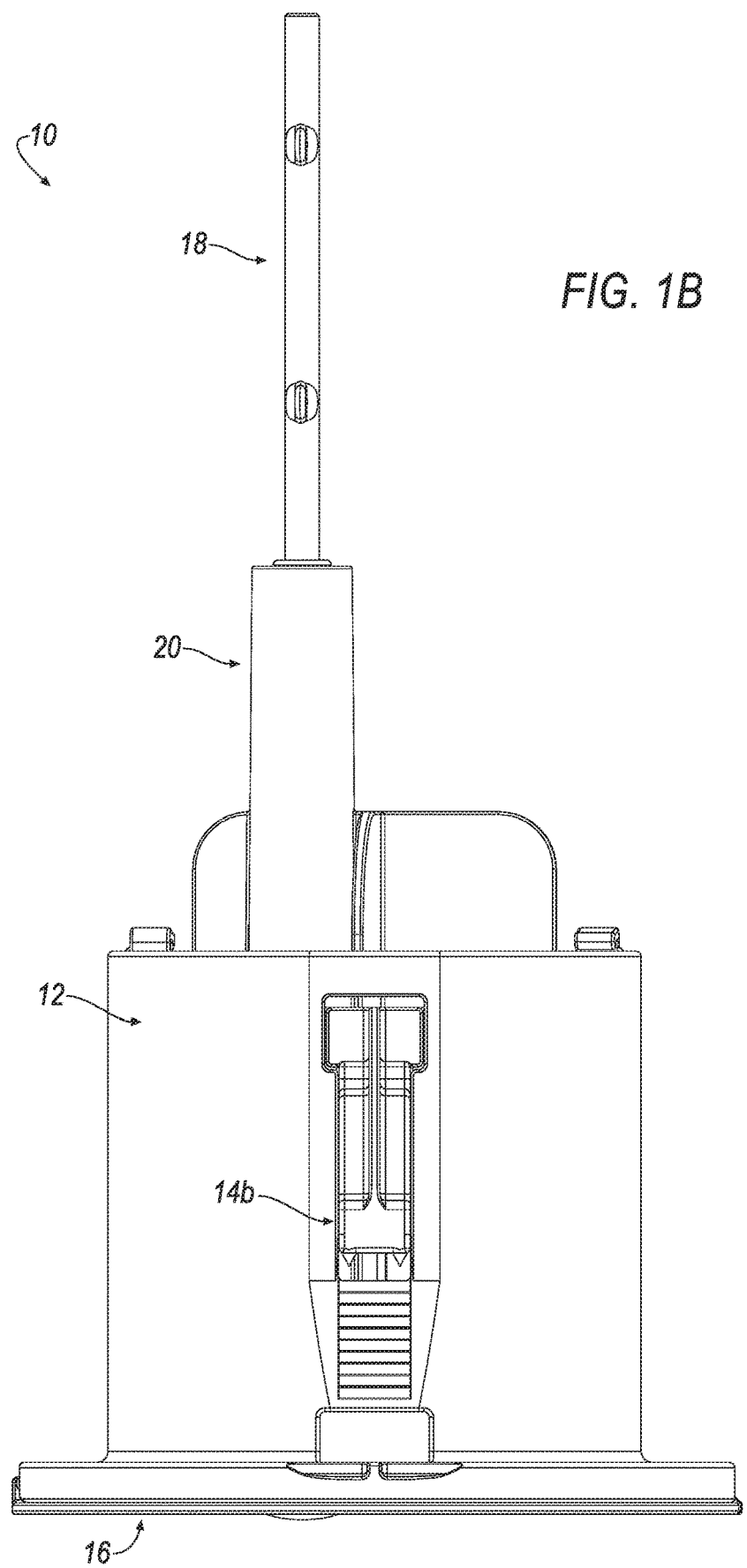
FIG. 1B is a first side view of the bait station of FIG. 1A.
Figure 1C:
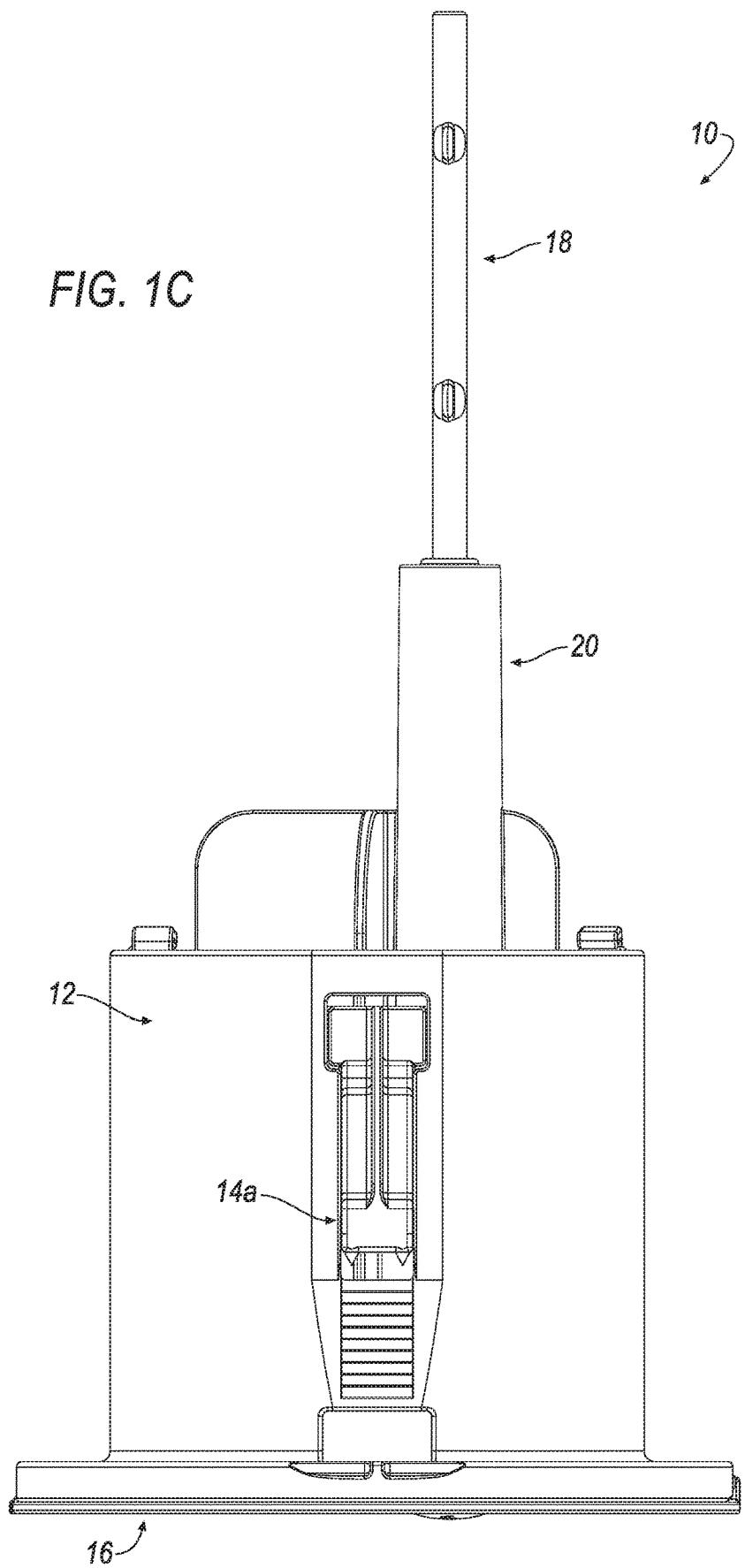
FIG. 1C is a second side view of the bait station of FIG. 1A.
Figure 1D:
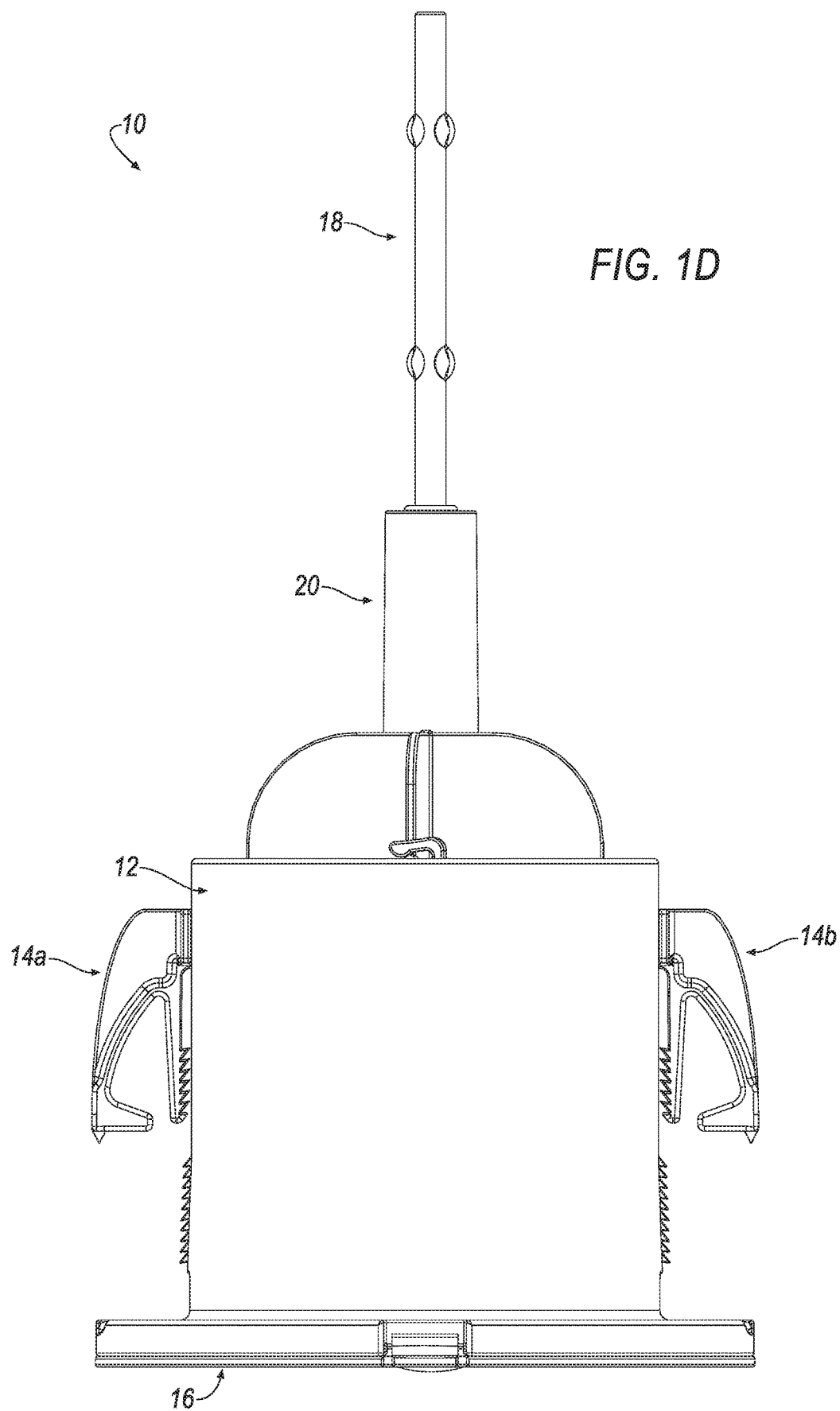
FIG. 1D is a front view of the bait station of FIG. 1A.
Figure 1E:
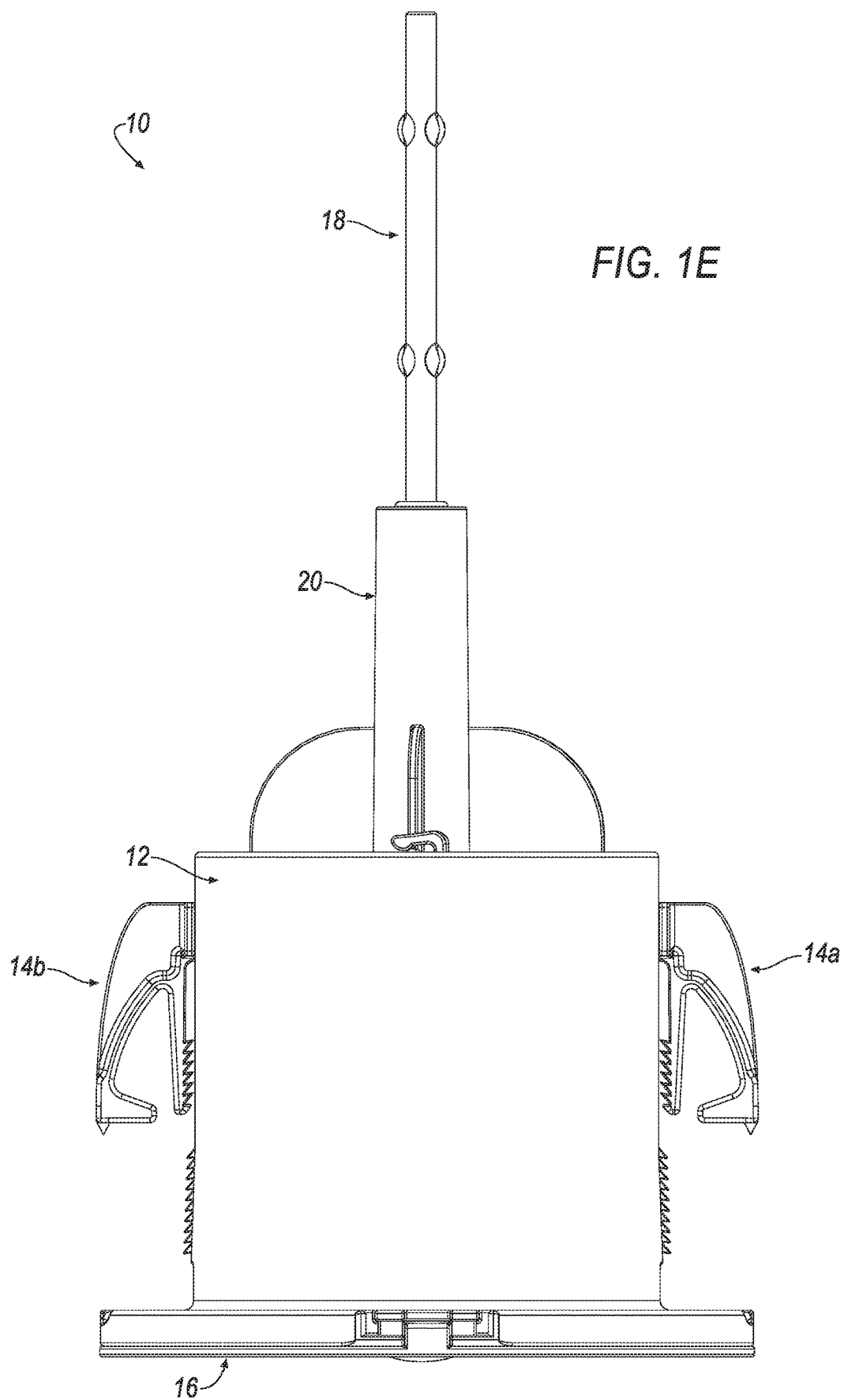
FIG. 1E is a rear view of the bait station of FIG. 1A.
Figure 1F:
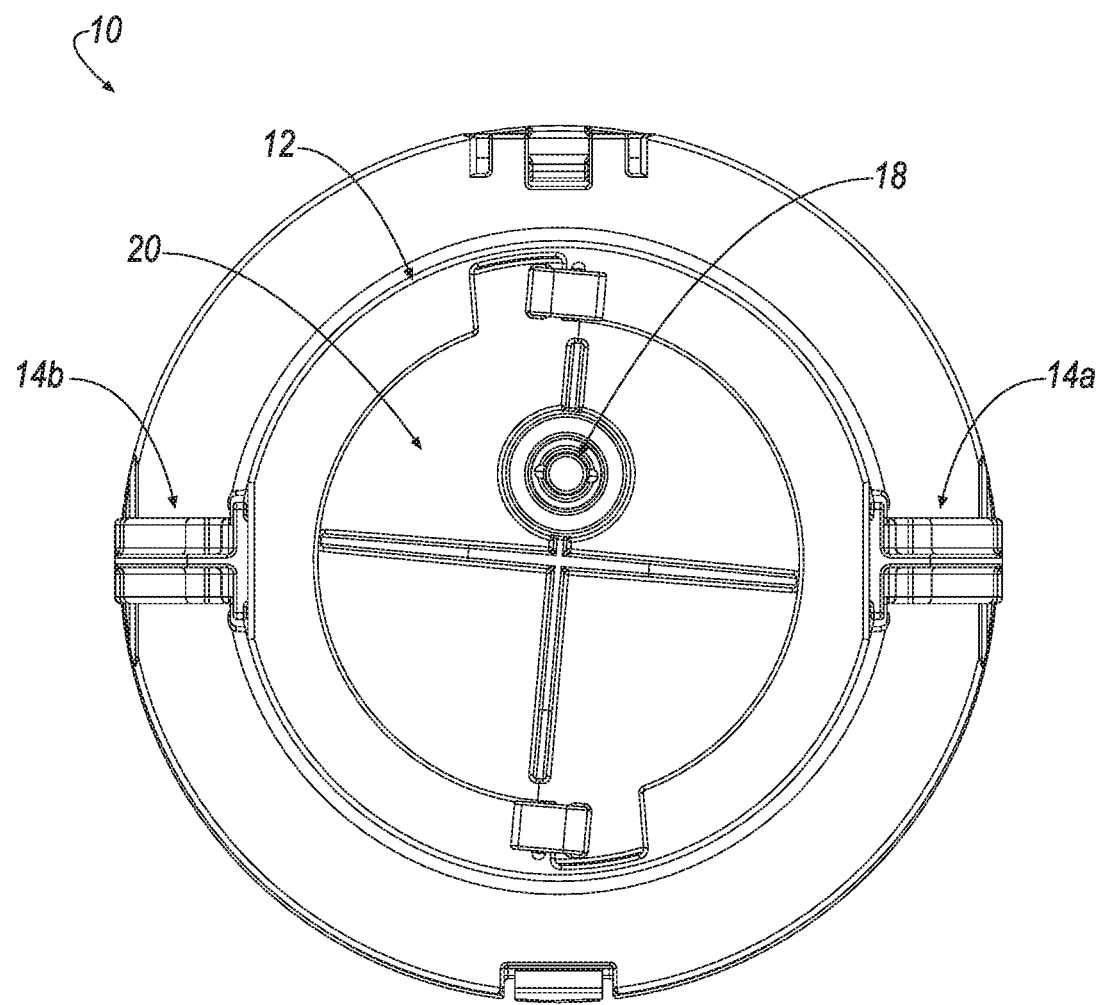
FIG. 1F is a top view of the bait station of FIG. 1A.
Figure 1G:
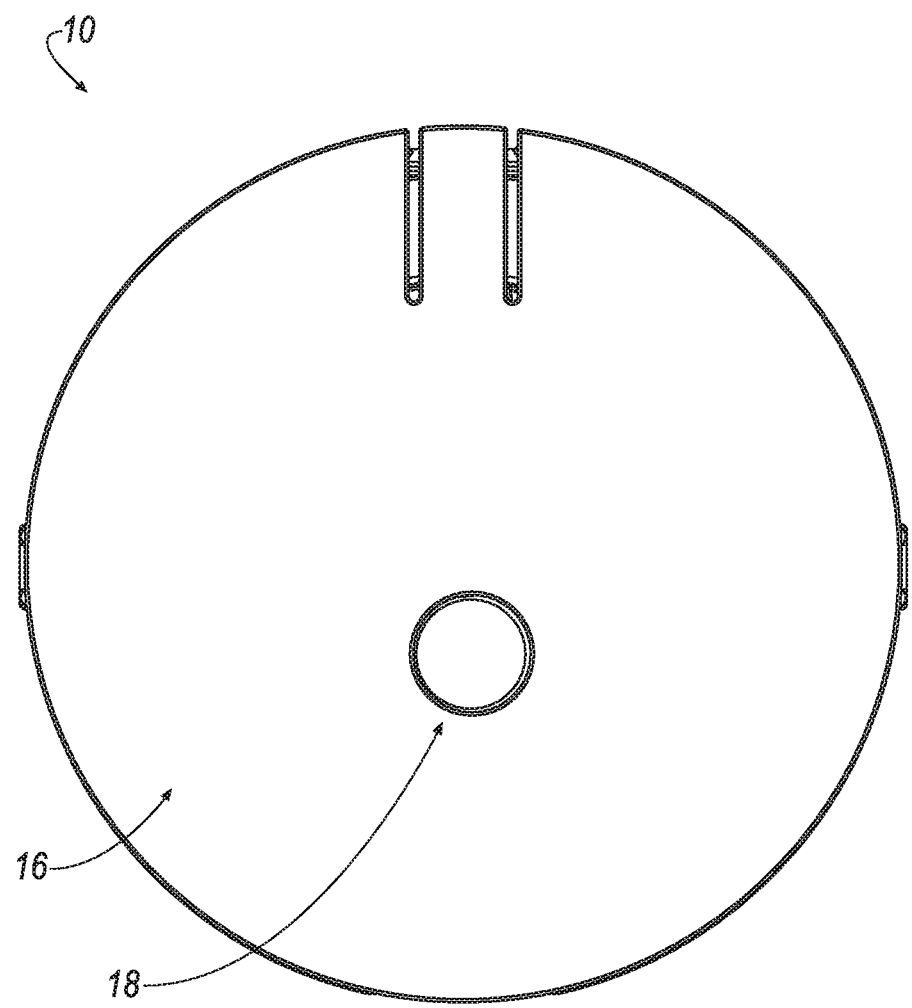
FIG. 1G is a bottom view of the bait station of FIG. 1A.
Figure 2A:
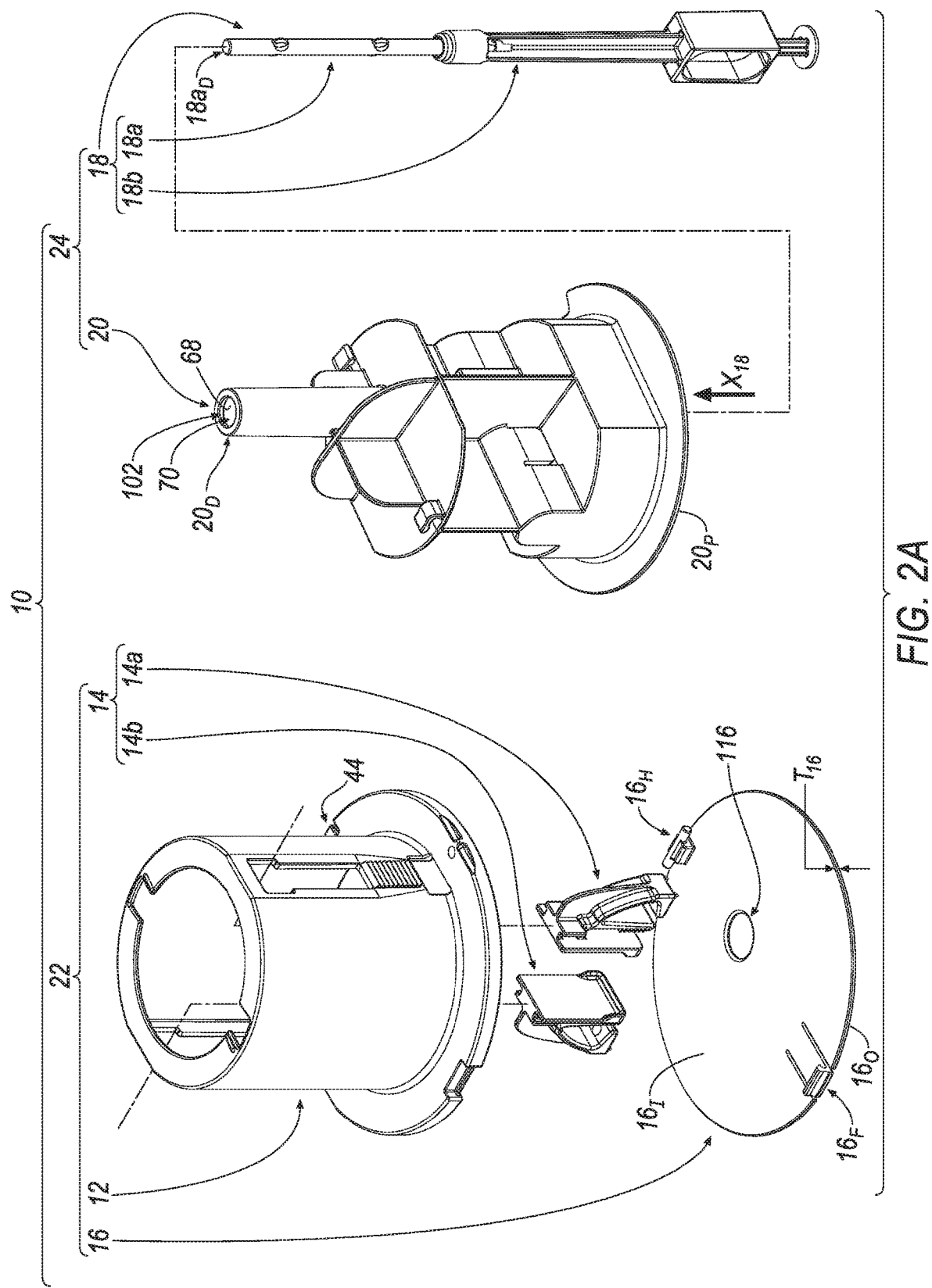
FIG. 2A is an exploded perspective view of the bait station of FIGS. 1A-1G.
Figure 2B:
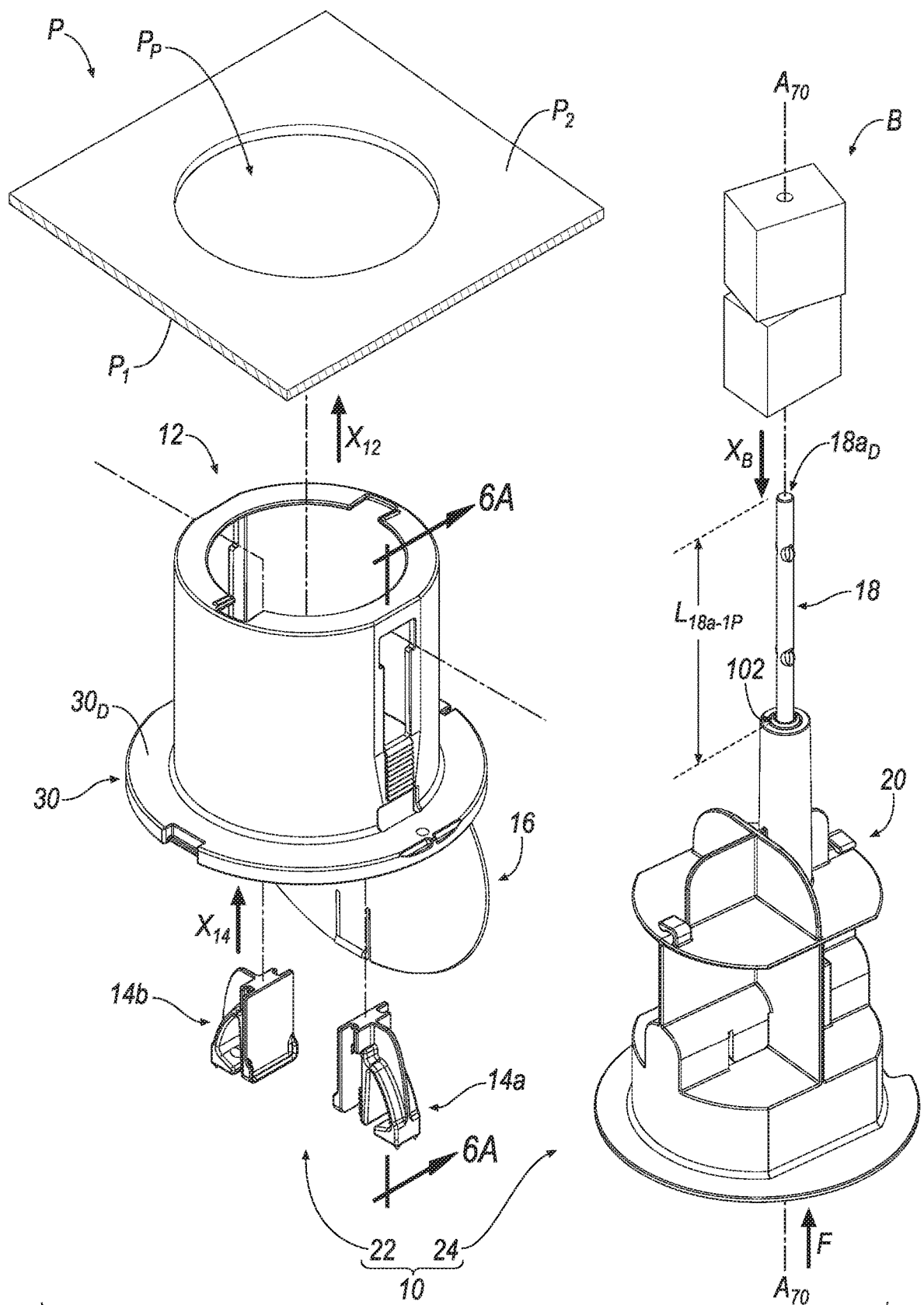
FIG. 2B is a partially assembled perspective view of the bait station of FIG. 2A.
Figure 2C:
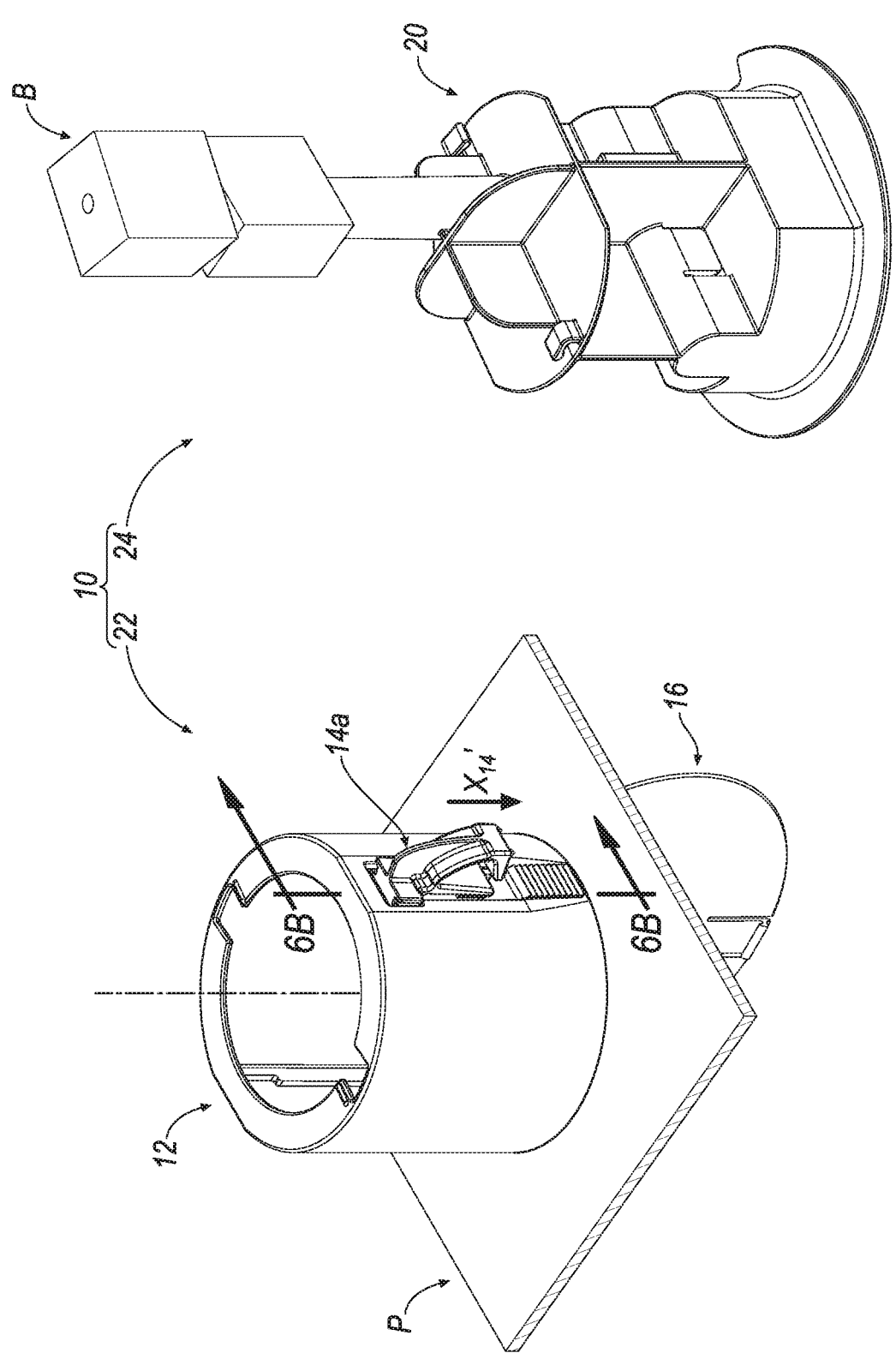
FIG. 2C is a further partially assembled perspective view of the bait station of FIG. 2B.

Referring to FIGS. 1A-1G, a bait station is shown generally at 10. As seen in FIG. 2A and with corresponding reference to FIGS. 1A-1G, a plurality of components 12, 14, 16, 18, 20 form the bait station 10. Furthermore, as seen in FIGS. 2A-2C, more than one component (see, e.g., components 12, 14, 16) of the plurality of components 12, 14, 16, 18, 20 form a first bait station subassembly 22 and more than one component (see, e.g., components 18, 20) of the plurality of components 12, 14, 16, 18, 20 form a second bait station subassembly 24. As seen in FIGS. 2D-2G, the second bait station subassembly 24 is sized for being removably-secured to the first bait station subassembly 22.

As seen in FIGS. 2B-2G, the first bait station subassembly 22 may be secured to a panel P. In some implementations, the panel P may be an overhead ceiling panel that defines a room of a building. In other examples, the panel P may be: (1) a vertical sidewall panel that defines a room of a building, (2) a flooring panel that defines a room of a building (3) a portion of ductwork (that is, for example, positioned: overhead within a ceiling, within flooring or within a vertical sidewall) or the like. If, for example, the panel P is an overhead ceiling panel, the panel P may be formed from a drop ceiling panel that may be removably-secured to a drop ceiling grid support structure (not shown). In other examples, the panel P may be formed from a portion of a sheet of drywall, a plaster wall, a cinderblock wall, a sheet of plywood, plastic or metal (e.g., that is utilized for forming ductwork) or the like.

With continued reference to FIGS. 2B-2G, the second bait station subassembly 24 may retain bait B (e.g., a rodenticide, poison, pesticide or the like). As seen in FIGS. 3A-3B, the bait B may be consumed by a rodent R, pest or the like (e.g., mice or rats). In one example, the bait B is a formed from a solid material, e.g., a wax or formed block. For example, the bait B may be formed from a solid material and may include attractants, rodenticide (poison), feed, and wax.

When the second bait station subassembly 24 is removably-secured to the first bait station subassembly 22, the second bait station subassembly 24 may be accessible by a user (see, e.g., U in FIGS. 12A-12D) from an "A-surface" side $P_1$ of the panel P such that the second bait station subassembly 24 may be loaded or reloaded with bait B. As seen in FIGS. 3A-3B, the bait B is located about an opposite, "B-surface" side $P_2$ of the panel P. As will be described in the following disclosure at FIGS. 12A-12B, in addition to retaining bait B, a portion (see, e.g., component 18) of the second bait station subassembly 24 also provides an added function of a bait consumption indictor whereby, for example, the portion (see, e.g., component 18) of the second bait station subassembly 24 moves (see, e.g., arrow $X_{18}'$) relative another component (see, e.g., component 20) of the second bait station subassembly 24. In some instances, if the bait station 10 is installed in an overhead orientation (i.e., if the panel P defines a ceiling panel or overhead ductwork), the component 18 may fall or drop downwardly $X_{18}'$ with the assistance of gravity from an "up orientation" (see, e.g., FIGS. 3A, 10A, 12A) to a "down orientation" (seem e.g. FIGS. 3B, 10B, 12B) in order to provide a visible indication to the user U (who is located opposite the A-surface $P_1$ of the panel P as seen in, for example, FIGS. 12A-12D) that the bait B (that is located opposite the B-surface $P_2$ of the panel P as seen in, for example, FIGS. 3A, 10A, 12A) has been depleted (as seen in, for example, FIGS. 3B, 10B, 12B). As a result, the bait station 10 favorably obviates the need for the user U to otherwise manually inspect the state of consumption of the bait B that is secured to the second bait station subassembly 24.

Referring to FIG. 2A, first bait station subassembly 22 includes a housing 12, at least one panel-engaging member 14 and a lid member 16. As also seen in FIGS. 1A-1F and FIGS. 2A-2G, the at least one panel-engaging member 14 includes a pair of panel-engaging member 14 defined by a first panel-engaging member 14a and a second panel-engaging member 14b. In the following disclosure, reference to "a", "the" or "at least one" "panel engaging member 14" may be applied to either one or both of the first panel-engaging member 14a and the second panel-engaging member 14b as the first panel-engaging member 14a and the second panel-engaging member 14b are similar components of the bait station 10.

Figure 2D:
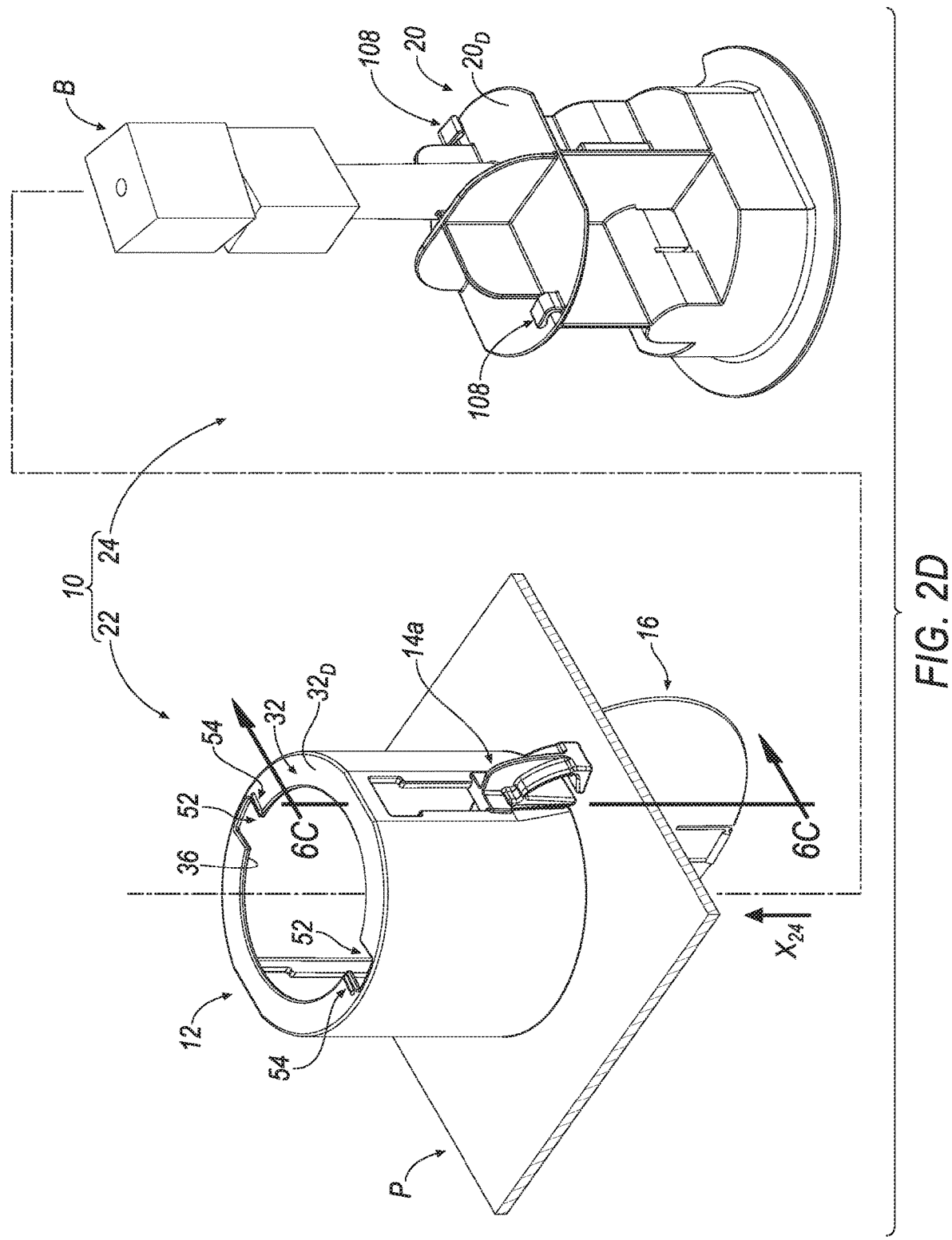
FIG. 2D is a further partially assembled perspective view of the bait station of FIG. 2C.

As seen in FIGS. 2B-2D and as will be described in the following disclosure at FIGS. 6A-6C, the at least one panel-engaging member 14 may be slidably-connected to the housing 12 for axial movement according to the direction of arrow $X_{14}'$ (see, e.g., FIGS. 2C and 6B). The lid member 16 may be hingedly-connected to the housing 12 for rotation according to the direction of arrow $R_{16}$ (see, e.g., FIG. 2F).

Figure 4:
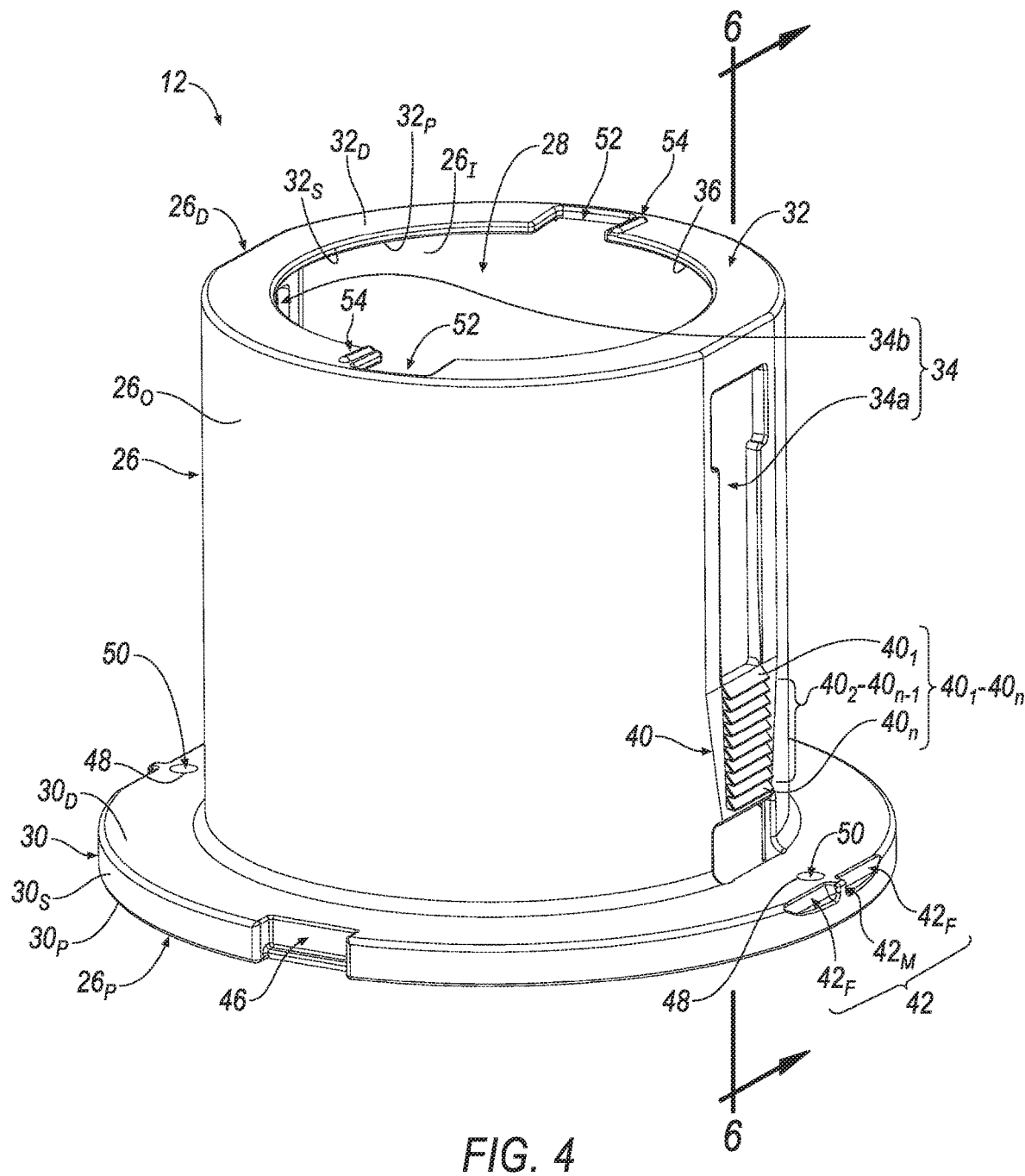
FIG. 4 is a perspective view of a housing of the bait station of FIGS. 1A-1G.

With reference to FIG. 4, the housing 12 includes a substantially cylindrical body 26 defined by an inner surface $26_I$ and an outer surface $26_O$. The substantially cylindrical body 26 is further defined by a thickness $T_{26}$ (see, e.g., FIGS. 6A-6C) extending between the inner surface $26_I$ and the outer surface $26_O$. Furthermore, the inner surface $26_I$ of the substantially cylindrical body 26 defines an axial passage 28 extending through the substantially cylindrical body 26 from a proximal end $26_P$ of the substantially cylindrical body 26 to a distal end $26_D$ of the substantially cylindrical body 26.

As seen in FIG. 4, the housing 12 further includes an outwardly-extending lip portion 30 extending from the outer surface $26_O$ of the substantially cylindrical body 26 and an inwardly-extending lip portion 32 extending from the inner surface $26_I$ of the substantially cylindrical body 26. The outwardly-extending lip portion 30 is arranged near the proximal end $26_P$ of the substantially cylindrical body 26. The inwardly-extending lip portion 32 is arranged near the distal end $26_D$ of the substantially cylindrical body 26.

With continued reference to FIG. 4, at least one radial passage 34 radially extends through the thickness $T_{26}$ of the substantially cylindrical body 26. The at least one radial passage 34 is in fluid communication with the axial passage 28. As seen in FIGS. 2B-2C and 6A-6C, the at least one radial passage 34 is sized for receiving the at least one panel-engaging member 14.

Like the at least one panel-engaging member 14, the at least one radial passage 34 includes a pair of radial passages defined by a first radial passage 34a and a second radial passage 34b. In the following disclosure, reference to "a", "the" or "at least one" "radial passage 34" may be applied to either one or both of the first radial passage 34a and the second radial passage 34b as the first radial passage 34a and the second radial passage 34b are similar. Furthermore, as seen in FIGS. 1A-2G, the first panel-engaging member 14a is associated with and disposed within the first radial passage 34a and the second panel-engaging member 14b is associated with and disposed within the second radial passage 34b.

Figure 2E:
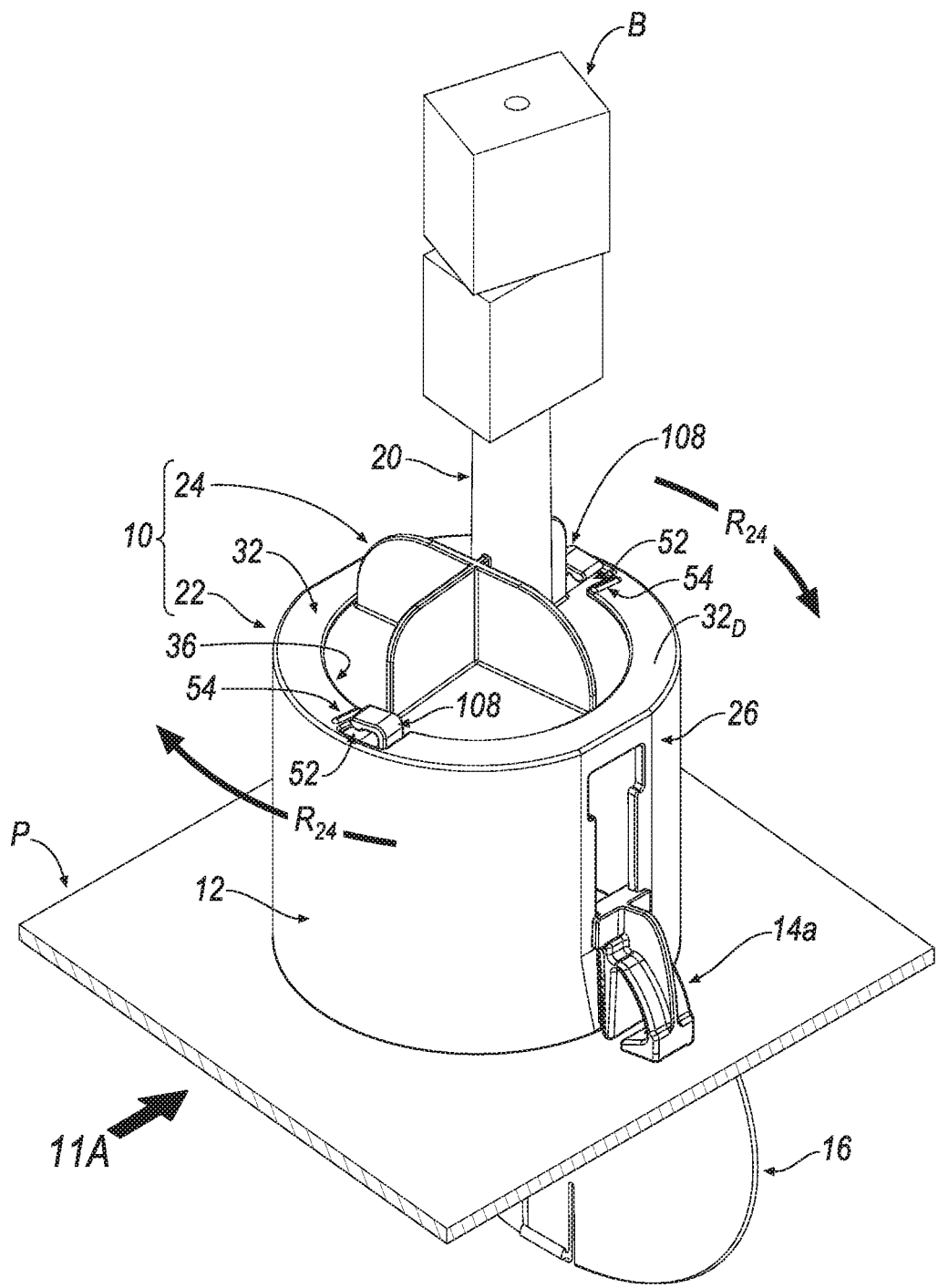
FIG. 2E is a further partially assembled perspective view of the bait station of FIG. 2D.

As seen in FIG. 4, the inwardly-extending lip portion 32 defines a distal opening 36 that is axially-aligned with and is in fluid communication with the axial passage 28. As seen in FIGS. 2D-2E, the distal opening 36 is sized for permitting a portion of the second bait station subassembly 24 to extend out of the axial passage 28 and beyond the distal end $26_D$ of the substantially cylindrical body 26.

Figure 10A:
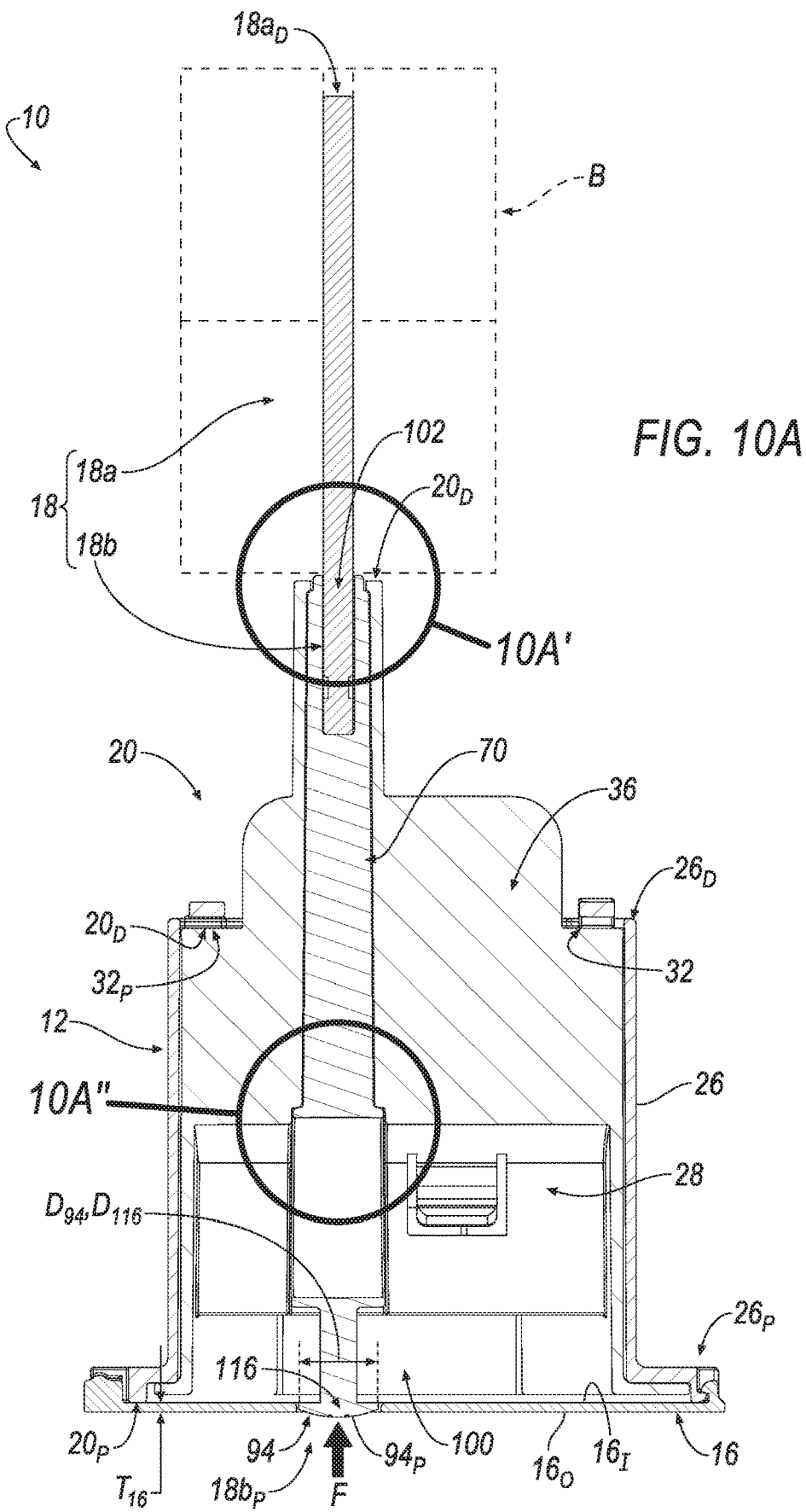
FIG. 10A is a cross-sectional view of the bait station according to line 10A-10A of FIG. 2G.
Figure 10B:
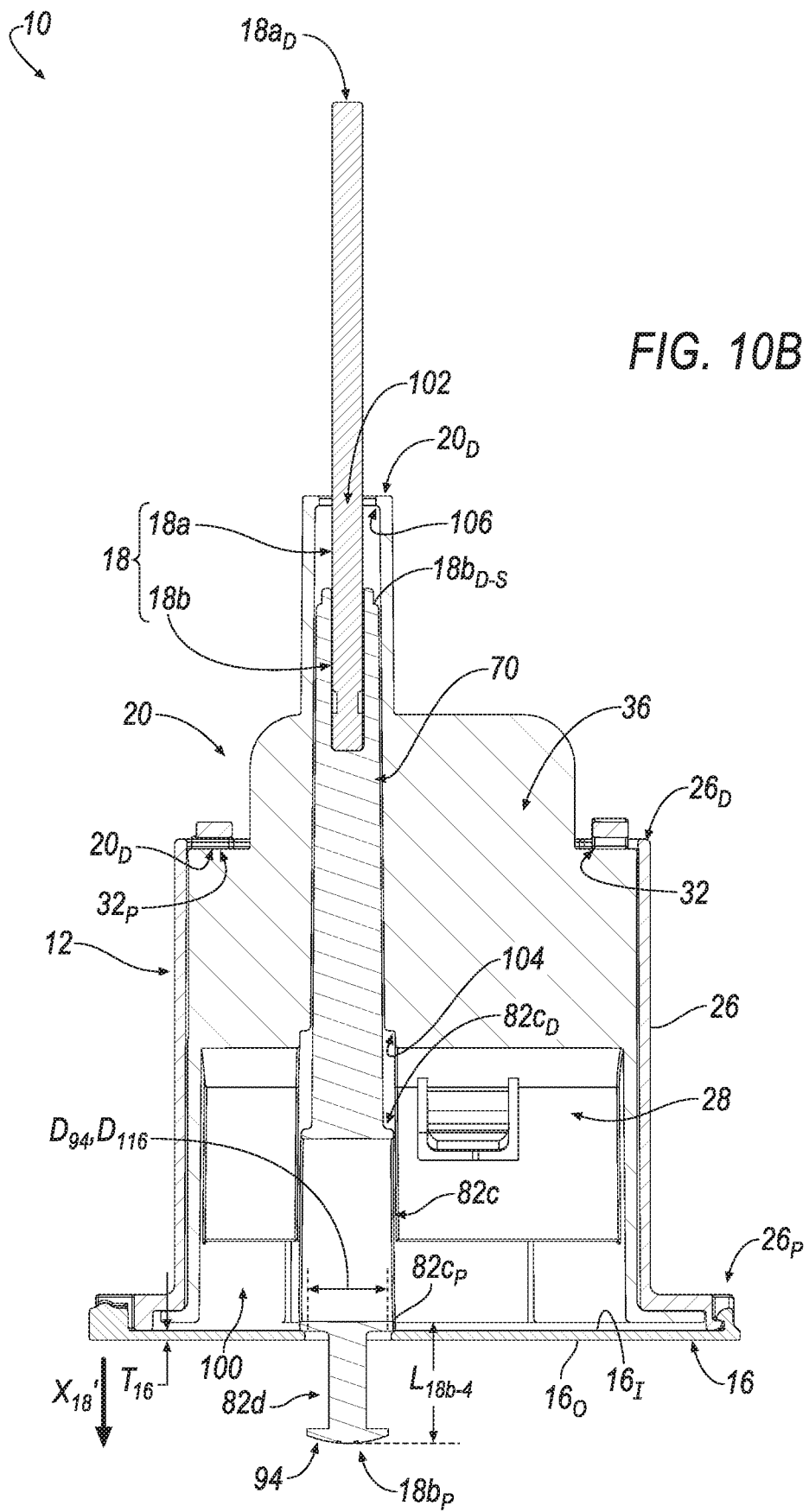
FIG. 10B is a cross-sectional view of the bait station according to line 10B-10B of FIG. 3B.
Figure 10A:
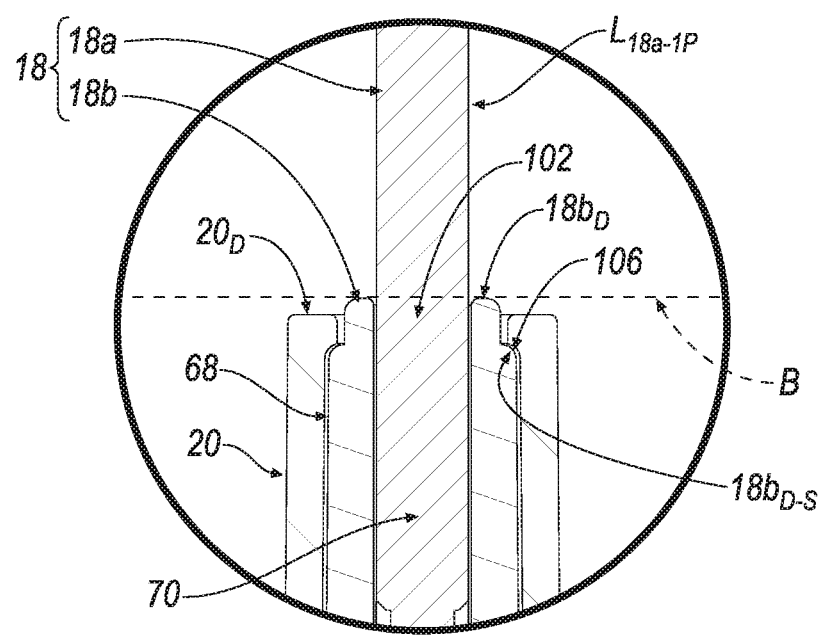
Figure 10A:
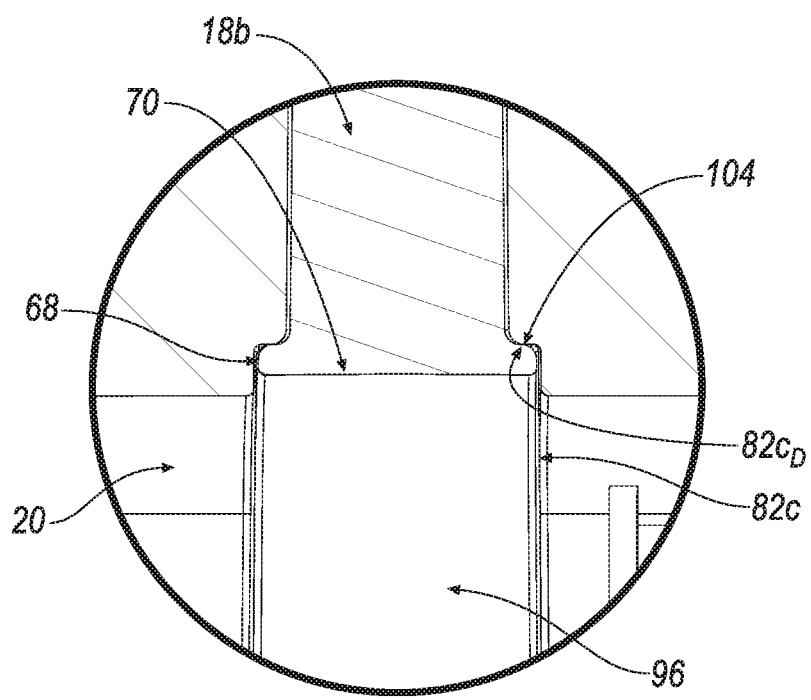

As seen in FIGS. 10A-10B and will be described in the following disclosure, the proximal end $26_P$ of the substantially cylindrical body 26 defines a proximal opening 100 that is axially-aligned with and is in fluid communication with the axial passage 28. Although the proximal opening 100 is not seen in FIGS. 2D-2E, the proximal opening 100 is sized for permitting insertion (according to the direction of arrow $X_{24}$ as seen in FIG. 2D) of the second bait station subassembly 24 into the axial passage 28 of the housing 12 whereby a portion of the second bait station subassembly 24 does not extend beyond the distal end $26_D$ of the substantially cylindrical body 26 by way of the distal opening 36 (as seen in FIG. 2E whereby this portion of the second bait station subassembly 24 is contained within the axial passage 28 of the housing 12 after being axially inserted $X_{24}$ through proximal opening 100).

With reference to FIG. 4, the outer surface $26_O$ of the substantially cylindrical body 26 is further defined by at least one row of ridges 40 that is axially aligned with the at least one radial passage 34. The at least one row of ridges 40 includes a plurality of ridges $40_1$-$40_n$ defined by a distal ridge $40_1$, a proximal ridge $40_n$ and a plurality of intermediate ridges $40_2$-$40_{n-1}$. Each ridge of the plurality of ridges $40_1$-$40_n$ may be defined by a body having a substantially triangular cross-section having a ramp surface and a latching surface. In some instances, as seen, for example at FIGS. 6A-6C, the at least one row of ridges 40 contributes to as a one-way fastening feature of the bait station 10 whereby the at least one panel-engaging member 14 is not permitted to be moved in a direction opposite the arrow $X_{14}'$ after the at least one panel-engaging member 14 is moved from the distal end $26_D$ of the substantially cylindrical body 26 of the housing 12 toward the proximal end $26_P$ of the substantially cylindrical body 26 of the housing 12 for securing the housing 12 to the panel P.

With continued reference to FIG. 4, the outwardly-extending lip portion 30 is further defined by a distal surface $30_D$, a proximal surface $30_P$ and a side surface $30_S$ connecting the distal surface $30_D$ to the proximal surface $30_P$. As seen in FIG. 4, one or more of the distal surface $30_D$, the proximal surface $30_P$ and the side surface $30_S$ defines one or more passages, slots, grooves, recesses, channels or projections 42-50 that provide a variety of associated functions.

Figure 6A:
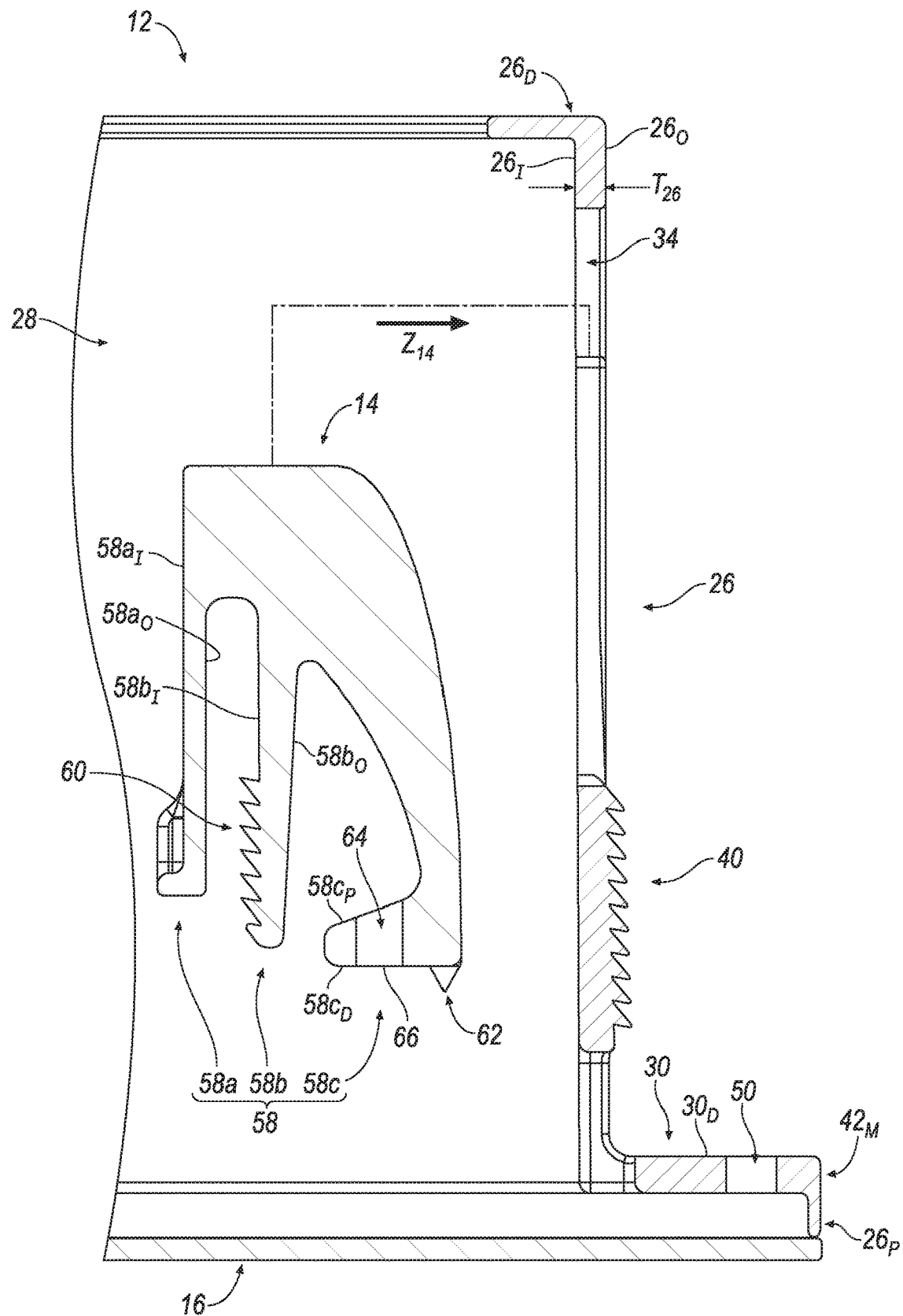
FIG. 6A is a cross-sectional view of the housing and the panel-engaging member of FIGS. 4-5B according to line 6A-6A of FIG. 2B.
Figure 6B:
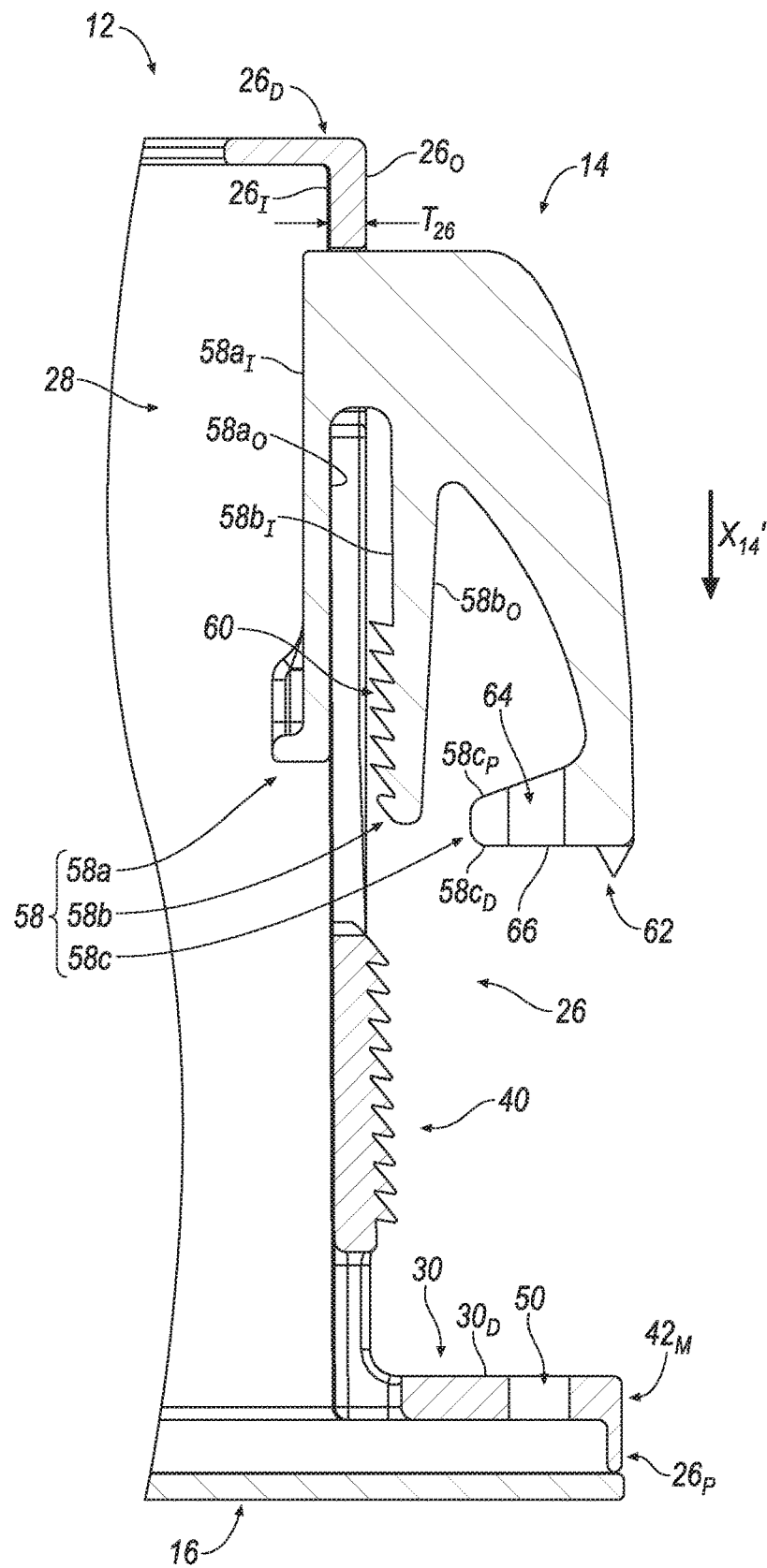
FIG. 6B is a cross-sectional view of the housing and the panel-engaging member of FIGS. 4-5B according to line 6B-6B of FIG. 2C.
Figure 6C:
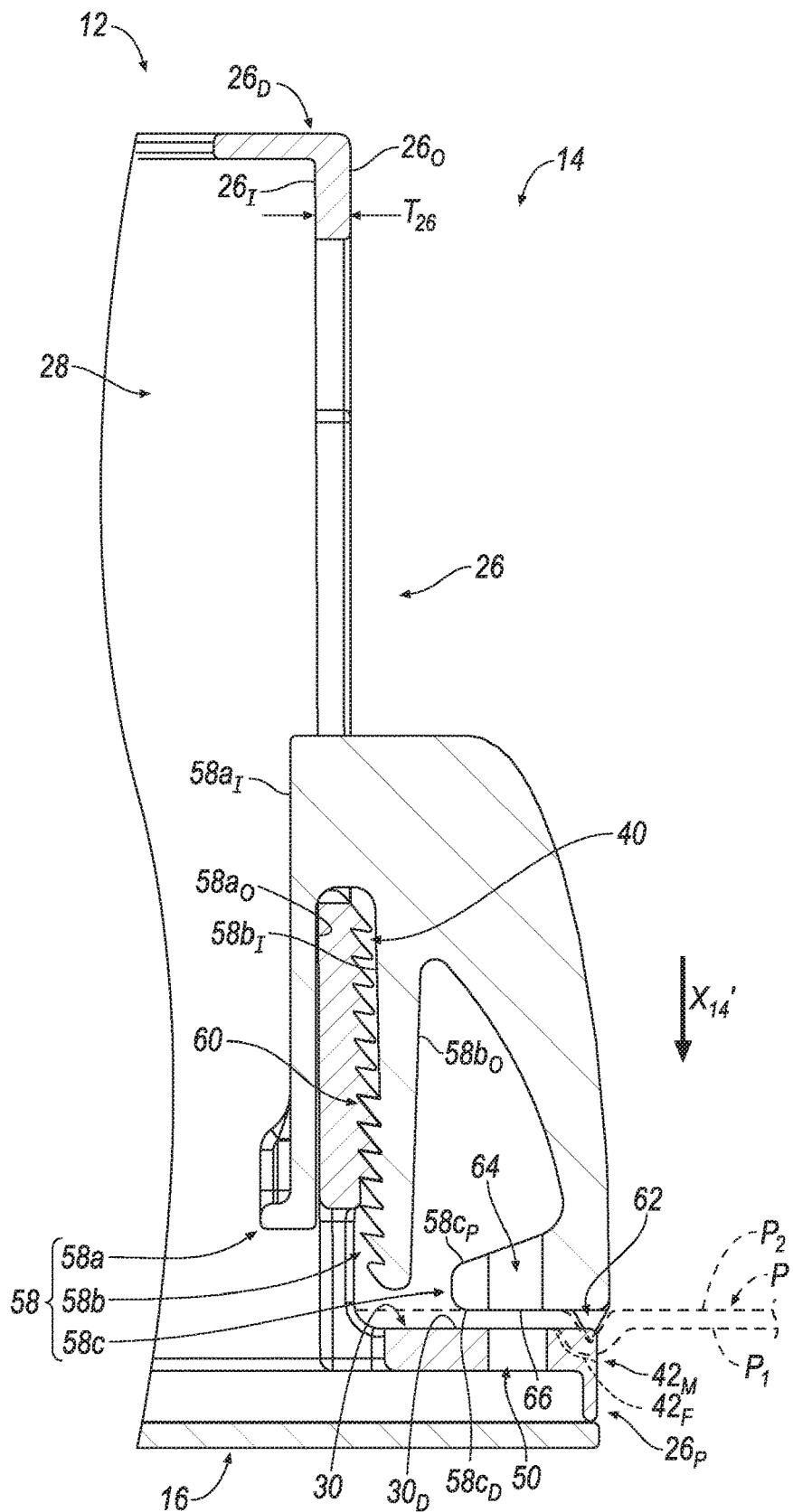
FIG. 6C is a cross-sectional view of the housing and the panel-engaging member of FIGS. 4-5B according to line 6C-6C of FIG. 2D.

In an example, the distal surface $30_D$ and the side surface $30_S$ of the outwardly-extending lip portion 30 forms one or more male portions (see, e.g., $42_M$), one or more female portions (see, e.g., $42_F$) or male-and-female portions 42 that is/are sized for receiving (as seen in FIG. 6C) one or more portions of the at least one panel-engaging member 14 in response to the at least one panel-engaging member 14 being moved $X_{14}'$ from the distal end $26_D$ of the substantially cylindrical body 26 of the housing 12 toward the proximal end $26_P$ of the substantially cylindrical body 26 of the housing 12. In another example, the distal surface $30_D$, the proximal surface $30_P$ and the side surface $30_S$ may also form a hinge groove 44 (see, e.g., FIG. 2A) and a snap-fit channel 46 that are respectively sized for receiving a hinge $16_H$ (see, e.g., FIG. 2A) of the lid member 16 and a snap-fit flange $16_F$ (see, e.g., FIG. 2A) of the lid member 16 in order to permit the lid member 16 to be hingedly-connected $R_{16}$ (see, e.g., FIG. 2F) to the housing 12 and selectively-retained to the housing 12 in a closed orientation (as seen in, e.g., FIG. 2G). In yet another example as seen in FIG. 4, the distal surface $30_D$ and the proximal surface $30_P$ may respectively define one or more openings 48 providing access to one or more optional axial passages 50 that is/are sized for receiving a screw or bolt (not shown) for securing the housing 12 to the panel P.

With continued reference to FIG. 4, the inwardly-extending lip portion 32 is further defined by a distal surface $32_D$, a proximal surface $32_P$ and a side surface $32_S$ connecting the distal surface $32_D$ to the proximal surface $32_P$. As seen in FIG. 4, one or more of the distal surface $32_D$, the proximal surface $32_P$ and the side surface $32_S$ defines one or more passages, slots, grooves, recesses, channels or projections 52-54 that provide a variety of associated functions.

In an example, the distal surface $32_D$, the proximal surface $32_P$ and the side surface $32_S$ of the inwardly-extending lip portion 32 forms one or more slots 52 that are sized for receiving one or more portions of the second bait station subassembly 24 in response to the second bait station subassembly 24 being moved $X_{24}$ (see, e.g., FIG. 2D) from the proximal end $26_P$ of the substantially cylindrical body 26 of the housing 12 toward the distal end $26_D$ of the substantially cylindrical body 26 of the housing 12. In another example, the distal surface $32_D$ defines at least one projection 54 located proximate the one or more slots 52 for selectively-retaining the one or more portions of the second bait station subassembly 24 passed through the one or more slots 52 in response to rotating $R_{24}$ (see, e.g., FIG. 2E) the second bait station subassembly 24 relative to the housing 12.

Figure 5A:
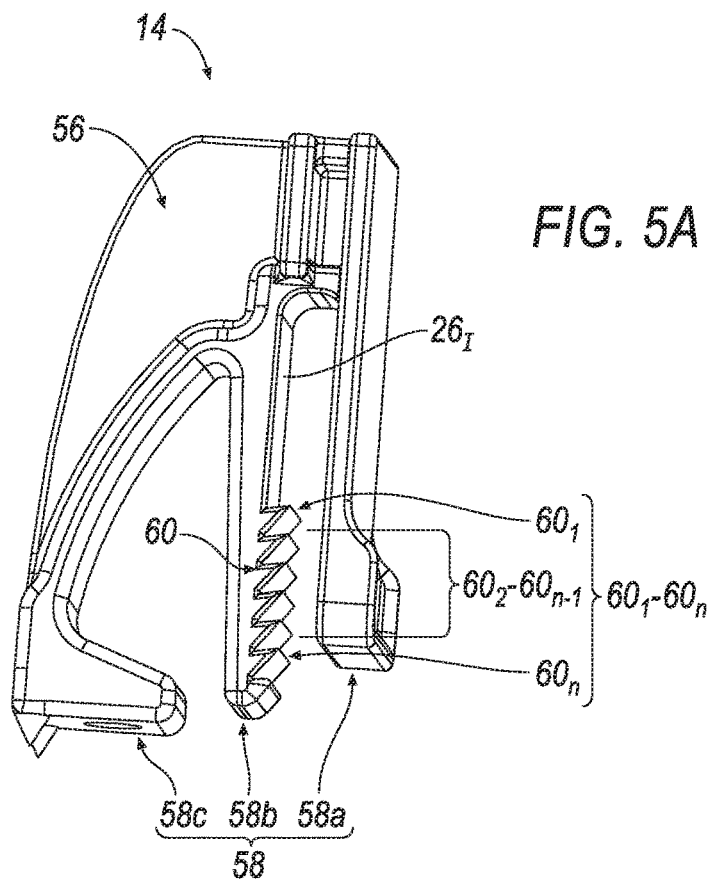
FIG. 5A is a lower perspective view of a panel-engaging member of the bait station of FIGS. 1A-1G.
Figure 5B:
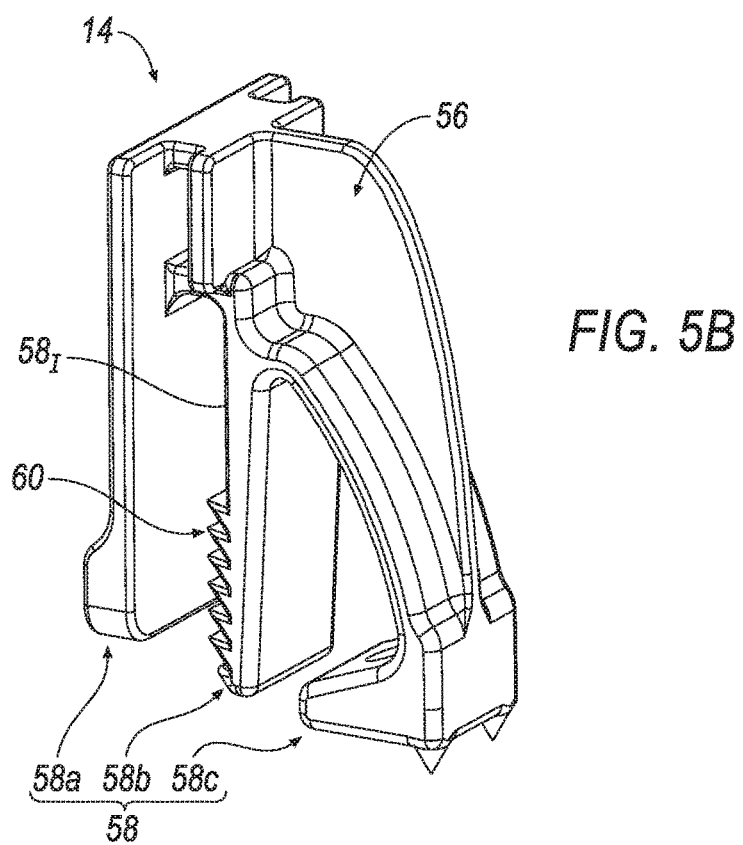
FIG. 5B is an upper perspective view of a panel-engaging member of the bait station of FIGS. 1A-1G.

With reference to FIGS. 5A-5B, the at least one panel-engaging member 14 includes a base portion 56 and a plurality of flange portions 58 extending away from the base portion 56. In an example, the plurality of flange portions 58 includes a first flange portion 58a, a second flange portion 58b and a third flange portion 58c that are sized for being interfaced with the housing 12.

In an example, the first flange portion 58a and the second flange portion 58b are sized for engagement with the substantially cylindrical body 26 of the housing 12 relative to the at least one radial passage 34 formed by the substantially cylindrical body 26 of the housing 12. In another example, the third flange portion 58c is sized for engagement with the outwardly-extending lip portion 30 extending from the outer surface $26_O$ of the substantially cylindrical body 26 of the housing 12.

In an example as seen in FIGS. 6A-6B, the at least one panel-engaging member 14 is connected to the substantially cylindrical body 26 of the housing by initially arranging the at least one panel-engaging member 14 within the passage 28 of the substantially cylindrical body 26 of the housing 12 and then radially passing (see, e.g., arrow $Z_{14}$ in FIG. 6A) the at least one panel-engaging member 14 through the at least one radial passage 34 formed by the substantially cylindrical body 26 of the housing 12. As seen in FIGS. 6B-6C, the second flange portion 58b and the third flange portion 58c are sized for being inserted through the at least one radial passage 34 formed by the substantially cylindrical body 26 of the housing 12 such that the second flange portion 58b and the third flange portion 58c are disposed outside of the axial passage 28 extending through the substantially cylindrical body 26 of the housing 12 while the first flange portion 58a remains within the passage 28 of the substantially cylindrical body 26 of the housing 12.

With reference to FIGS. 6A-6C, the first flange portion 58a may be defined by an inner surface $58a_I$ and an outer surface $58a_O$. After arranging the second flange portion 58b and the third flange portion 58c outside of the axial passage 28 and sliding $X_{14}'$ the at least one panel-engaging member 14 relative to the housing 12 from the distal end $26_D$ of the substantially cylindrical body 26 of the housing 12 toward the proximal end $26_P$ of the substantially cylindrical body 26 of the housing 12, the outer surface $58a_O$ of the first flange portion 58a may be disposed adjacent or opposite the inner surface $26_I$ of the substantially cylindrical body 26 of the housing 12 for radially-retaining the at least one panel-engaging member 14 to the housing 12.

As seen in FIGS. 6A-6C, the second flange portion 58b is sized for being disposed adjacent the outer surface $26_O$ of the substantially cylindrical body 26 of the housing 12. The second flange portion 58b may be defined by an inner surface $58b_I$ and an outer surface $58b_O$.

As seen in FIGS. 5A-5B, the inner surface $58b_I$ of the second flange portion 58b is defined by a row of ridges 60. The row of ridges 60 includes a plurality of ridges $60_1$-$60_n$ defined by a distal ridge $60_1$, a proximal ridge $60_n$ and a plurality of intermediate ridges $60_2$-$60_{n-1}$. Each ridge of the plurality of ridges $60_1$-$60_n$ may be defined by a body having a substantially triangular cross-section having a ramp surface and a latching surface.

As seen in FIGS. 6B-6C, when the at least one panel-engaging member 14 is slid $X_{14}'$ relative to the housing 12 from the distal end $26_D$ of the substantially cylindrical body 26 of the housing 12 toward the proximal end $26_P$ of the substantially cylindrical body 26 of the housing 12, the row of ridges 60 formed by the inner surface $58b_I$ of the second flange portion 58b is progressively-interfaced with the row of ridges 40 formed by the outer surface $26_O$ of the substantially cylindrical body 26 of the housing 12 for one-way-fastening the at least one panel-engaging member 14 to the housing 12 for radially-retaining the at least one panel-engaging member 14 to the housing 12.

Figure 7:
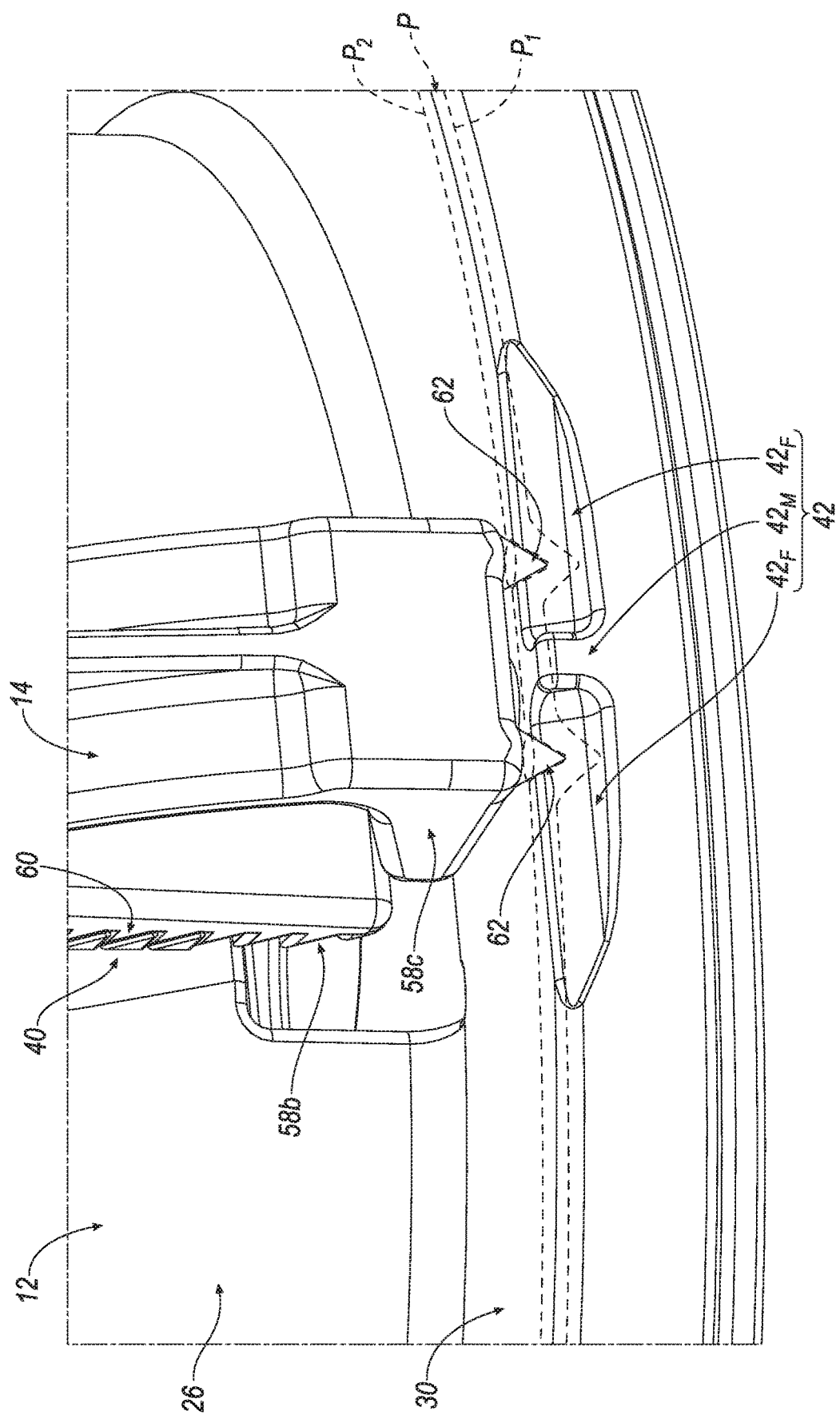
FIG. 7 is an enlarged perspective view of the housing and the panel-engaging member after arranging the panel-engaging member relative to the housing as seen in FIG. 6C

As seen in FIGS. 6C and 7, the third flange portion 58c is sized for being disposed adjacent and/or received by the one or more male portion $42_M$, the one or more female portion $42_F$ or the male-and-female portion 42 formed by distal surface $30_D$ and side surface $30_S$ of the outwardly-extending lip portion 30 extending from the outer surface $26_O$ of the substantially cylindrical body 26 of the housing 12. The third flange portion 58c may be defined by a distal surface $58c_D$ and a proximal surface $58c_P$. The distal surface $58c_D$ of the third flange portion 58c is defined by one or more barbs 62 that is/are sized for being received by the one or more female portions $42_F$ formed by the formed by distal surface $30_D$ and the side surface $30_S$ of the outwardly-extending lip portion 30 extending from the housing 12 when the at least one panel-engaging member 14 is slid $X_{14}'$ relative to the housing 12 from the distal end $26_D$ of the substantially cylindrical body 26 of the housing 12 toward the proximal end $26_P$ of the substantially cylindrical body 26 of the housing 12. The third flange portion 58c may also define a passage 64 that is accessible by way of a distal opening 66 formed by the distal surface $58c_D$ of the third flange portion 58c. The distal opening 66 and passage 64 may be sized for receiving the one or more male portions $42_M$ formed by the formed by distal surface $30_D$ of the outwardly-extending lip portion 30 extending from the housing 12 when the at least one panel-engaging member 14 is slid $X_{14}'$ relative to the housing 12 from the distal end $26_D$ of the substantially cylindrical body 26 of the housing 12 toward the proximal end $26_P$ of the substantially cylindrical body 26 of the housing 12.

With reference to FIG. 2B, prior to slidably-joining the at least one panel-engaging member 14 to the housing 12 as described above, the housing 12 is firstly axially-inserting through a passage $P_P$ formed by the panel P according to the direction of the arrow $X_{12}$. Then, as seen in FIGS. 2A and 6A, while the user U urges the distal surface $30_D$ of the outwardly-extending lip portion 30 of the housing 12 toward the "A-surface" side $P_1$ of the panel P, with one hand, the user locates the at least one panel-engaging member 14 within the axial passage 28 of the housing 12 and inserts the second flange portion 58b and the third flange portion 58c through the at least one radial passage 34 from the inner surface $26_I$ of the substantially cylindrical body 26 toward the outer surface $26_O$ of the substantially cylindrical body 26 according to the direction of arrow $Z_{14}$ (see, e.g., FIG. 6A). Thereafter, as discussed above and as seen in FIGS. 2C-2D, the at least one panel-engaging member 14 may be slid downwardly according to the direction of arrow $X_{14}'$ for attaching the at least one panel-engaging member 14 to the housing 12.

As seen in FIGS. 6C and 7, in response to sliding $X_{14}'$ the at least one panel-engaging member 14 relative to the housing 12 as described above, the one or more male portion $42_M$ of the outwardly-extending lip portion 30 and the one or more barbs 62 of the third flange portion 58c may engage, sandwich or bite-into the panel P for axially securing the housing 12 to the panel P as seen in FIG. 2D. More particularly, as seen in FIG. 7, the one or more barbs 62 may engage or bite-into the "B-surface" side $P_2$ of the panel P as the male portion $42_M$ of the outwardly-extending lip portion 30 may engage or bite-into the "A-surface" side $P_1$ of the panel P. In an example, when the male portion $42_M$ of the outwardly-extending lip portion 30 engages or bites-into the "A-surface" side $P_1$ of the panel P, the portion $42_M$ of the outwardly-extending lip portion 30 may urge a portion of the panel P into the proximal opening 66 formed by the distal surface $58c_D$ of the third flange portion 58c and into the passage of the third flange portion 58c.

As seen in FIG. 7, the male portion $42_M$ of the outwardly-extending lip portion 30 may be located between a pair of barbs 62 of the third flange portion 58c of the at least one panel-engaging member 14. Furthermore, as seen in FIG. 7, the distal surface $30_D$ of the outwardly-extending lip portion 30 extending from the housing 12 may be disposed adjacent the "A-surface" side $P_1$ of the panel P. As a result of the structure associated with at least one panel-engaging member 14 and the outwardly-extending lip portion 30 (described above) "sandwiching" or biting-into the panel P, an "anti-rotation" feature of the bait station 10 is provided whereby the rotation of the housing 12 relative to the panel P is mitigated or prevented.

Referring to FIGS. 1A-1G and 2A, the second bait station subassembly 24 includes a bait spike 18 and a bait spike retainer 20. With reference to FIG. 2A, the bait spike retainer 20 includes an inner surface 68 defining a passage 70 that is sized for receiving the bait spike 18 according to the direction of arrow $X_{18}$ from a proximal end $20_P$ of the bait spike retainer 20 to a distal end $20_D$ of the bait spike retainer 20.

Referring to FIG. 2B, after the bait spike 18 is disposed within the passage 70 formed by the bait spike retainer 20, the bait spike 18 is arranged in an axially free-floating relationship with respect to the bait spike retainer 20 along an axis $A_{70}$-$A_{70}$ extending through the passage 70 formed by the bait spike retainer 20. As will be described in the following disclosure (and with reference to FIGS. 2B-2C), the bait spike 18 may be axially fixed in place relative to the bait spike retainer 20 after joining bait B to the bait spike 18. Furthermore, as will also be described in the following disclosure (and with reference to FIGS. 3A-3B, 10A-10B and 12A-12B), after the bait B has been removed from the bait spike 18 (e.g., as a result of consumption or removal of bait B by a rodent R), the lid member 16 (when arranged in a closed orientation with respect to the housing 12) may prevent (as seen in FIGS. 10B and 12B) the bait spike 18 from being further advanced out of the passage 70 of the bait spike retainer 20 in a direction according to arrow $X_{18}'$ (see, e.g., FIG. 12B).

Figure 8A:
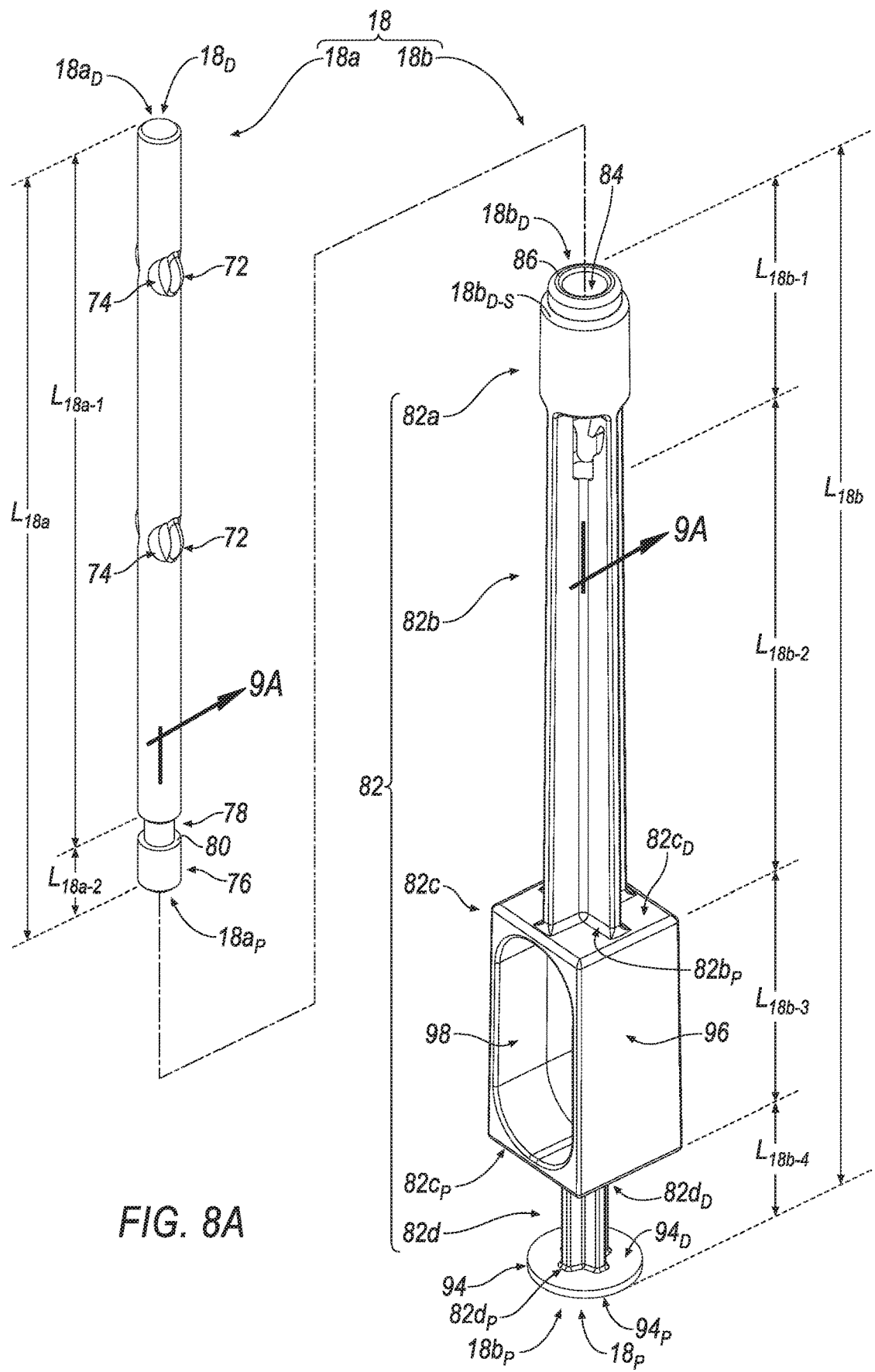
FIG. 8A is an exploded perspective view of a bait spike of the bait station of FIGS. 1A-1G.
Figure 8B:
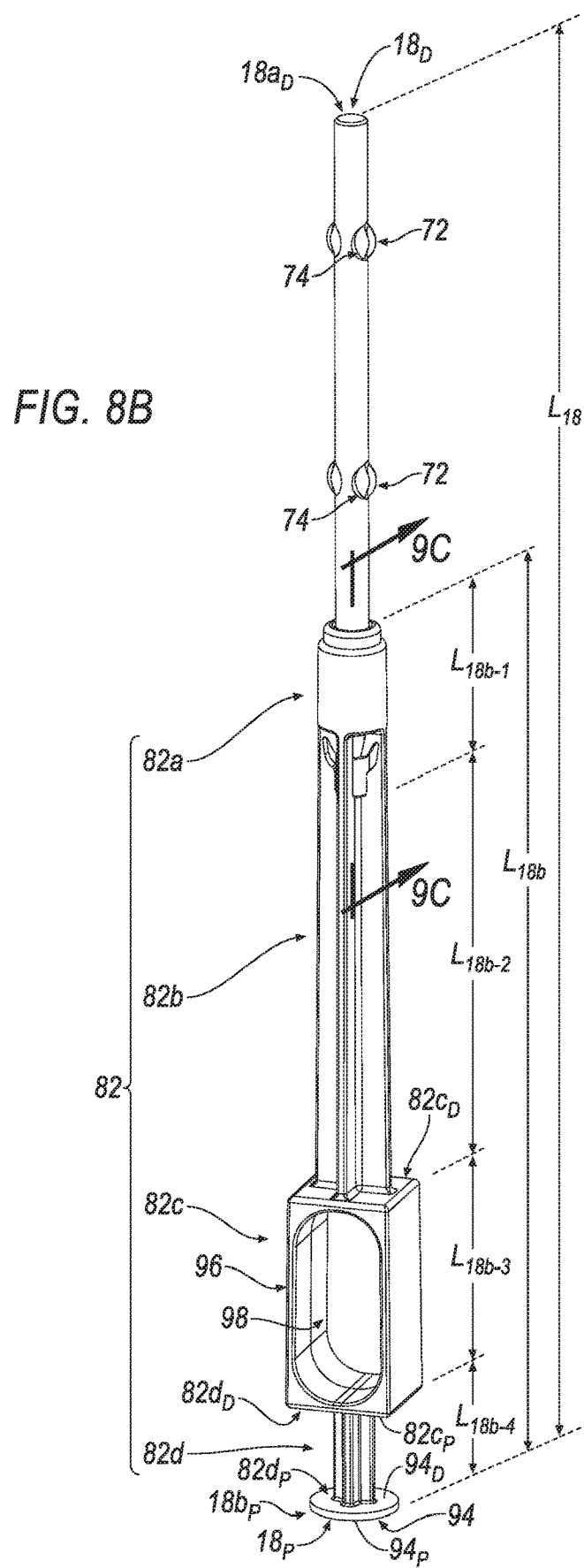
FIG. 8B is an assembled perspective view of the bait spike of FIG. 8A
Figure 9A:
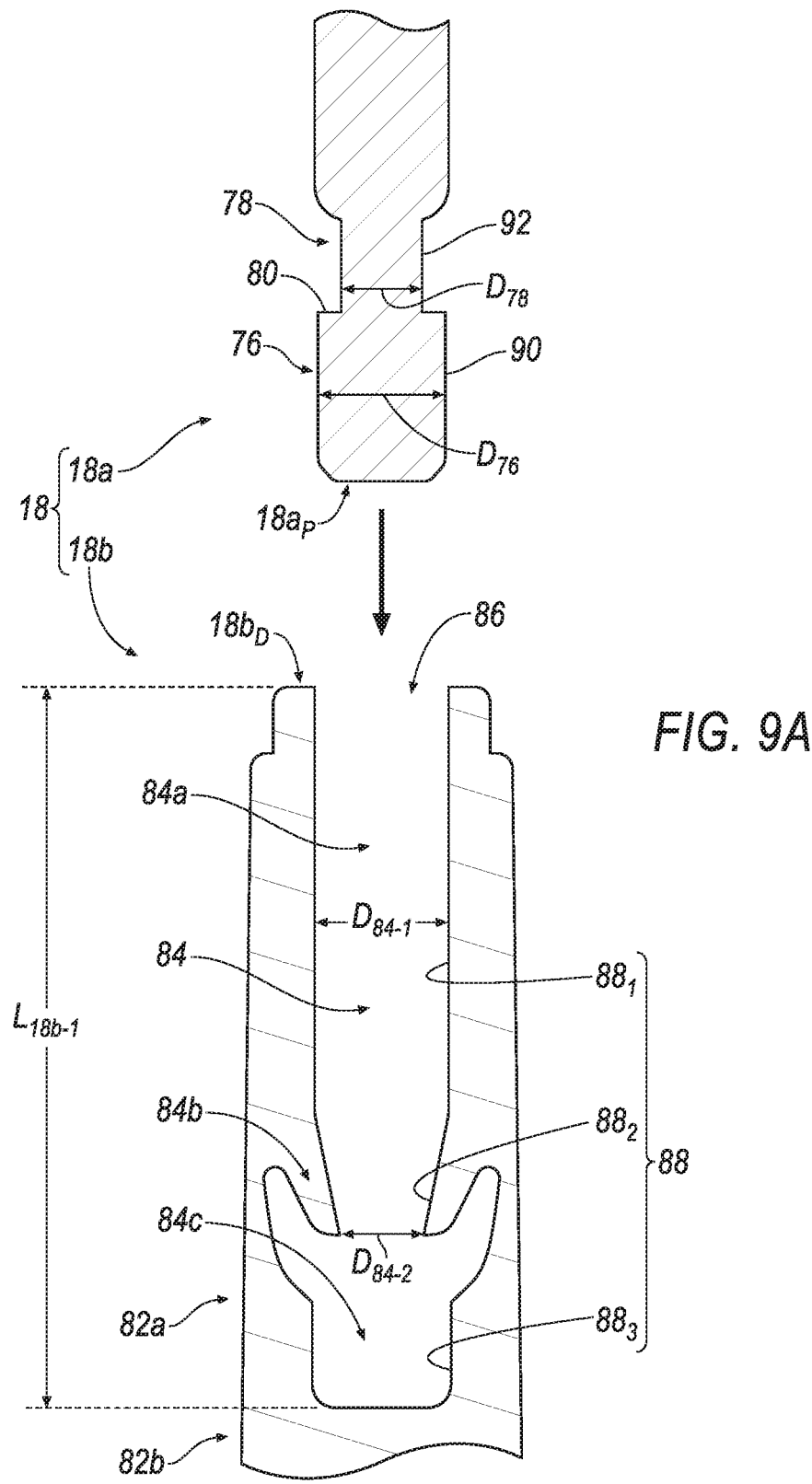
FIG. 9A is a cross-sectional view of the bait spike according to line 9A-9A of FIG. 8A.
Figure 9B:
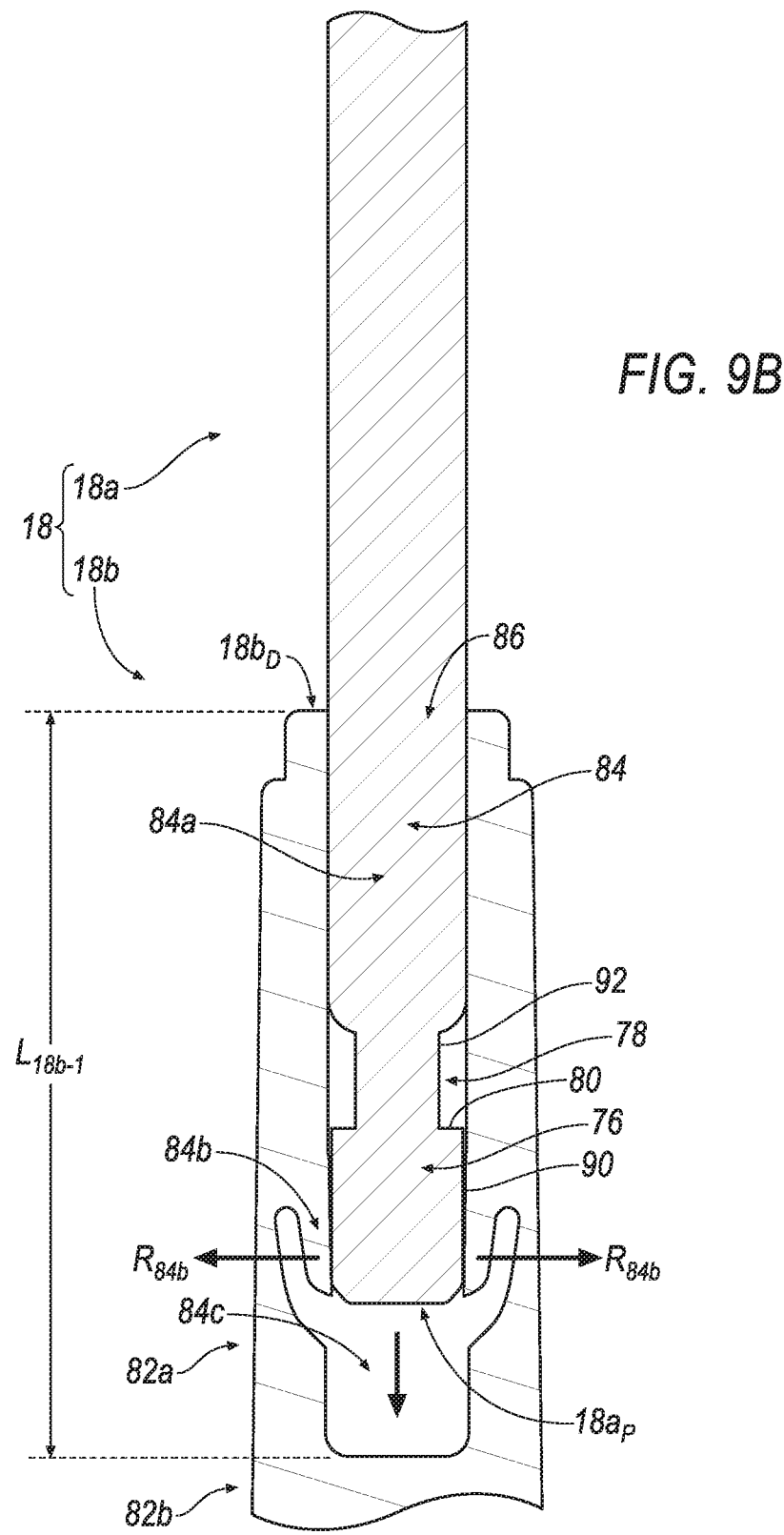
FIG. 9B is a cross-sectional view of the bait spike according FIG. 9A arranged in a partially assembled state.
Figure 9C:
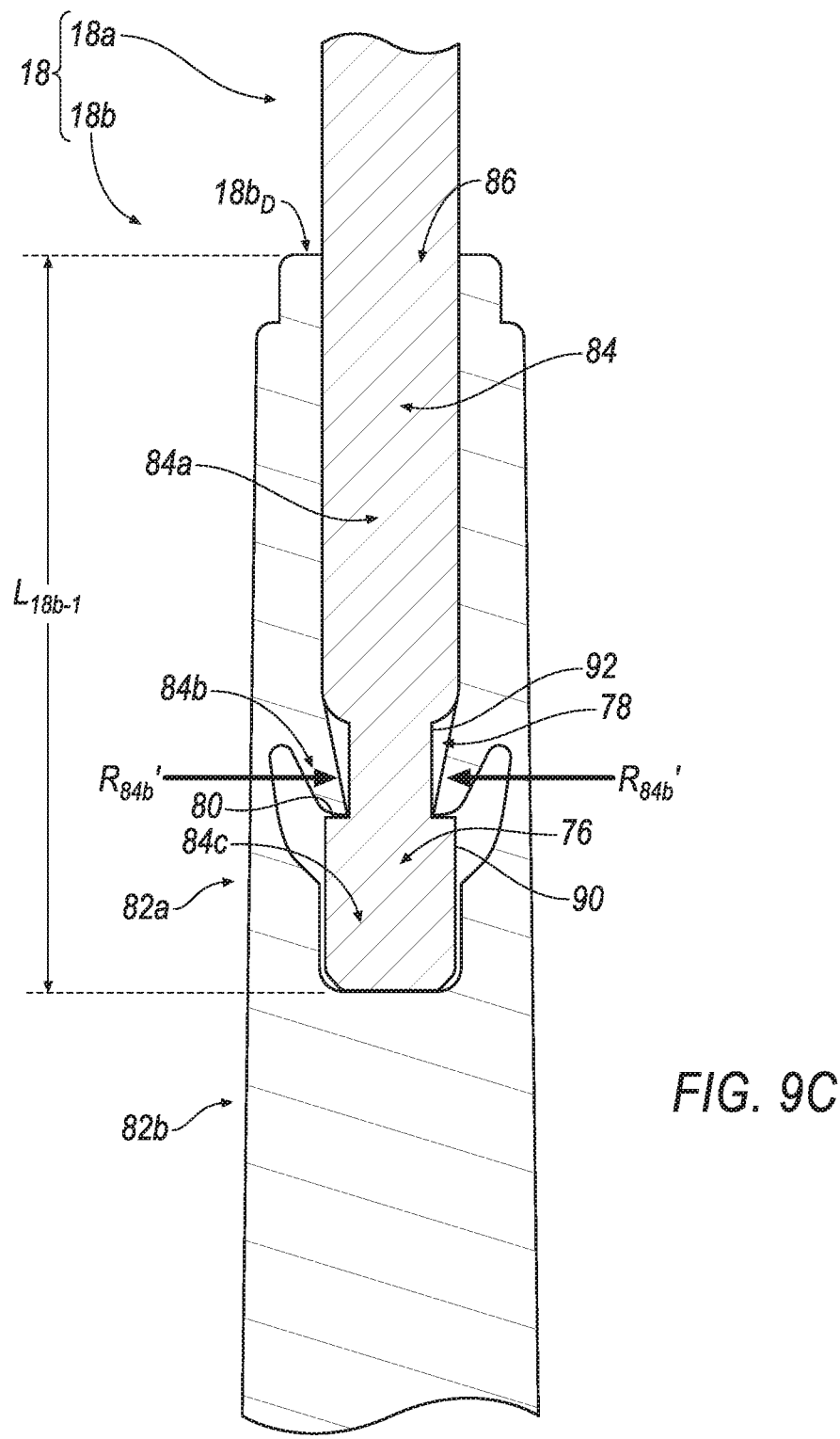
FIG. 9C is a cross-sectional view of the bait spike according to line 9C-9C of FIG. 8B.

Referring to FIGS. 8A-8B and 9A-9C, the bait spike 18 may be formed from an assembly including a bait-retaining portion 18a and a consumption-indicating portion 18b. As seen in FIGS. 9A-9C, a proximal end $18a_P$ of the bait-retaining portion 18a may be non-removably-coupled to a distal end $18b_D$ of the consumption-indicating portion 18b.

In an example, the bait-retaining portion 18a may be formed from a first material (e.g., metal) and the consumption-indicating portion 18b may be formed from a second material (e.g., plastic) that is different from the first material. Because at least some of the bait-retaining portion 18a may be accessed by a rodent R (as seen in, e.g., FIGS. 3A-3B), if, for example, the first material defining the bait-retaining portion 18a is a metallic material, the metallic material is less likely to be chewed, damaged or consumed by the rodent R, thereby potentially prolonging the life of the bait spike 18. Furthermore, use of a plastic material (rather than a metallic material) for the consumption-indicating portion 18b not only reduces the weight of the bait spike 18 in order to lessen an overall load imparted by the bait station 10 to the panel P but also reduces cost of the bait spike 18 due to the fact that plastic materials are typically cheaper than metallic materials.

Although the bait spike 18 is shown and described at FIGS. 8A-8B and 9A-9C to be a two-piece component defined by an assembly, the bait spike 18 may be formed as one-piece component derived from one material. Therefore, the bait spike 18 may be formed from, for example, a metallic material, alone, or a plastic material, alone.

Referring to FIG. 8A, a first portion $L_{18a-1}$ of a length $L_{18a}$ of the bait-retaining portion 18a of the bait spike 18 extending from a distal end $18a_D$ of the bait-retaining portion 18a toward the proximal end $18a_P$ of the bait-retaining portion 18a may be formed to define one or more protrusions 72, recesses 74 and the like in order to frictionally-retain bait B to the bait-retaining portion 18a of the bait spike 18, which may, among other functions, prevent the bait B from rotating about the bait-retaining portion 18a of the bait spike 18. A second portion $L_{18a-2}$ of the length $L_{18a}$ of the bait-retaining portion 18a of the bait spike 18 extending from the proximal end $18a_P$ of the bait-retaining portion 18a toward the distal end $18a_D$ of the bait-retaining portion 18a may be formed to define an attachment head 76 and an attachment neck 78 that may be interfaced with the distal end $18b_D$ of the consumption-indicating portion 18b. A shoulder surface 80 may join the attachment head 76 to the attachment neck 78.

With reference to FIG. 8A, the consumption-indicating portion 18b is defined by a stem body 82 including: a first stem portion 82a extending along a first portion $L_{18b-1}$ of a length $L_{18b}$ of the consumption-indicating portion 18b, a second stem portion 82b extending along a second portion $L_{18b-2}$ of the length $L_{18b}$ of the consumption-indicating portion 18b, a third stem portion 82c extending along a third portion $L_{18b-3}$ of the length $L_{18b}$ of the consumption-indicating portion 18b and a fourth stem portion 82d extending along a fourth portion $L_{18b-4}$ of the length $L_{18b}$ of the consumption-indicating portion 18b. The first stem portion 82a extends from the distal end $18b_D$ of the consumption-indicating portion 18b toward a proximal end $18b_P$ of the consumption-indicating portion 18b. The fourth stem portion 82d extends from the proximal end $18b_P$ of the consumption-indicating portion 18b toward the distal end $18b_D$ of the consumption-indicating portion 18b. The second stem portion 82b extends from the first stem portion 82a. The third stem portion 82c extends from the fourth stem portion 82d. The second stem portion 82b is connected to the third stem portion 82c.

With reference to FIGS. 8A and 9A, the first stem portion 82a defines an attachment bore 84. Access to the attachment bore 84 is permitted by an opening 86 formed by the distal end $18b_D$ of the consumption-indicating portion 18b.

As seen in FIG. 9A, the attachment bore 84 is defined by an inner surface 88. A first portion $88_1$ of the inner surface 88 defines a passage portion 84a of the attachment bore 84 extending from the distal end $18b_D$ of the consumption-indicating portion 18b. A second portion $88_2$ of the inner surface 88 defines a one or more flexible fingers 84b extending radially into the attachment bore 84. A third portion 88₃ of the inner surface 88 defines a head-receiving pocket 84c of the attachment bore 84. The one or more flexible fingers 84b is/are arranged between the passage portion 84a and the head-receiving pocket 84c.

With continued reference to FIG. 9A, the attachment head 76 of the bait-retaining portion 18a is defined by an outer surface 90. The outer surface 90 defines the attachment head 76 of the bait-retaining portion 18a to have a diameter $D_{76}$. Furthermore, the attachment neck 78 of the bait-retaining portion 18a is defined by an outer surface 92. The outer surface 92 defines the attachment neck 78 of the bait-retaining portion 18a to have a diameter $D_{78}$. The diameter $D_{78}$ of the attachment neck 78 is less than the diameter $D_{76}$ of the attachment head 76.

With continued reference to FIG. 9A, the attachment bore 84 is defined by a first bore diameter $D_{84-1}$ and a second bore diameter $D_{84-2}$. The first bore diameter $D_{84-1}$ of the attachment bore 84 generally defines a diameter of the passage portion 84a and a diameter of the head-receiving pocket 84c. The second bore diameter $D_{84-2}$ of the attachment bore 84 generally defines a spacing diameter between a pair of opposing flexible fingers 84b defined by the second portion 88₂ of the inner surface 88.

The diameter $D_{76}$ of the attachment head 76 is about the same as but slightly less than the first bore diameter $D_{84-1}$ of the attachment bore 84, and the diameter $D_{76}$ of the attachment head 76 is greater than the second bore diameter $D_{84-2}$ of the attachment bore 84. The diameter $D_{78}$ of the attachment neck 78 is about the same as but slightly less than the second bore diameter $D_{84-2}$ of the attachment bore 84.

As seen in FIG. 9B, upon passing the attachment head 76 of the bait-retaining portion 18a through the opening 86 formed by the distal end 18b_D of the consumption-indicating portion 18b, the attachment head 76 is passed through the passage portion 84a for subsequent engagement with the pair of opposing flexible fingers 84b. Upon engaging the attachment head 76 with the pair of opposing flexible fingers 84b, the attachment head 76 flexes the pair of opposing flexible fingers 84b in a radially-outwardly direction according to arrow $R_{84b}$. As seen in FIG. 9C, after the attachment head 76 passes the pair of opposing flexible fingers 84b, the pair of opposing flexible fingers 84b flexes radially inwardly according to arrow $R_{84b}'$ back to an at-rest state whereby the pair of opposing flexible fingers 84b may be disposed adjacent at least the shoulder surface 80 and optionally the outer surface 92 of the attachment neck 78 for axially securing the bait-retaining portion 18a to the consumption-indicating portion 18b. Referring to FIG. 8B, once the bait-retaining portion 18a is attached to the consumption-indicating portion 18b as described above at FIGS. 9A-9C, the bait spike 18 may be defined by a length $L_{18}$ extending between the distal end 18a_D of the bait-retaining portion 18a (which may also be a distal end 18_D of the bait spike 18) and the proximal end 18b_P of the consumption-indicating portion 18b (which may also be a proximal end 18_P of the bait spike 18).

The proximal end 18b_P of the consumption-indicating portion 18b generally defines a button member 94. A proximal end 82d_P of the fourth stem portion 82d of the consumption-indicating portion 18b is connected to a distal end 94_D the button member 94. The fourth stem portion 82d of the consumption-indicating portion 18b is also defined by a distal end 82d_D. The distal end 82d_D of the fourth stem portion 82d of the consumption-indicating portion 18b is connected to a proximal end 82c_P of the third stem portion 82c of the consumption-indicating portion 18b. A distal end 82c_D of the third stem portion 82c of the consumption-indicating portion 18b is connected to a proximal end 82b_P of the second stem portion 82c of the consumption-indicating portion 18b.

The third stem portion 82c of the consumption-indicating portion 18b is defined by a tool interface portion 96. The tool interface portion 96 may also define a tool insertion passage 98 extending radially through the tool interface portion 96.

With reference to FIG. 2A, after the bait spike 18 is formed by non-removably-joining the bait-retaining portion 18a to the consumption-indicating portion 18b, the distal end 18a_O of the bait-retaining portion 18a is inserted into a proximal opening (not shown) of the bait spike retainer 20 that permits access to the passage 70 formed by the bait spike retainer 20 according to the direction of arrow $X_{18}$. Once arranged within the passage 70 formed by the bait spike retainer 20, the distal end 18a_D of the bait-retaining portion 18a is then advanced through the passage 70 from the proximal end 20_P of the bait spike retainer 20 to the distal end 20_D of the bait spike retainer 20 until the distal end 18a_D of the bait-retaining portion 18a extends out of a distal opening 102 (see, e.g., FIGS. 2A-2B, 10A) of the bait spike retainer 20 located at the distal end 20_D of the bait spike retainer 20. With reference to FIGS. 10A, 10A' and 10A", the bait spike 18 is advanced within the passage 70 according to the direction of arrow $X_{18}$ until: (1) as seen in FIG. 10A", the distal end 82c_D of the third stem portion 82c of the consumption-indicating portion 18b that defines the tool interface portion 96 engages a first shoulder surface 104 of the inner surface 68 that defines the passage 70 extending through the bait spike retainer 20 and (2) as seen in FIG. 10A', a shoulder surface 18b_{D-S} of the distal end 18b_D of the consumption-indicating portion 18b engages a second shoulder surface 106 of the inner surface 68 that defines the passage 70 extending through the bait spike retainer 20. Upon the consumption-indicating portion 18b engaging the first shoulder surface 104 and the second shoulder surfaced 106 of the inner surface 68 defining the passage 70 extending through the bait spike retainer 20 as described above, a portion $L_{18a-1P}$ (see, e.g. FIGS. 2B, 10A') of the first portion $L_{18a-1}$ of the length $L_{18a}$ of the bait-retaining portion 18a of the bait spike 18 extends out of the passage 70 and beyond distal opening 102 of the bait spike retainer 20 located at the distal end 20_D of the bait spike retainer 20.

As described above, the bait spike 18 is arranged in free-floating orientation with the passage 70 of the bait spike retainer 20. Therefore, during the course of joining the bait B to the bait-retaining portion 18a of the bait spike 18 according to the direction of the arrow $X_B$ as seen in FIG. 2B, a user may apply an opposing force F (see, e.g., FIGS. 2B and 10A) to the proximal end 94_P of the button member 94 in order to maintain the distal end 82c_D of the third stem portion 82c of the consumption-indicating portion 18b adjacent the first shoulder surface 104 of the inner surface 68 that defines the passage 70 extending through the bait spike retainer 20.

With reference to FIG. 2C, after the bait B has been joined to the bait-retaining portion 18a of the bait spike 18, the bait B secures the bait spike 18 to the bait spike retainer 20. When the bait B is secured to the bait spike 18, the user may no longer need to apply the force F, as the bait B is larger than the distal opening 102 of the bait spike retainer 20, and, therefore, the bait B rests upon the distal end 20_D of the bait spike retainer 20.

Thereafter, as seen in FIG. 2D, the second bait station subassembly 24 (including the bait B secured to the bait-retaining portion 18a of the bait spike 18 and resting upon the distal end $20_D$ of the bait spike retainer 20) is said to be prepared for axial insertion $X_{24}$ into the axial passage 28 of the housing 12. With reference to FIGS. 2E and 10A, after axially inserting $X_{24}$ the second bait station subassembly 24 into the axial passage 28 of the housing 12, a portion of the bait spike retainer 20 does not extend beyond the distal end $26_D$ of the substantially cylindrical body 26 of the housing 12 by way of the distal opening 36 (i.e., a portion of the bait spike retainer 20 is contained within the axial passage 28 of the housing 12). Insertion $X_{24}$ of the second bait station subassembly 24 into the axial passage 28 ceases when the distal shoulder surface $20_D$ (see also, e.g., FIG. 2C) of the bait spike retainer 20 engages or is disposed adjacent the proximal surface $32_P$ (see also, e.g., FIG. 10A) of the inwardly-extending lip portion 32 of the housing 12.

Figure 11A:
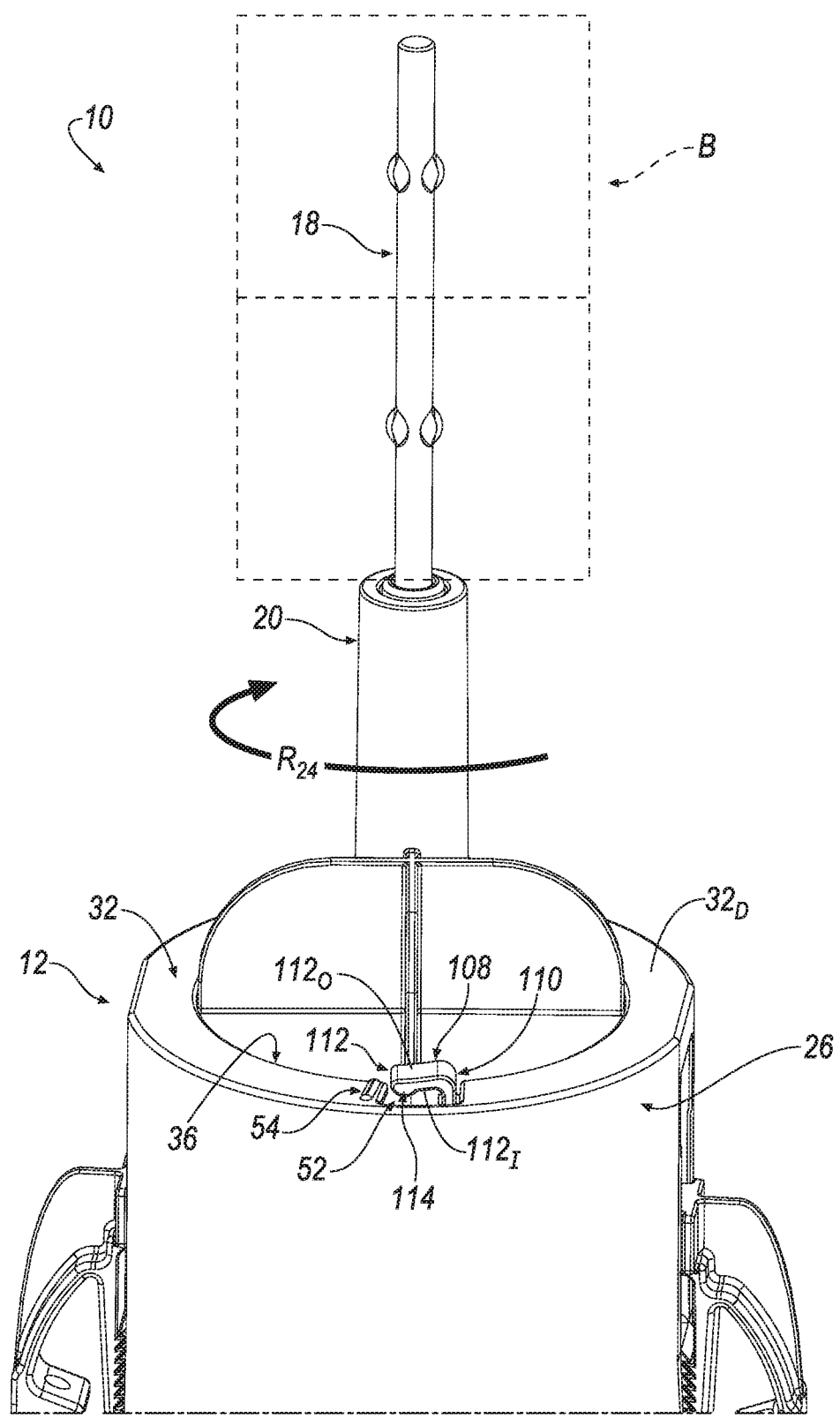
FIG. 11A is a portion of an upper perspective view of the bait station according to arrow 11A of FIG. 2E.

With reference to FIGS. 2D-2E, before or during the course of axially inserting $X_{24}$ the second bait station subassembly 24 into the axial passage 28 of the housing 12, one or more axial retainer fingers 108 extending from the distal shoulder surface $20_D$ of the bait spike retainer 20 are axially aligned with corresponding slots 52 formed by the inwardly-extending lip portion 32 of the housing 12. As seen in FIGS. 2E and 11A, the one or more axial retainer fingers 108 are sized for axial insertion through, and may be inserted through, the slots 52 formed by the inwardly-extending lip portion 32 of the housing 12. After the distal shoulder surface $20_D$ of the bait spike retainer 20 engages or is disposed adjacent the proximal surface $32_P$ of the inwardly-extending lip portion 32 of the housing 12, the one or more axial retainer fingers 108 are said to be fully passed through the slots 52 formed by the inwardly-extending lip portion 32 of the housing 12. Thereafter, as seen in FIGS. 2E and 11A, the second bait station subassembly 24 may be rotated $R_{24}$ relative to the housing 12.

Figure 11B:
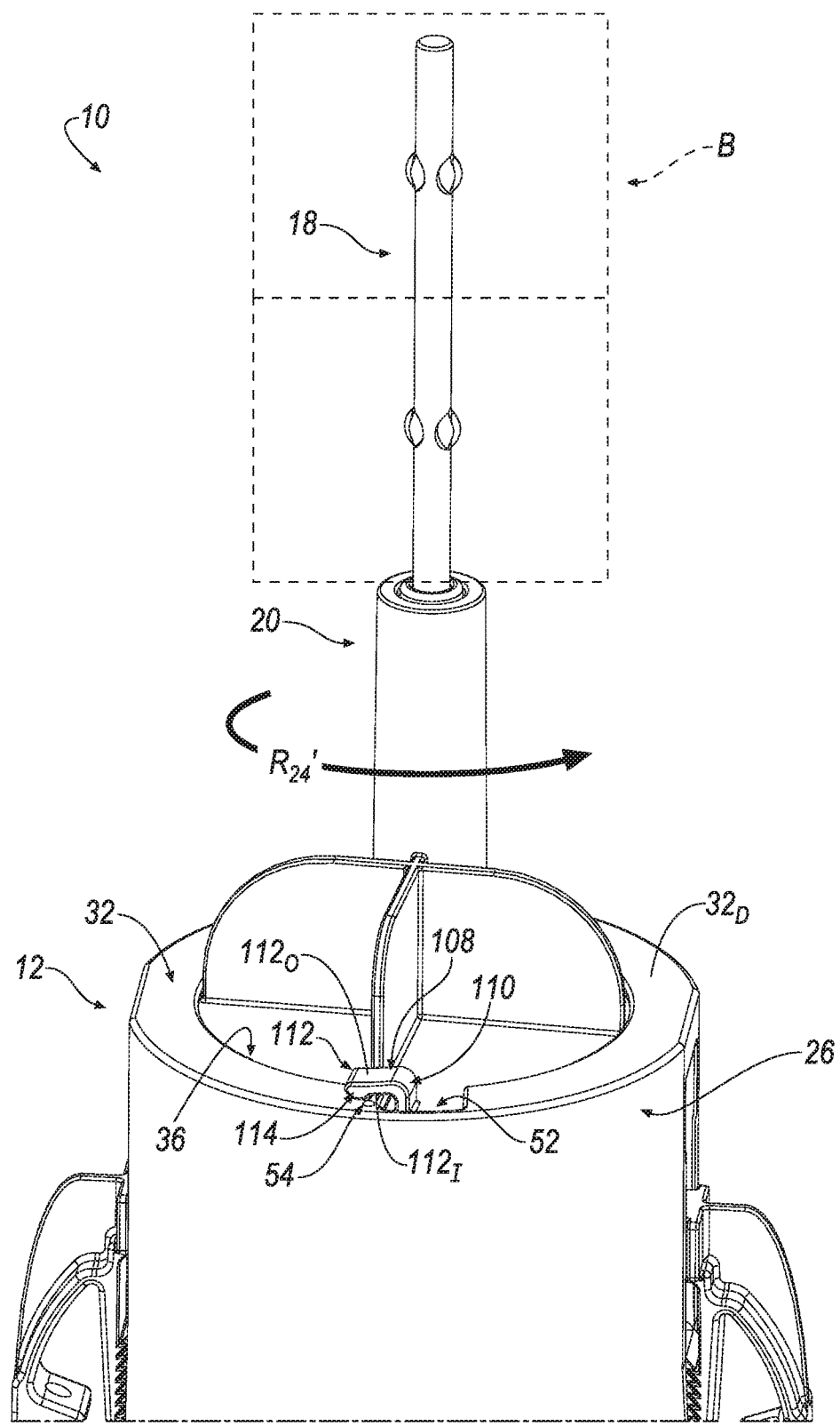
FIG. 11B is a portion of an upper perspective view of the bait station according to arrow 11B of FIG. 2F.

As seen in FIGS. 2E-2F and 11A-11B, rotation $R_{24}$ of the second bait station subassembly 24 relative to the housing 12 results in spatial displacement of the one or more axial retainer fingers 108 relative to the slots 52 formed by the inwardly-extending lip portion 32 of the housing 12. As seen in FIGS. 11A-11B, the one or more axial retainer fingers 108 may be defined by a substantially L-shaped body 110 having a terminal end 112. The terminal end 112 of the substantially L-shaped body 110 may be defined by an inner surface $112_I$ and an outer surface $112_O$. The inner surface $112_I$ may be defined by a projection 114.

After rotation $R_{24}$ of the second bait station subassembly 24 relative to the housing 12, the projection 114 of the terminal end 112 of the substantially L-shaped body 110 of each axial retainer finger 108 may be temporality flexed upwardly and then subsequently slides past the projection 54 formed by the distal surface $32_D$ of the inwardly-extending lip portion 32 of the housing 12 that is arranged proximate the corresponding slot 52. After each axial retainer finger 108 is slid past the each corresponding projection 54 of the inwardly-extending lip portion 32 of the housing 12, each projection 54 of the inwardly-extending lip portion 32 of the housing 12 may inhibit but not entirely prevent rotation $R_{24}'$ (see, e.g., FIGS. 2F and 11B) in a direction opposite the arrow $R_{24}$ of FIGS. 2E and 11A.

Figure 2F:
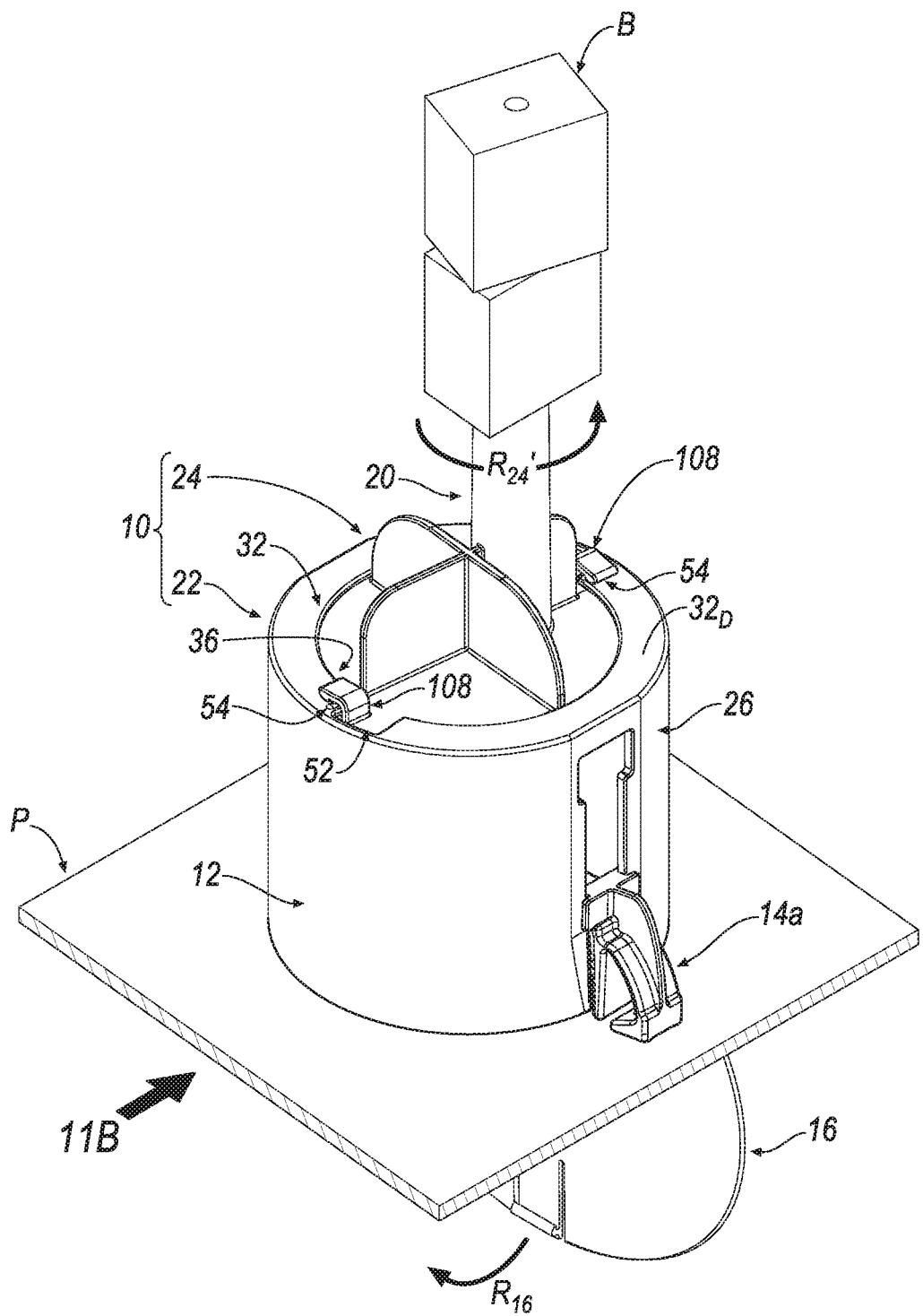
FIG. 2F is a further partially assembled perspective view of the bait station of FIG. 2E.

With reference to FIG. 2F, after rotation $R_{24}$ of the second bait station subassembly 24 relative to the housing 12 has been completed such that one or more of the inner surface $112_I$ of the terminal end 112 and the projection 114 of the substantially L-shaped body 110 of the one or more axial retainer fingers 108 is/are disposed adjacent one or more of the corresponding projections 54 and the distal surface $32_D$ of the inwardly-extending lip portion 32 of the housing 12, the second bait station subassembly 24 may be said to be removably-connected to the first bait station subassembly 22. Thereafter, as seen in FIG. 2F, the lid member 16 may be rotated $R_{16}$ relative to the housing 12 according to the direction of arrow $R_{16}$ for selectively-retaining the lid member 16 to the housing 12 in a closed orientation (as seen in, e.g., FIG. 2G).

As seen in FIG. 2A, the lid member 16 may define a passage 116 extending through a thickness $T_{16}$ of the lid member 16. The thickness $T_{16}$ of the lid member 16 extends between an outer surface $16_O$ of the lid member 16 and an inner surface $16_I$ of the lid member 16.

Figure 2G:
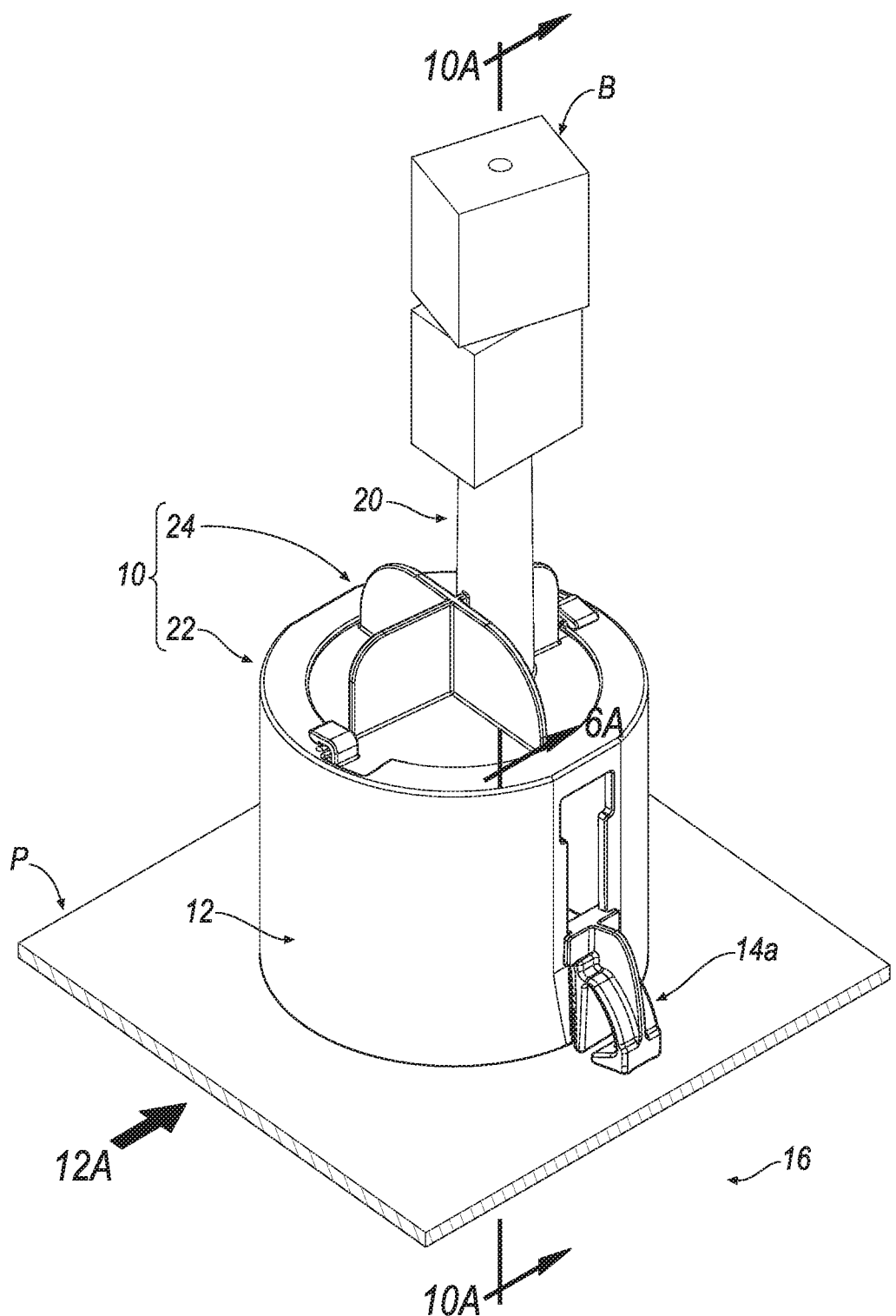
FIG. 2G is a further partially assembled perspective view of the bait station of FIG. 2F.
Figure 3A:
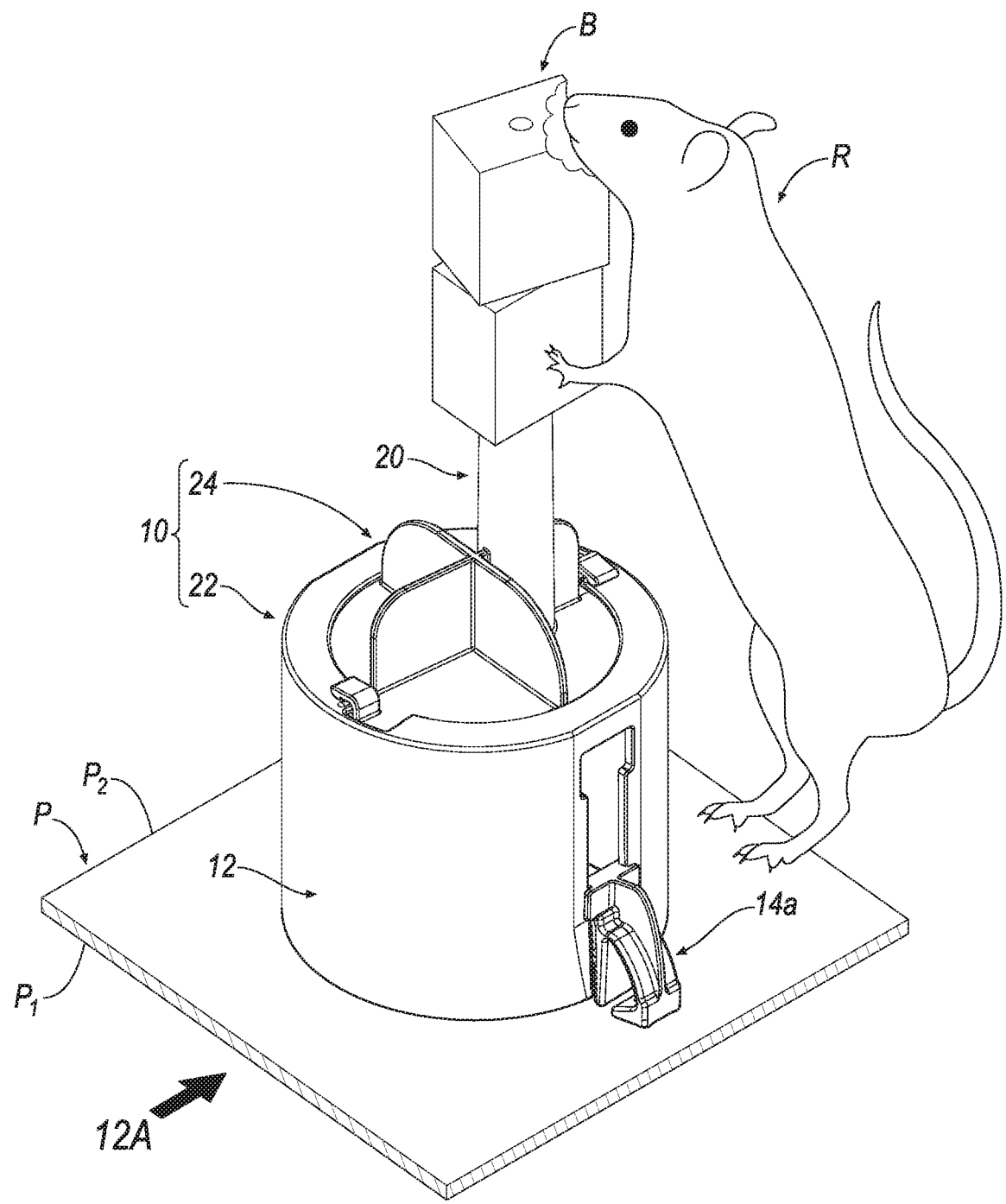
FIG. 3A is an assembled perspective view of the bait station of FIG. 2G loaded with bait being consumed by a rodent.
Figure 3B:
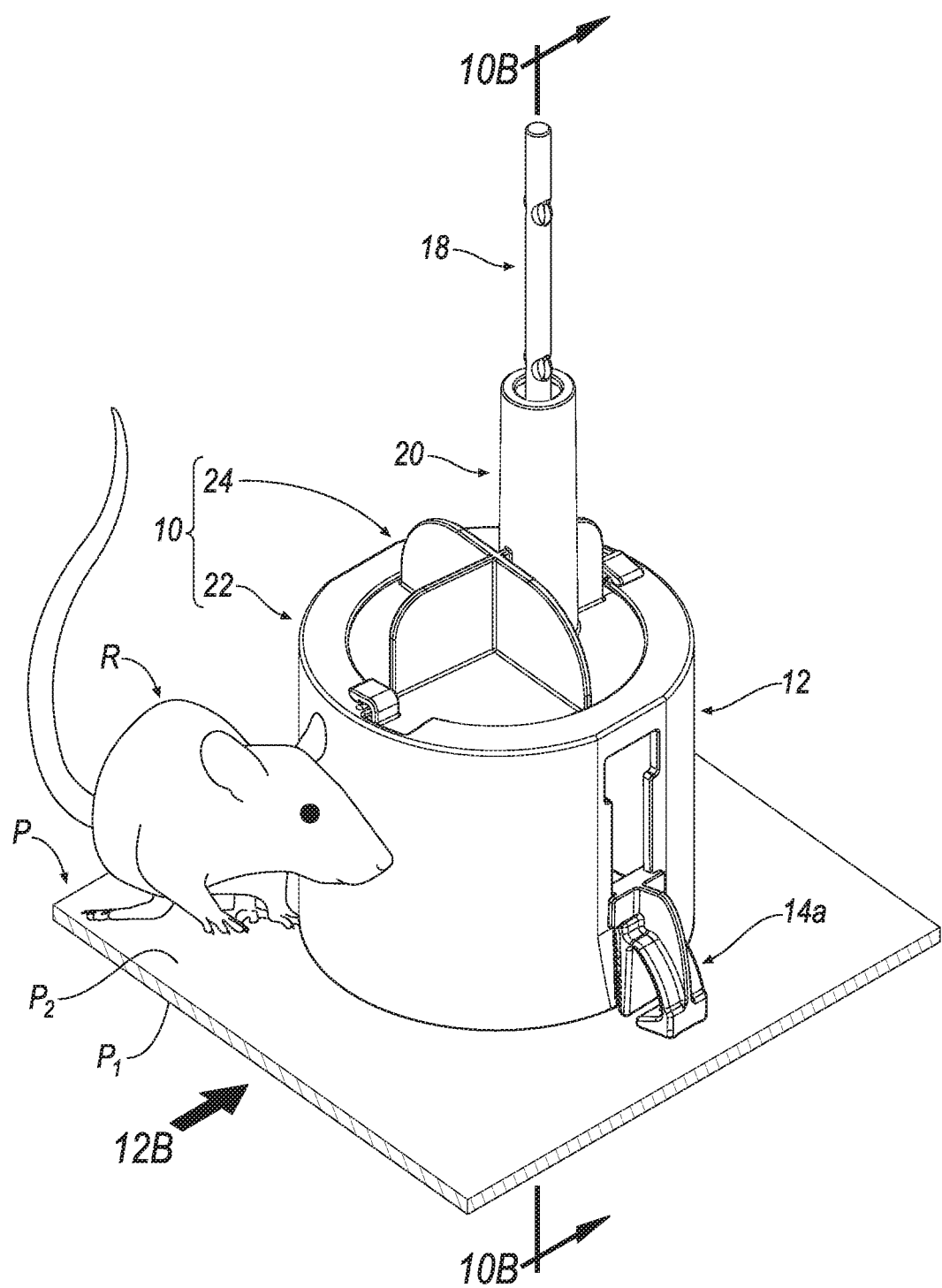
FIG. 3B another perspective view of the bait station of FIG. 3A after the bait is consumed by the rodent.
Figure 12A:
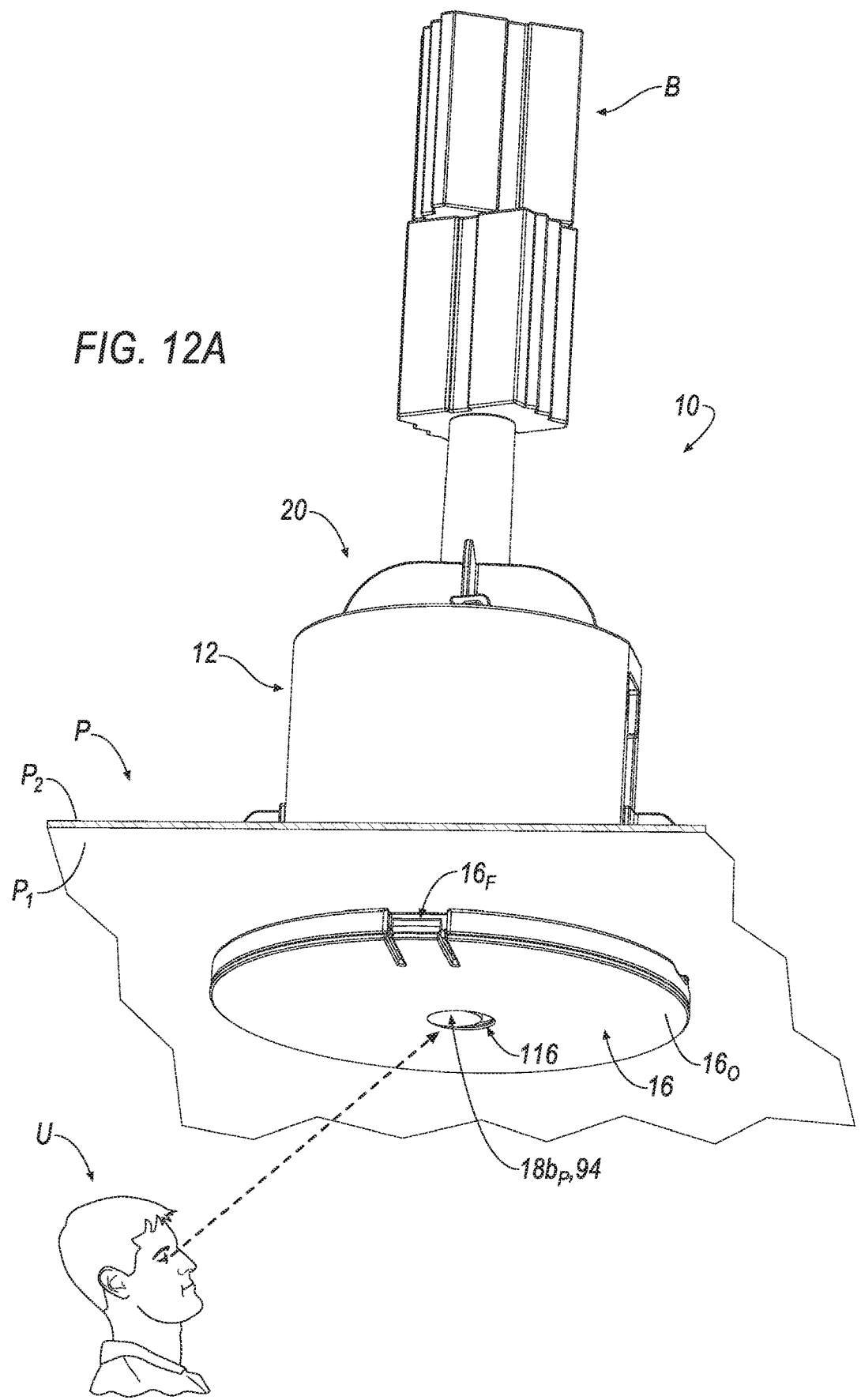
FIG. 12A is a lower perspective view of the bait station according to arrow 12A of FIG. 2G or FIG. 3A.
Figure 12B:
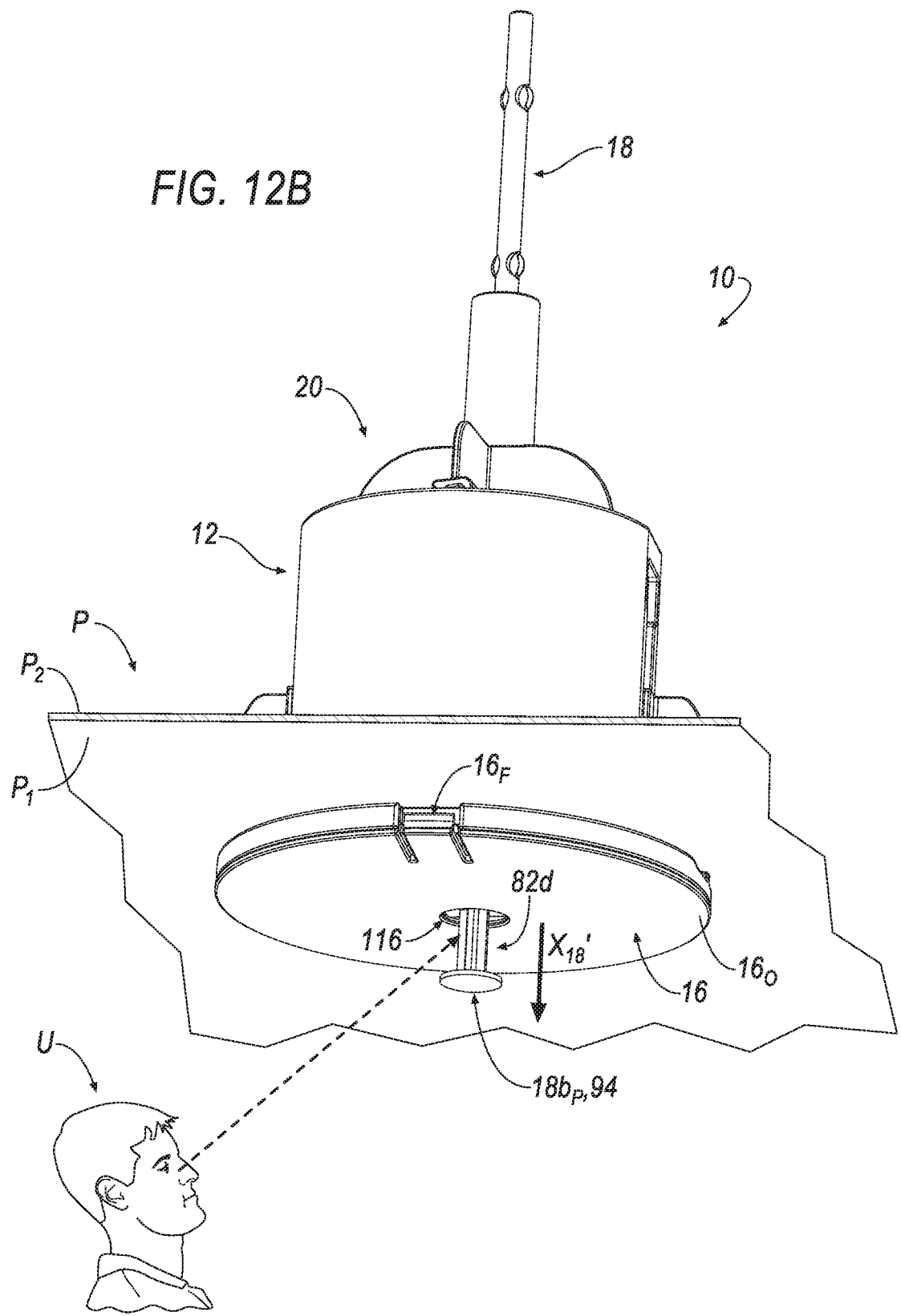
FIG. 12B is a lower perspective view of the bait station according to arrow 12B of FIG. 3B.

With reference to FIGS. 2G, 10A and 12A, after rotating $R_{16}$ the lid member 16 relative to the housing 12, the passage 116 extending through the thickness $T_{16}$ of the lid member 16 is axially-aligned with the button member 94 defined by the proximal end $18b_P$ of the consumption-indicating portion 18b of the bait spike 18. Furthermore, after rotating $R_{16}$ the lid member 16 relative to the housing 12, the button member 94 may be disposed within the passage 116 such that the button member 94 may be substantially aligned with thickness $T_{16}$ of the lid member 16. Yet even further, the button member 94 may be defined by a diameter $D_{94}$ that is about the same as but slightly smaller than a diameter $D_{116}$ of the passage 116 thereby substantially closing-out the passage 116 of the lid member 16.

Referring to FIGS. 12A-12E, 13A-13C and 14A-14C, a method for operating the bait station 10 when the bait station 10 is secured to the panel P and loaded with bait B is now described. As seen in FIG. 12A, the bait station 10 is loaded with bait B and secured to the panel P as described above at FIGS. 2A-2G. Thereafter, as seen in FIG. 12B, the rodent R (referring to FIGS. 3A-3B) has removed or consumed the bait B. As a result of the rodent R removing or consuming the bait B, the bait spike 18, which is free-floatingly-disposed within the bait spike retainer 20, may fall or drop downwardly with the assistance of gravity from an "up orientation" (see, e.g., FIGS. 3A, 10A, 12A) to a "down orientation" (seem e.g. FIGS. 3B, 10B, 12B) in order to provide a visible indication to the user U (who is located opposite the A-surface $P_1$ of the panel P as seen in, for example, FIGS. 12A-12D) that the bait B (that is located opposite the B-surface $P_2$ of the panel P as seen in, for example, FIGS. 3A, 10A, 12A) has been depleted (as seen in, for example, FIGS. 3B, 10B, 12B).

With reference to FIGS. 10B and 12B, because the diameter $D_{94}$ of the button member 94 is about the same as but slightly smaller than the diameter $D_{116}$ of the passage 116 formed by the lid member 16, the fourth stem portion 82d extending along the fourth portion $L_{18b-4}$ of the length $L_{18b}$ of the consumption-indicating portion 18b (which includes the button member 94) is permitted to pass through the passage 116 (according to the direction of arrow $X_{18}'$) formed by the lid member 16 for arranging the bait spike 18 relative to the bait spike retainer 20 in the "down orientation." Furthermore, as seen in FIG. 10B, as a result of the bait spike 18 being arranged in the "down orientation," the proximal end $82c_P$ of the third stem portion 82c of the consumption-indicating portion 18b is disposed adjacent the inner surface $16_I$ of the lid member 16 for preventing the bait spike 18 from being fully evacuated from the passage 70 of the bait spike retainer 20.

Figure 12D:
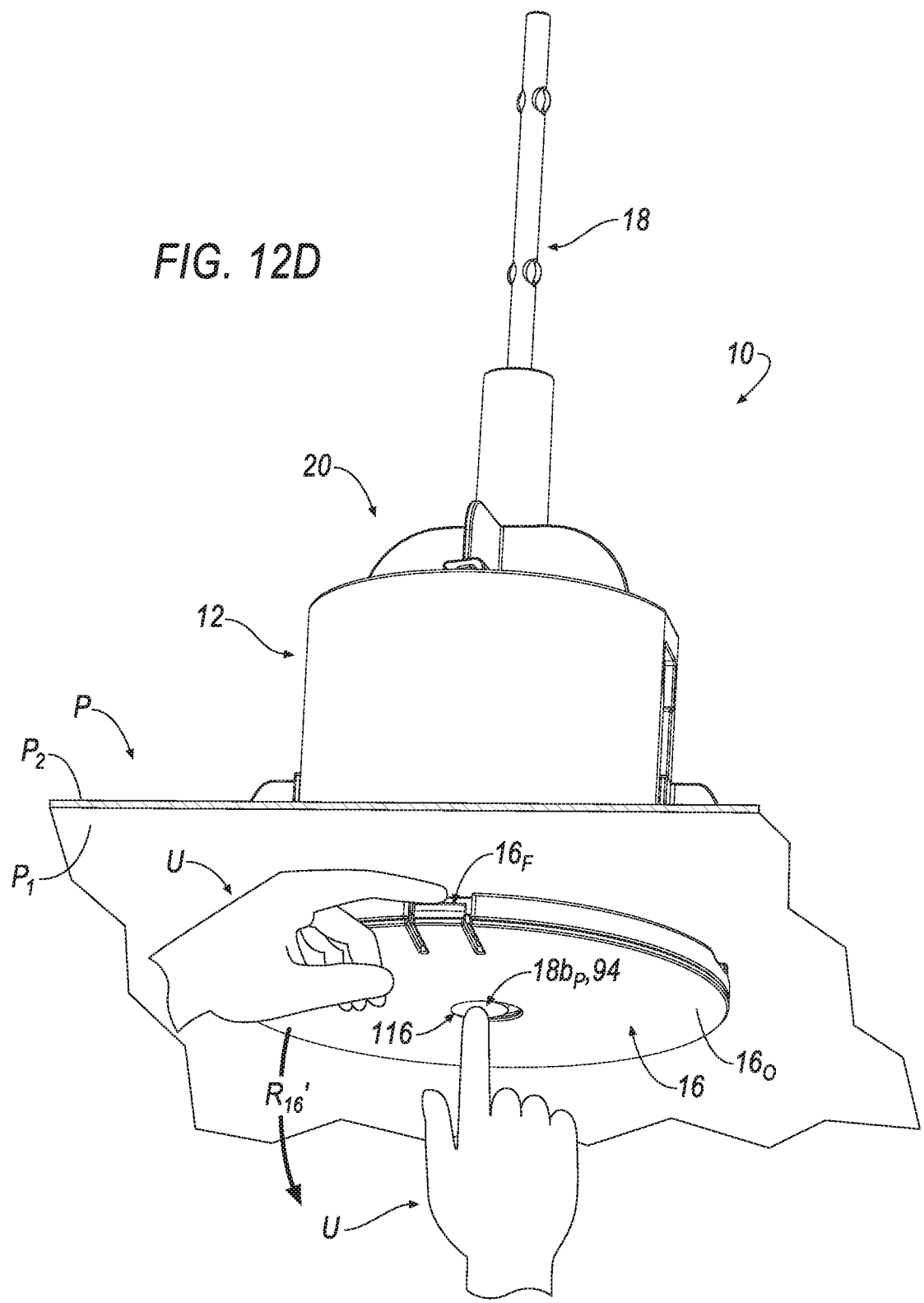
FIG. 12D is a lower perspective view of the bait station according to FIG. 12C being serviced by the user.
Figure 12E:
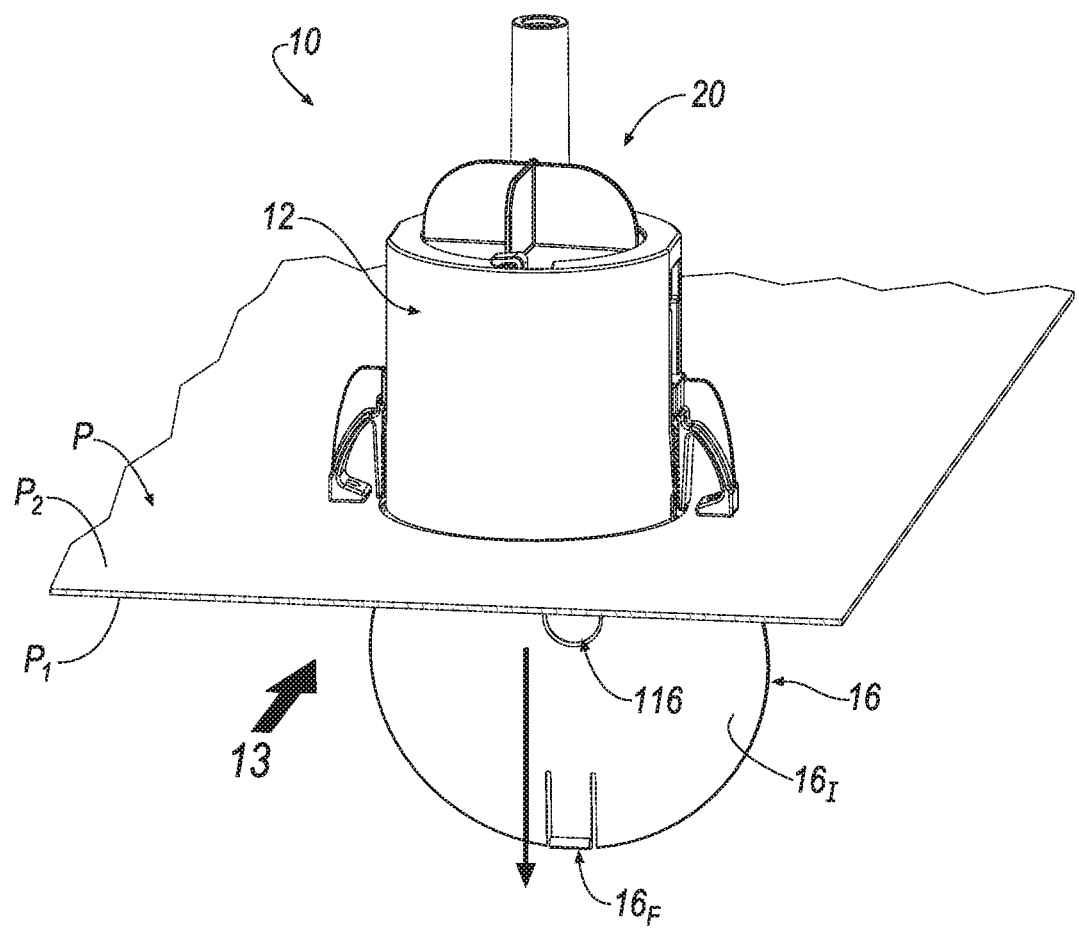
FIG. 12E is a lower perspective view of the bait station according to FIG. 12D being serviced by the user showing the bait spike removed from the housing.
Figure 12E:
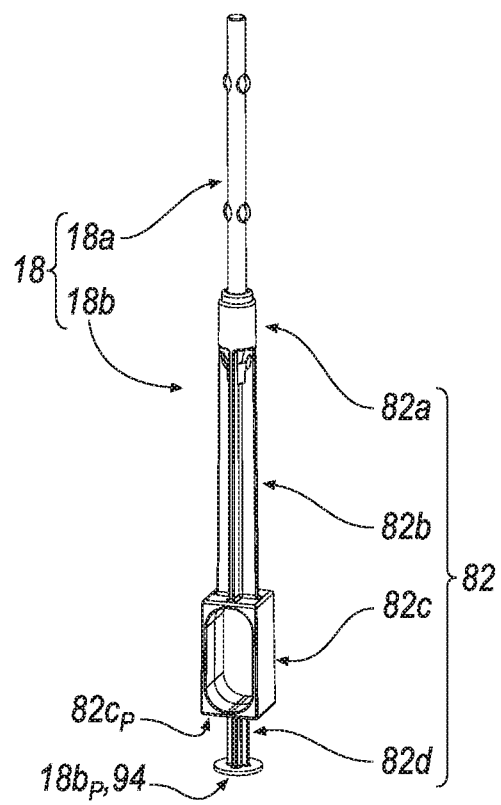

Referring to FIG. 12C, if the user U decides to service the bait station 10 in order, to, for example, re-load bait B upon the bait spike 18, the user U urges the exposed the fourth stem portion 82d back into the housing 12 by pushing the proximal end $18b_P$ of the consumption-indicating portion $18b$/the button member 94 upwardly according to the direction of the arrow $X_{18}$ such that the bait spike 18 is manually arranged back to the "up orientation" relative to the bait spike retainer 20. Then, as seen in FIG. 12D, while the bait spike 18 is manually arranged back to the "up orientation" relative to the bait spike retainer 20, the user may user his/her other hand to grasp the snap-fit flange $16_F$ of the lid member 16 in order to disconnect the snap-fit flange $16_F$ from the snap-fit channel 46 and rotate $R_{16}$' the lid member 16 relative to the housing 12 for transitioning the lid member 16 from the closed orientation (as seen in FIG. 12D) to an open orientation (as seen in FIG. 12E). Once the lid member 16 is arranged in the open orientation as seen in FIG. 12E, the bait spike 18 (without the bait B secured thereto) is permitted to fall with the assistance of gravity away from the bait spike retainer 20 as a result of the inner surface $16_I$ of the lid member 16 to longer being arranged adjacent and supporting the proximal end $82c_P$ of the third stem portion $82c$ of the consumption-indicating portion $18b$ of the bait spike 18.

Figure 13A:
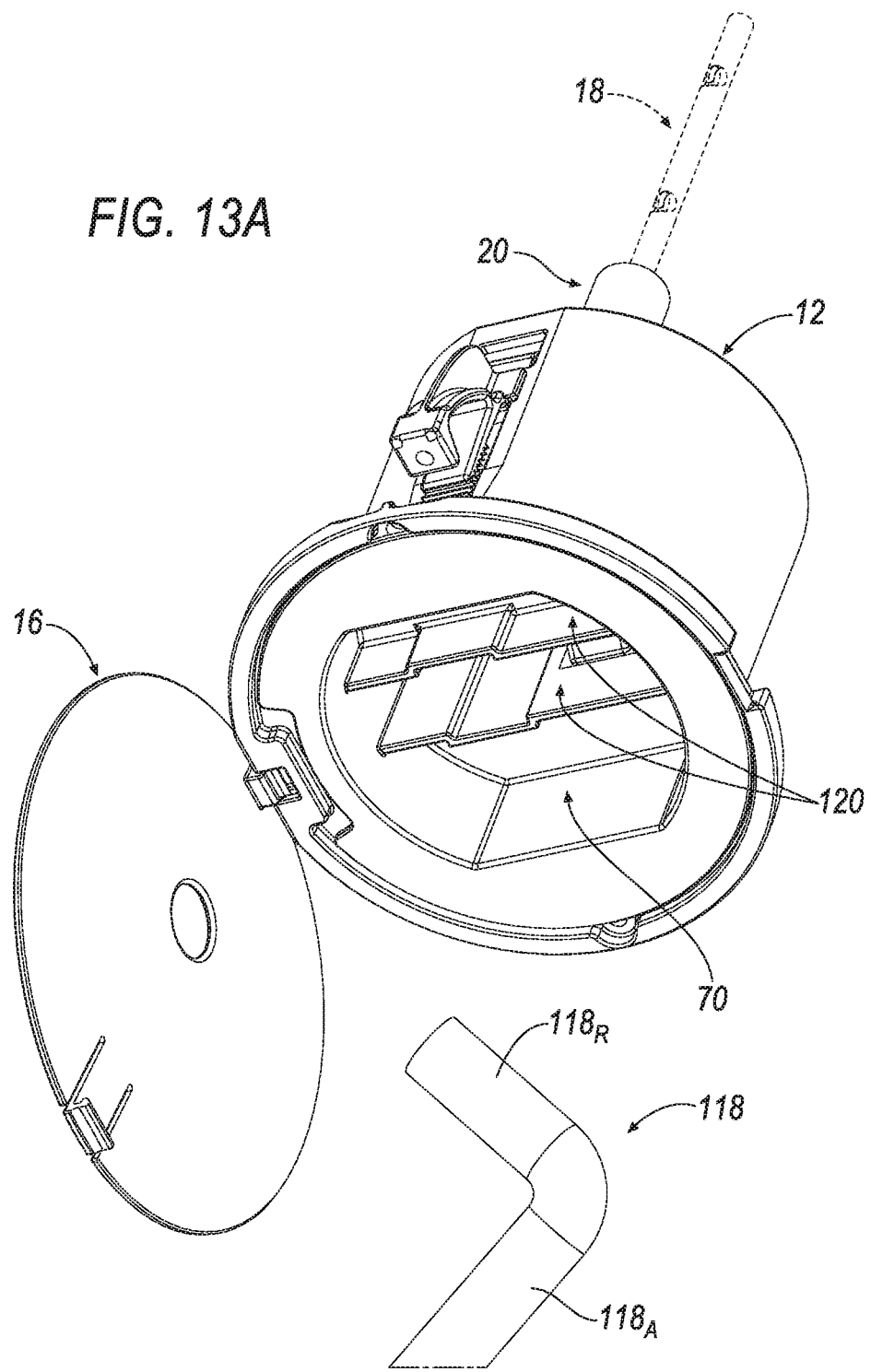
FIG. 13A is a lower perspective view of the bait station according to arrow 13 of FIG. 12E.
Figure 13B:
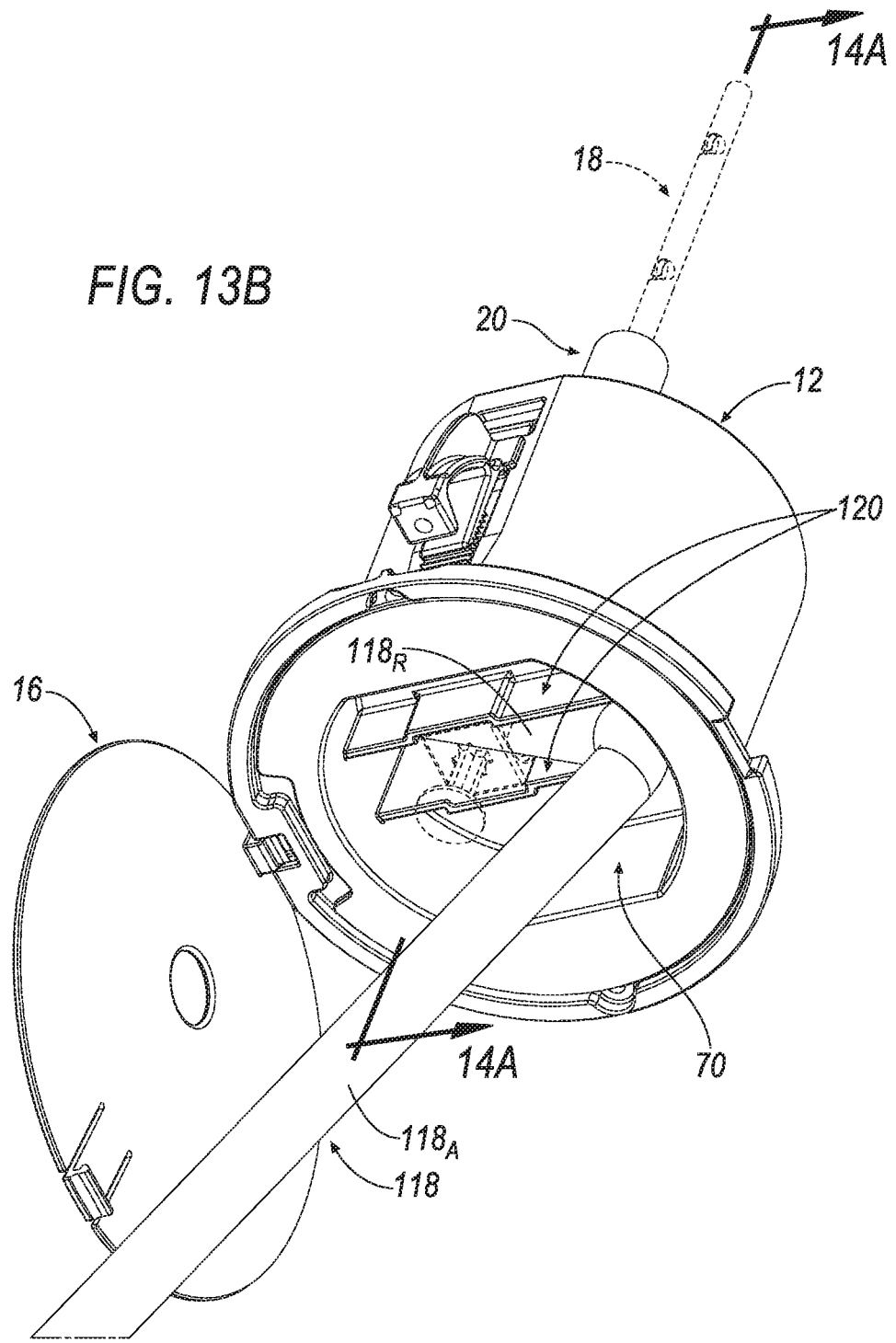
FIGS. 13B-13C are lower perspective views of the bait station of FIG. 13A receiving a tool.
Figure 13C:
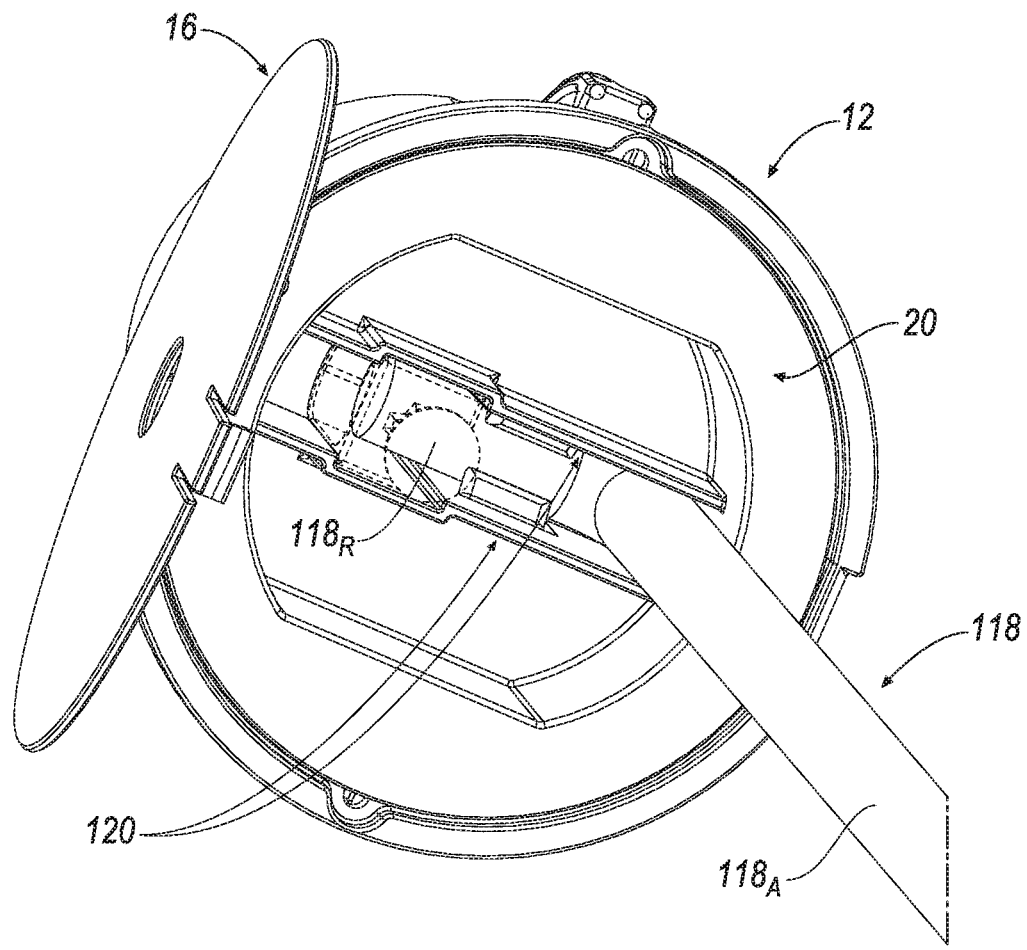

Referring to FIG. 13A, with or without the bait spike 18 removed from the bait spike retainer 20, the bait spike retainer 20 may be disconnected from the housing 12. In an example, the bait spike retainer 20 may be rotated $R_{24}$' (see, e.g., FIGS. 2F and 11B) as described above such that each axial retainer finger 108 is slid past the each corresponding projection 54 of the inwardly-extending lip portion 32 of the housing 12 until each axial retainer finger 108 is axially aligned with a corresponding slot 52 formed by the inwardly-extending lip portion 32 of the housing 12. Thereafter, the bait spike retainer 20 may by axially disconnected from the housing 12 and the bait spike retainer 20 may be removed from the axial passage 28 of the housing 12. Once the bait spike retainer 20 is removed from the housing 12, the second bait station subassembly 24 may be re-baited as shown and described at FIGS. 2A-2C. Once the second bait station subassembly 24 is re-baited, the second bait station subassembly 24 is re-connected to the housing 12 as shown and described at FIGS. 2D-2G.

Rotation $R_{24}$' of the bait spike retainer 20 relative to the housing 12 for disconnected the bait spike retainer 20 from the housing 12 may be carried out in any desirable manner. In an example, a user may grasp the bait spike retainer 20 by hand and rotate $R_{24}$' the bait spike retainer 20 relative to the housing 12 in a substantially similar when one would change a light bulb relative to a light bulb socket. In another example, in the event that a user is unable to reach the bait spike retainer 20 or prefers to not touch the bait spike retainer 20, as seen in FIGS. 13A-13C, 14A-14C and 15, a user may utilize a tool 118 that is sized for engagement with the bait spike retainer 20.

Figure 14A:
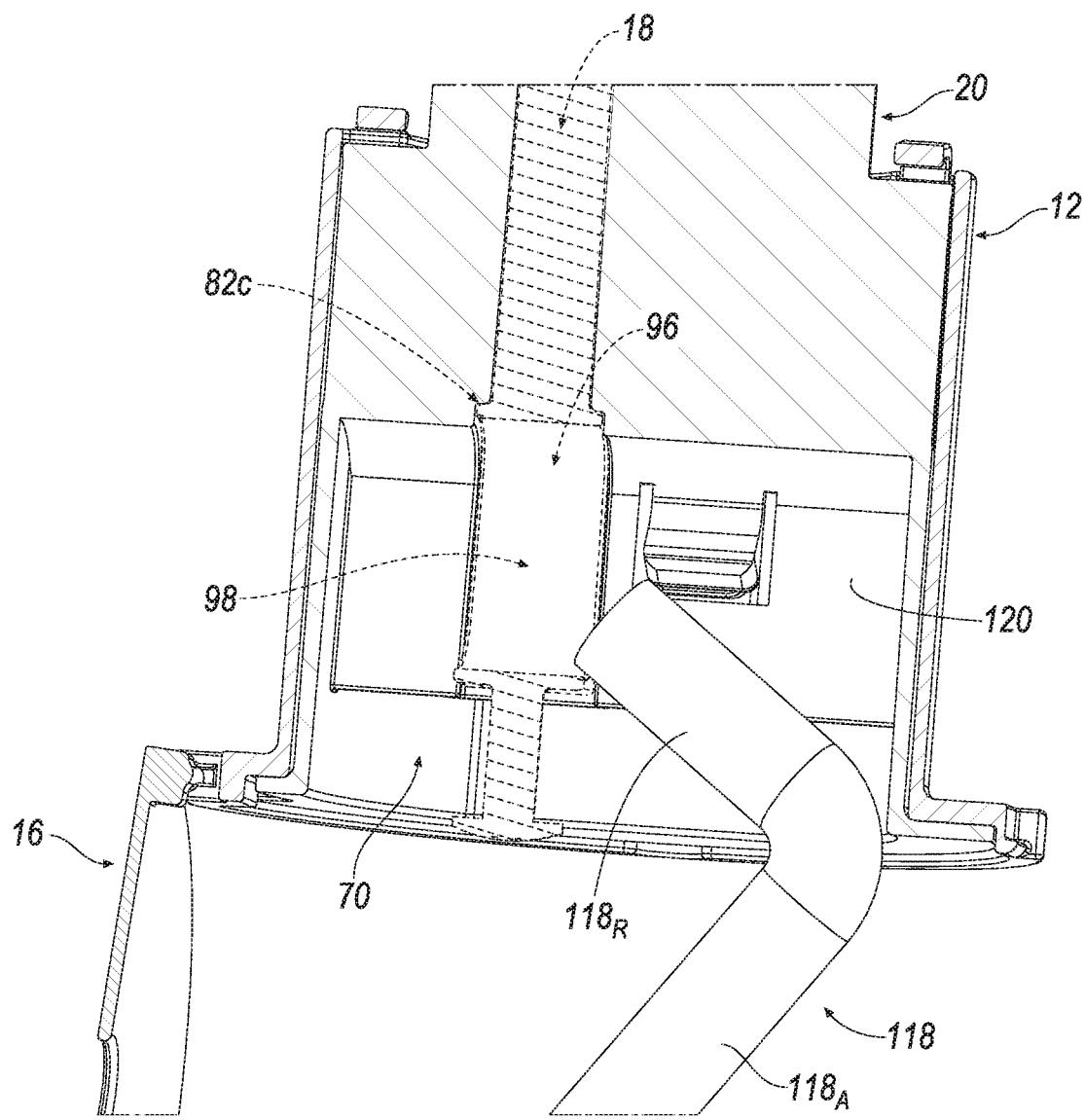
FIG. 14A is a cross-sectional view of the bait station according to line 14A-14A of FIG. 13B with the tool partially arranged within the housing of the bait station.
Figure 14B:
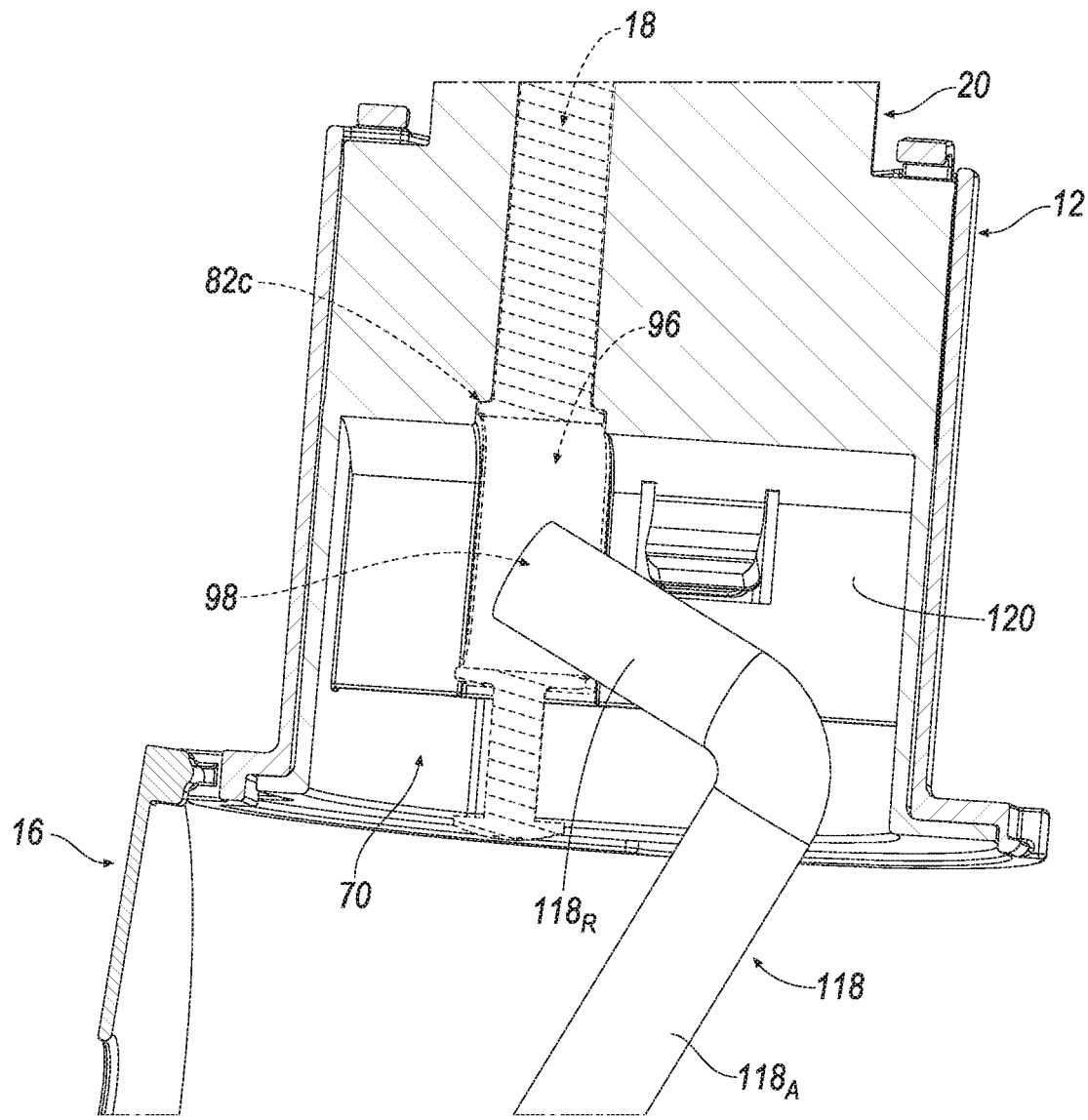
FIG. 14B is a cross-sectional view of the bait station according to FIG. 14A with the tool further partially arranged within the housing of the bait station.
Figure 14C:
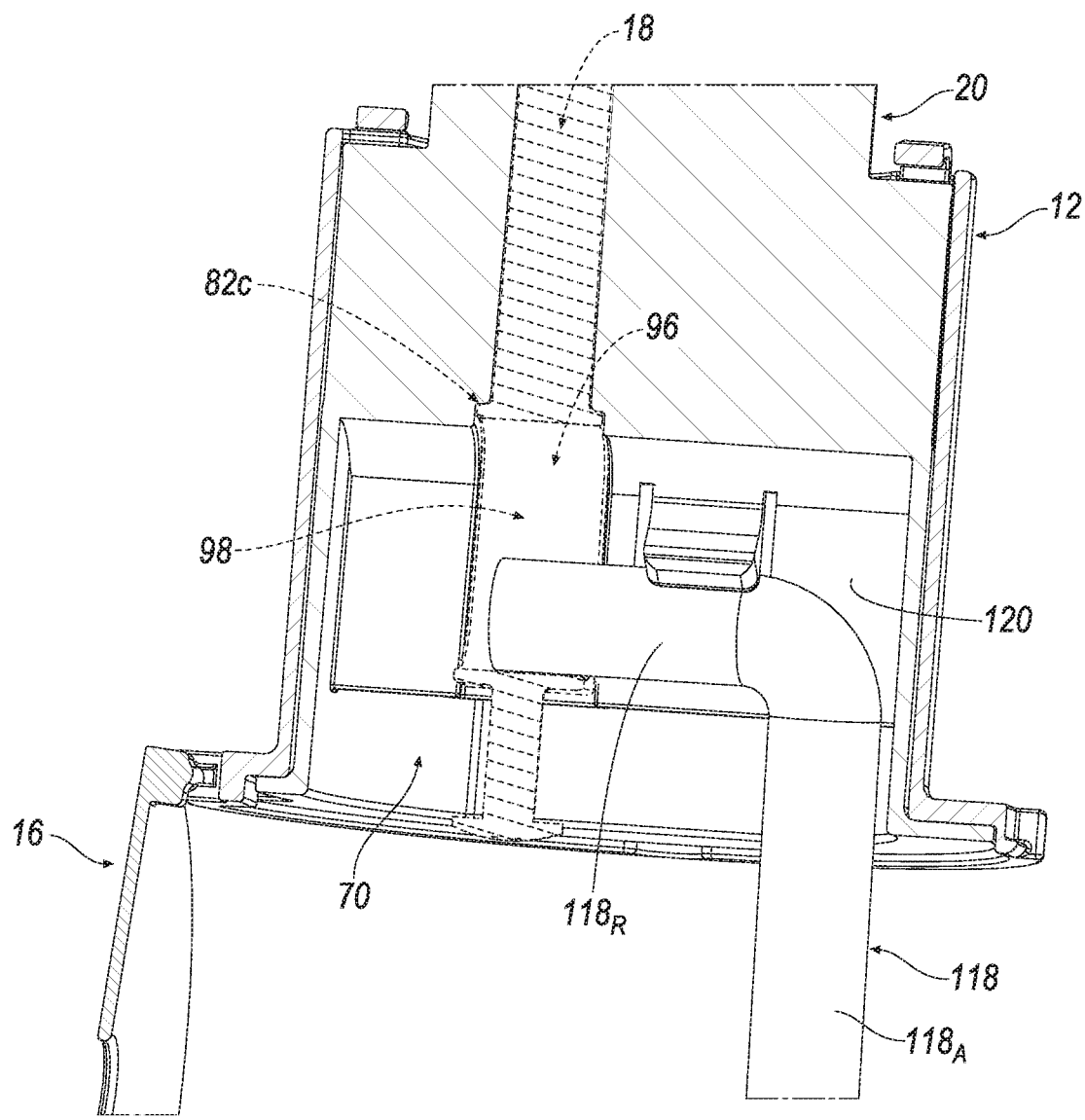
FIG. 14C is a cross-sectional view of the bait station according to FIG. 14B with the tool arranged within the housing of the bait station.
Figure 15:
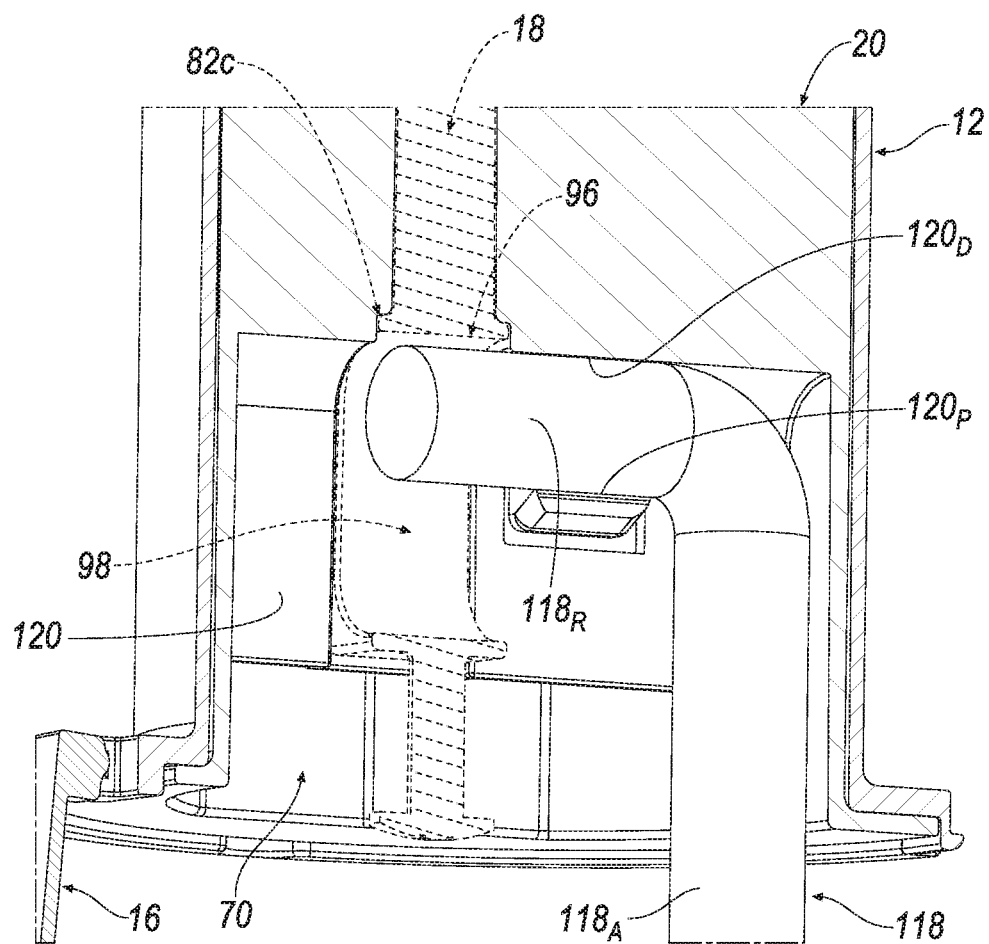
FIG. 15 is a cross-sectional view of the bait station according to FIG. 14C with the tool arranged within the housing of the bait station in another orientation.

In an example, the tool 118 may have an L-shaped body having an axial portion $118_A$ and a radial portion $118_R$ extending away from the axial portion $118_A$. In an example, as seen in FIGS. 13A-13C and 14A-14C, one or more of the radial portion $118_R$ and the axial portion $118_A$ of the tool 118 may be sized for insertion between a pair of radial members 120 that extend across the passage 70 of the bait spike retainer 20. In another example, as seen in FIG. 15, the radial portion $118_R$ of the tool 118 may be sized for arrangement between a distal tool surface $120_D$ of the bait spike retainer 20 that at least partially defines the passage 70 of the bait spike retainer 20 and a proximal tool surface $120_P$ of the bait spike retainer 20 that at least partially defines the passage 70 of the bait spike retainer 20. Once the tool 118 is removably-coupled to the bait spike retainer 20 as described above, the user may impart a rotational force $R_{24}$' to the tool 118 for causing the bait spike retainer 20 to rotate relative to the housing 12.

It is contemplated that in some situations a user may be uncertain of and wish to inspect the state of consumption of the bait B (i.e., the fourth stem portion $82d$ of the consumption-indicating portion $18b$ of the bait spike 18 has not yet passed through the passage 116 formed by the lid member 16 for arranging the bait spike 18 relative to the bait spike retainer 20 in the "down orientation" thereby indicating to a user that the bait station 10 still supports at least some bait B that is preventing the bait spike 18 to "drop" relative to the bait spike retainer 20). Therefore, as seen more clearly in FIGS. 14A-14C and 15, when the bait B secures the bait spike 18 to the bait spike retainer 20, as described above, the third stem portion $82c$ of the consumption-indicating portion $18b$ defines a tool interface portion 96 having a tool insertion passage 98. Therefore, as seen in FIGS. 14A-14C, in the event that the bait spike 18 is still secured to the bait spike retainer 20 by the bait B, the tool insertion passage 98 is sized for receiving the radial portion $118_R$ of the tool 118 such that the user is permitted to not only arrange the radial portion $118_R$ between the pair of radial members 120 extending across the passage 70 of the bait spike retainer 20 but also through the passage 98 formed by the third stem portion $82c$ of the consumption-indicating portion $18b$ of the bait spike 18. Therefore, upon the user imparting a rotational force $R_{24}$' to the tool 118, the rotational force $R_{24}$' may be translated to one or more of the bait spike 18 and the bait spike retainer 20.

Although rotation $R_{24}$' of the bait spike retainer 20 relative to the housing 12 for disconnecting the bait spike retainer 20 from the housing 12 by hand or with the tool 118 (with or without the bait spike 18 arranged within the bait spike retainer 20) is described above, rotation $R_{24}$ in the direction opposite the direction of the arrow $R_{24}$' may be carried out for connecting the bait spike retainer 20 to the housing 12. In an example, the user U may grasp the bait spike retainer 20 by hand and rotate $R_{24}$ the bait spike retainer 20 relative the housing 12 (in a substantially similar when one would change a light bulb relative to a light bulb socket) in order to connect the bait spike retainer 20 to the housing 12. In another example the user U may removably-couple the tool 118 to one or both of the bait spike retainer 20 (by arranging the tool 118 near, next to or between one of the pair of radial members 120, the distal tool surface $120_D$ and the proximal tool surface $120_P$ of the bait spike retainer 20) and the bait spike 18 (by arranging the tool 118 within the tool insertion passage 98 of the bait spike 18) as described above and rotate $R_{24}$ the bait spike retainer 20 relative the housing 12 in order to connect the bait spike retainer 20 to the housing 12.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A bait station, comprising:
   a first bait station subassembly including
   a housing having a body defining an axial passage and at least one radial passage in fluid communication with the axial passage,
   at least one panel-engaging member sized for arrangement within and slideably disposed about the at least one radial passage, and a lid member hingedly-connected to the housing, wherein the lid member defines a passage;

a second bait station subassembly including a bait spike retainer defining an axial bait spike passage, and a bait spike sized to be movably-disposed within the bait spike passage and the passage of the lid member.

2. The bait station according to claim 1, wherein the housing includes a radially inwardly-extending lip portion, wherein the inwardly-extending lip portion defines a distal opening that is axially-aligned with and is in fluid communication with the axial passage extending through the body, wherein the inwardly-extending lip portion defines at least one slot.

3. The bait station according to claim 2, wherein a distal end of the bait spike retainer includes at least one axial retainer finger that is sized to extend through the at least one slot of the inwardly-extending lip portion and to engage a distal surface of the inwardly-extending lip portion upon rotatably-connecting the bait spike retainer to the housing.

4. The bait station according to claim 3,
wherein the at least one axial retainer finger of the bait spike retainer includes a projection,
wherein the inwardly-extending lip portion of the housing includes a projection, and
wherein the projection of the axial retainer finger of the bait spike retainer is sized to engage the projection of the inwardly-extending lip portion of the housing after rotatably-connecting the bait spike retainer to the housing.

5. The bait station according to claim 1, wherein the at least one panel-engaging member includes:
a first flange portion;
a second flange portion; and
a third flange portion, wherein the first flange portion and the second flange portion are sized for engagement with the at least one radial passage formed by the body of the housing, wherein the third flange portion is sized for engagement with an outwardly-extending lip portion that extends radially outwardly from an outer surface of the body of the housing.

6. The bait station according to claim 5, wherein the first flange portion is sized to be retained adjacent an inner surface of the body of the housing.

7. The bait station according to claim 5, wherein the second flange portion includes an inner surface defined by a row of ridges that is sized to be axially coupled to a corresponding row of ridges extending from the outer surface of the body upon slidably-connecting the at least one panel-engaging member within the at least one radial passage.

8. The bait station according to claim 5, wherein the third flange portion is defined by one or more barbs sized for being received by one or more female portions formed by a distal surface of the outwardly-extending lip portion upon slidably-connecting the at least one panel-engaging member within the at least one radial passage.

9. The bait station according to claim 1, wherein the lid member includes a lid member thickness extending between an inner surface and an outer surface of the lid member, wherein the passage of the lid member extends through the lid member thickness.

10. The bait station according to claim 9, wherein the bait spike includes a proximal end and a distal end, wherein the proximal end of the bait spike is sized for arrangement within the passage of the lid member.

11. The bait station according to claim 10, wherein the bait spike is arranged relative to the lid member in one of two states:
a baited state whereby the proximal end of the bait spike is substantially aligned with the outer surface of the lid member and a proximal end of an intermediate stem portion of the bait spike is arranged in a spaced-apart relationship with respect to the inner surface of the lid member; and
a non-baited state whereby the proximal end of the bait spike is not aligned with the outer surface of the lid member and the proximal end of the intermediate stem portion of the bait spike is arranged adjacent to the inner surface of the lid member.

12. The bait station according to claim 11, wherein, during the non-baited state, a proximal stem portion of the bait spike that forms the proximal end of the bait spike extends beyond the outer surface of the lid member.

13. A method of assembling the bait station of claim 1, comprising:
connecting the first bait station subassembly to a panel by:
inserting the housing at least partially through a panel passage formed by the panel;
securing the housing to the panel by connecting the at least one panel-engaging member to the housing by:
axially-inserting the at least one panel-engaging member into the axial passage in a first axial direction then
radially-inserting the at least one panel-engaging member partially through the at least one radial passage in a radial direction then
axially-sliding the at least one panel-engaging member relative to the at least one radial passage in a second axial direction that is opposite the first axial direction; and
connecting the second bait station subassembly to the first bait station subassembly by:
axially-inserting the second bait station subassembly into the axial passage of the first bait station subassembly; and
rotating the second bait station subassembly relative to the first bait station subassembly.

14. The method of claim 13, wherein the axially-sliding the at least one panel-engaging member relative to the at least one radial passage in the second axial direction results in:
sandwiching a thickness of the panel by:
arranging at least a portion of a proximal surface of the at least one panel-engaging member adjacent an upper B-surface side of the panel; and
arranging at least a portion of a distal surface of an outwardly-extending lip portion that extends radially outwardly from an outer surface of the body of the housing adjacent a lower A-surface side of the panel.

15. The method of claim 13, further comprising:
prior to connecting the second bait station subassembly to the first bait station subassembly, assembling the second bait station subassembly by connecting the bait spike to the bait spike retainer by axially-inserting the bait spike into the axial bait spike passage of the bait spike retainer.

16. The method of claim 15, further comprising:
prior to connecting the second bait station subassembly to the first bait station subassembly, connecting a bait to a distal end of the bait spike after connecting the bait spike to the bait spike retainer.

17. The method of claim 16, wherein the bait is a rodenticide.

18. The method of claim 15 further comprising:
after connecting the second bait station subassembly to the first bait station subassembly, hingedly-rotating the lid member connected to the housing from an open orientation to a closed orientation, wherein the lid member defines a lid member thickness and the lid member passage extends through the lid member thickness, wherein after hingedly-rotating the lid member, the lid member passage is axially-aligned with and receives a proximal end of the bait spike.

19. The method of claim 13, further comprising:
prior to rotating the second bait station subassembly relative to the first bait station subassembly, axially-inserting one or more axial retainer fingers extending from the bait spike retainer through one or more slots formed by an inwardly-extending lip portion of the body of the housing.

20. The method of claim 19, wherein rotating the second bait station subassembly relative to the first bait station subassembly includes:
spatially displacing the one or more axial retainer fingers relative the one or more slots for disposing an inner surface of the one or more axial retainer fingers adjacent a distal surface of the inwardly-extending lip portion.

* * * * *